(12) United States Patent
Illikkal et al.

(10) Patent No.: US 12,231,304 B2
(45) Date of Patent: Feb. 18, 2025

(54) EFFICIENT RESOURCE ALLOCATION FOR SERVICE LEVEL COMPLIANCE

(71) Applicant: Intel Corporation, Santa Clara, CA (US)

(72) Inventors: Rameshkumar Illikkal, Folsom, CA (US); Anna Drewek-Ossowicka, Gdansk (PL); Dharmisha Ketankumar Doshi, Folsom, CA (US); Qian Li, Stanford, CA (US); Andrzej Kuriata, Gdansk (PL); Andrew J. Herdrich, Hillsboro, OR (US); Teck Joo Goh, Saratoga, CA (US); Daniel Richins, Orem, UT (US); Slawomir Putyrski, Gdynia (PL); Wenhui Shu, Shanghai (CN); Long Cui, Shanghai (CN); Jinshi Chen, Shanghai (CN); Mihai Daniel Dodan, Bucharest (RO)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 18/037,964

(22) PCT Filed: Dec. 21, 2020

(86) PCT No.: PCT/CN2020/138138
§ 371 (c)(1),
(2) Date: May 19, 2023

(87) PCT Pub. No.: WO2022/133690
PCT Pub. Date: Jun. 30, 2022

(65) Prior Publication Data
US 2024/0015080 A1   Jan. 11, 2024

(51) Int. Cl.
*H04L 41/5019* (2022.01)
*G06F 9/50* (2006.01)

(52) U.S. Cl.
CPC ........ *H04L 41/5019* (2013.01); *G06F 9/5011* (2013.01)

(58) Field of Classification Search
CPC ..................... H04L 41/5019; G06F 9/5011
(Continued)

(56) References Cited

U.S. PATENT DOCUMENTS 9,921,866 B2 *   3/2018   Ganguli .............. G06F 11/3409
10,721,137 B2    7/2020   Ganguli et al.
(Continued)

FOREIGN PATENT DOCUMENTS

CN     107003887        8/2017
CN     107003887 A      8/2017
(Continued)

OTHER PUBLICATIONS

"Netherlands Application Serial No. 2029681, Search Report mailed Apr. 5, 2023", w English Translation, 10 pgs.
(Continued)

*Primary Examiner* — Tauqir Hussain
(74) *Attorney, Agent, or Firm* — Schwegman Lundberg & Woessner, P.A.

(57) ABSTRACT

Various approaches to efficiently allocating and utilizing hardware resources in data centers while maintaining compliance with a service level objective (SLO) specified for a computational workload is translated into a hardware-level SLO to facilitate direct enforcement by the hardware processor, e.g., using a feedback control loop or model-based mapping of the hardware-level SLO to allocations of microarchitecture resources of the processor. In some embodiments, a computational model of the hardware behavior under resource contention is used to predict the application performance (e.g., as measured in terms of the hardware-level SLO) to be expected under certain contention sce-
(Continued)

narios. Scheduling of workloads among the compute nodes within the data center may be based on such predictions. In further embodiments, configurations of microservices are optimized to minimize hardware resources while meeting a specified performance goal.

20 Claims, 26 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 11,792,137 | B2* | 10/2023 | Sun ....................... | H04L 41/147 709/226 |
| 12,093,100 | B2* | 9/2024 | Garg ....................... | G06F 1/324 |
| 2011/0213508 | A1* | 9/2011 | Mandagere ........... | G06F 9/5088 700/291 |
| 2013/0261826 | A1* | 10/2013 | Mandagere ............. | G06F 1/329 700/291 |
| 2016/0179560 | A1* | 6/2016 | Ganguli .............. | G06F 11/3006 718/1 |
| 2017/0031423 | A1* | 2/2017 | Mandagere ........... | G06F 9/5094 |
| 2018/0165008 | A1* | 6/2018 | Baysah ................... | G06F 13/18 |
| 2019/0104182 | A1* | 4/2019 | Elzur ................... | H04L 67/125 |
| 2019/0340123 | A1* | 11/2019 | Herdrich ............. | G06F 12/0802 |
| 2021/0117242 | A1* | 4/2021 | Van De Groenendaal .................. | H04L 67/1001 |
| 2022/0100247 | A1* | 3/2022 | Garg ....................... | G06F 1/324 |

FOREIGN PATENT DOCUMENTS

| | | | |
|---|---|---|---|
| CN | 111492348 | 8/2020 | |
| CN | 111492348 A | 8/2020 | |
| NL | 2029681 | 6/2023 | |
| WO | WO-2011104108 A1 * | 9/2011 | ............... G06F 1/26 |
| WO | 2018144060 | 8/2018 | |
| WO | WO-2018144060 A1 * | 8/2018 | ........... G06F 9/5061 |
| WO | 2019165110 | 8/2019 | |
| WO | WO-2019165110 A1 * | 8/2019 | ............... G06F 8/60 |
| WO | 2022133690 | 6/2022 | |
| WO | WO-2022133690 A1 * | 6/2022 | ............ G06F 9/5011 |

OTHER PUBLICATIONS

"International Application Serial No. PCT/CN2020/138138, International Search Report mailed Sep. 18, 2021", 4 pgs.
"International Application Serial No. PCT/CN2020/138138, Written Opinion mailed Sep. 18, 2021", 4 pgs.
"Netherlands Application Serial No. 2029681, Office Action mailed Nov. 26, 2021", w/o English translation, 4 pgs.
"Netherlands Application Serial No. 2029681, Search Report mailed Apr. 5, 2023", w/o English Translation, 10 pgs.

* cited by examiner

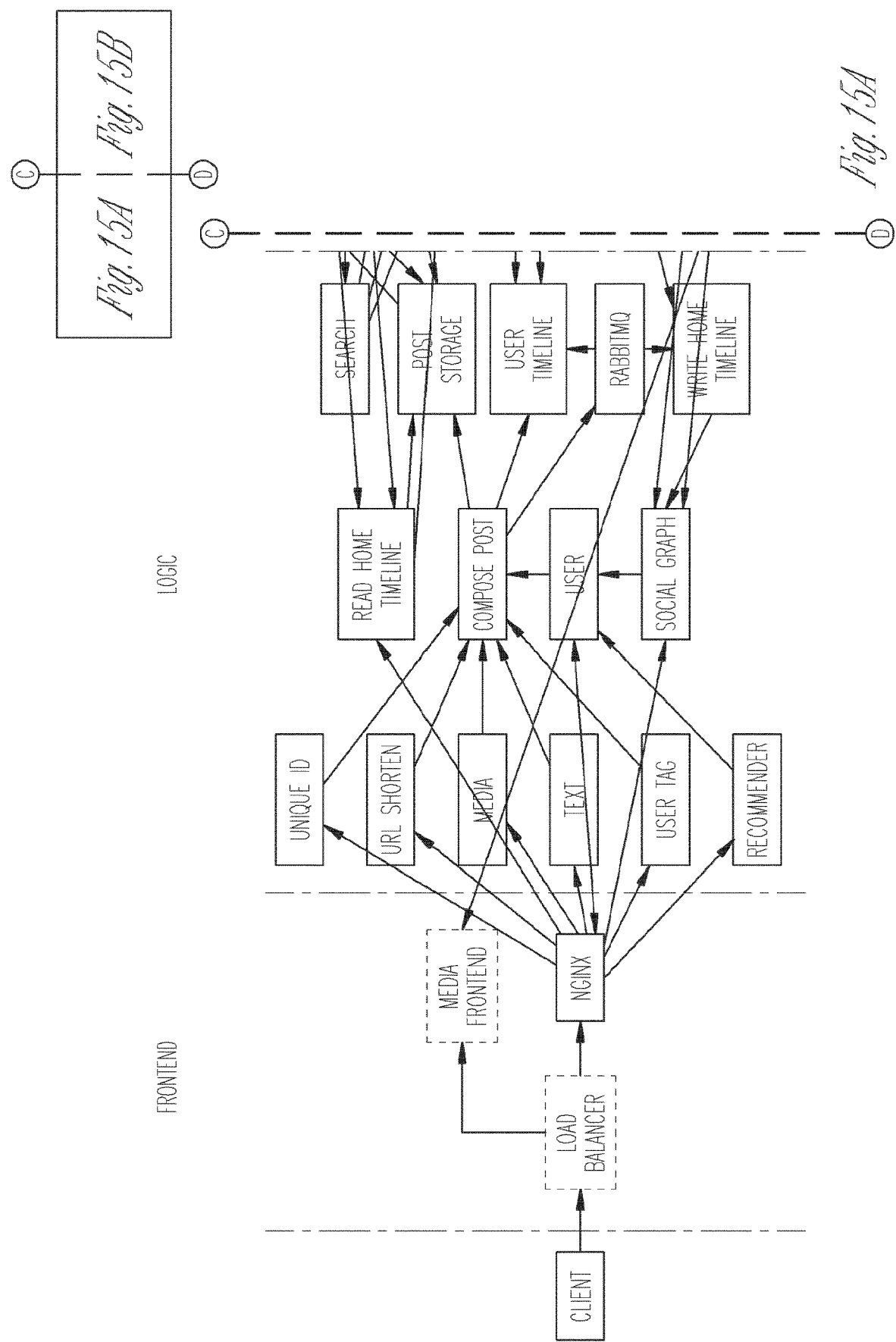

EFFICIENT RESOURCE ALLOCATION FOR SERVICE LEVEL COMPLIANCE

This application is a U.S. National Stage Filing under 35 U.S.C. 371 from International Application No. PCT/CN2020/138138, filed on 21 Dec. 2020, and published as WO 2022/133690 on 30 Jun. 2022, which application is incorporated herein by reference in its entirety.

TECHNICAL FIELD

The present disclosure pertains to apparatus, systems, and methods for efficiently allocating hardware resources in data centers subject to complying with service level agreements (SLAs). Various aspects pertain to performance metrics, performance prediction under resource contention, and improved service configurations.

BACKGROUND

Data center operators, whether acting as edge providers of online content and services to end users or as cloud service providers to third-party edge providers, routinely offer their customers performance guarantees specified in SLAs. For example, for a cloud-hosted database (e.g., for online payments or other financial transactions), a service level objective (SLO) may be defined in terms of database transactions per second; for a search engine, the SLO may be an average latency experienced with a search; and for a cloud application such as, e.g., a face recognition algorithm, the SLO may specify the number of task completions, such as identified faces, per second. Failure to meet the SLO often entails financial penalties payable to the customer. Data center operators therefore have an interest in allocating sufficient hardware resources to the hosted services to comply with their obligations under the SLA, which becomes particularly important in sub-second billing models as are associated, for instance, with emerging fine-grained deployment models such as function-as-a-service (FaaS), containers-as-a-service (CaaS), and microservices.

BRIEF DESCRIPTION OF THE DRAWINGS

FIGS. 15A and 15B illustrate the microservices contained in the DeathStarBench application.

DETAILED DESCRIPTION

Figure 1:
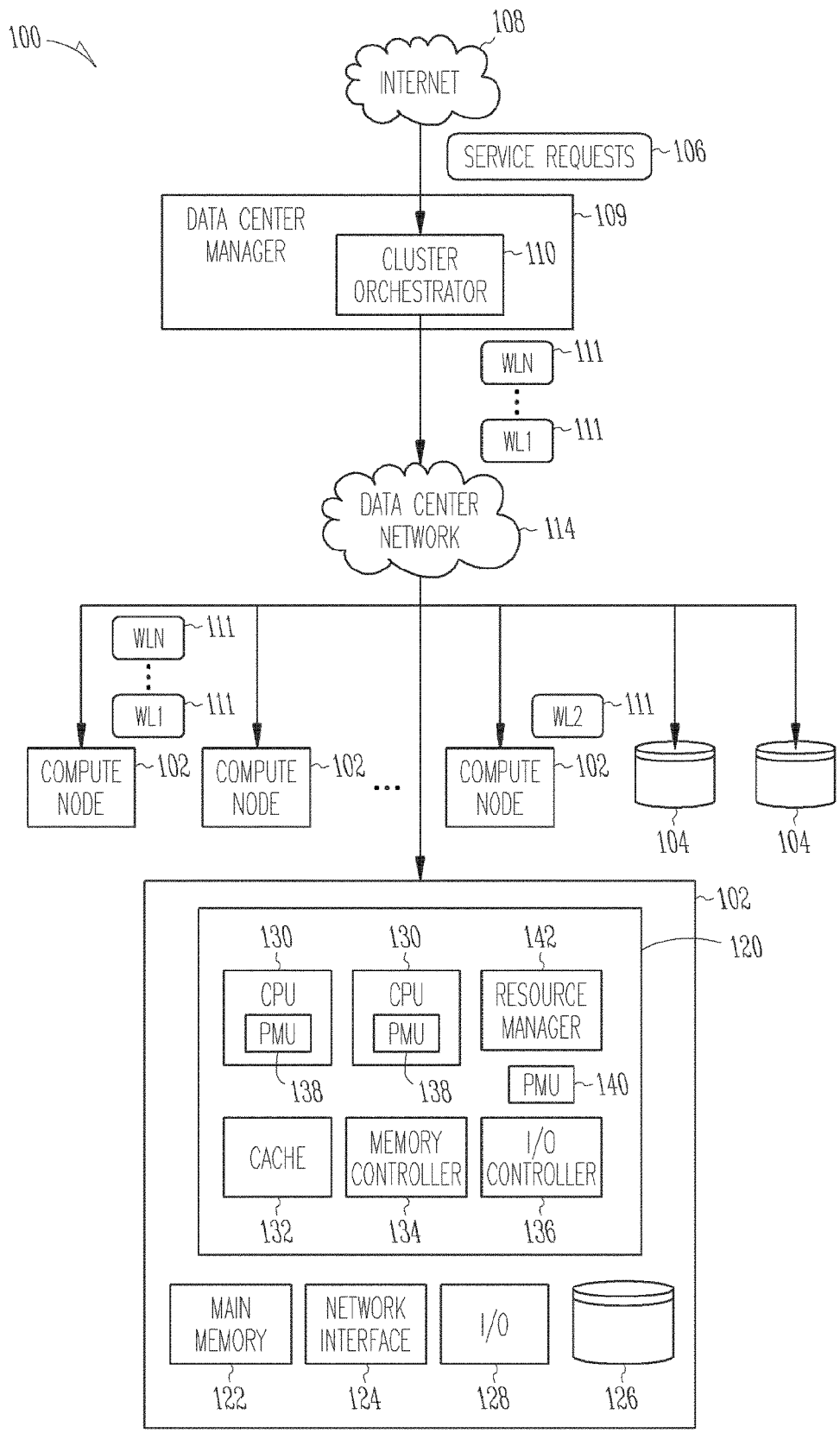
FIG. 1 is a block diagram illustrating an example data center in accordance with various embodiments.

Described herein are various approaches to efficiently allocating hardware resources in data centers while maintaining SLA compliance. Such resource allocation is not a trivial problem. Application performance (e.g., as measured in transactions per second or similar high-level metrics) cannot be directly derived from metrics commonly used to characterize processor capabilities (such as the number of cores, clock rate, cache size, number of memory channels, etc., also sometimes referred to as processor "speeds and feeds") and resource availability (such as, e.g., compute availability and free memory capacity). Thus, conventional cluster schedulers, which distribute workloads (such as functions, containers, etc.) among the compute nodes within a data center primarily based on compute availability and free memory capacity, often cause suboptimal placement with heavy contention of shared resources in the platform. Multiple functions competing for shared resources like cache and memory can create noisy-neighbor issues and degrade the performance of the application considerably (e.g., in some pathological scenarios, up to 500%). A current trend towards microservices adds another layer of complexity to resource allocation. In applications built from tens or hundreds of microservices, providing a specified end-to-end performance involves configuring each individual microservice, e.g., in terms of the number of replicas, CPU cores, allocated memory bandwidth, and so on. This is a challenging problem, given the potentially very large configuration space, and existing manual configuration approaches tend to be time-consuming (especially if exhaustive) and/or suffer from sub-optimal results.

Given these challenges, SLA compliance is currently commonly achieved by overprovisioning, and thus underutilizing, data center resources. It is not unusual, for example, that resource utilization stays below 30%. This gross underutilization increases the capital investment operators make in their infrastructure as compute nodes and network resources are added to support a computational task of a given size, and also increases operational spending, as managing the added infrastructure adds to space, power, and cooling expenses. Data center operators are thus left with a tradeoff between SLA compliance and efficient resource utilization to minimize the total cost of ownership (TCO). Described herein below are various approaches to improving this tradeoff.

In one aspect, a performance guarantee under the SLA as expressed in an application-level SLO is mapped onto a new, hardware-level SLO (hereinafter also "hardware SLO") that a processor can understand and act on. While the application-level SLO specifies the target value (herein understood as a minimum desired performance) of an application performance metric (hereinafter also "application SLO metric"), the hardware SLO constitutes the target value for a measurable processor performance metric (hereinafter also "hardware SLO metric") that is directly related to the application SLO metric, allowing the hardware-level SLO to be derived from, and serve as a proxy for, the application-level SLO. For example, in various embodiments, the hardware SLO is specified in cycles per instructions (CPI) or its inverse, instructions per cycle (IPC), which can be directly translated to the application performance as measured, e.g., in transactions per second.

For a given workload to be executed by a processor (or processor core) of an assigned compute node, the hardware SLO may be communicated to the processor (core) along with the instructions making up the workload as part of the instruction set. During execution of the workload on the processor (core), the processor then uses the hardware SLO as the target, or setpoint, of the SLO metric in a feedback control loop for dynamically allocating microarchitecture resources associated with the processor, such as, e.g., last level cache or main memory bandwidth. Resource allocation may involve optimizing for a certain goal specified in an optimization policy (e.g., throughput or fairness), subject to meeting the hardware SLO.

A hardware SLO such as a target CPI, along with intelligence in the processor hardware to support it, provides an interface between software and hardware for establishing a reliable performance contract. Instead of depending on the speeds and feeds of the processor, which have varying impacts on the application performance, the hardware-SLO-based interface provides application users and developers with a specified processor performance that can be translated into a desired application performance. This performance guarantee avoids the need for the cluster orchestration software to be cognizant of the underlying hardware capabilities (e.g., cache size, memory bandwidth, etc.) and their impact on performance in a multicore environment. Instead of manually allocating microarchitecture resources via the orchestration software interface, resource allocation is left up to the hardware at the processor level. Importantly, tying the performance guarantee to a directly measurable and actionable processor performance parameter significantly reduces the need for overprovisioning to meet the SLA, and thus lowers the TCO.

In a second aspect, efficient workload placement and resource allocation are aided by an understanding of the sensitivity of application performance to shared-resource contention. Resource contention is a conflict over access to shared resources, and is a dominant contributor to "performance jitter"— the variability in application performance, relative to a baseline performance in the absence of resource contention—and the resulting tail latency. An understanding of performance sensitivity is obtained, in accordance with various embodiments, using a computational (e.g., machine-learned) model that mimics the hardware behavior of a compute node to predict performance jitter for a workload of interest, hereinafter "the primary workload," given the resource requirements associated with the primary workload and the resource availability at the compute node in the presence of one or more "background workloads" that compete with the primary workload for shared resources. The model can be created from labeled training data obtained by running various primary workloads and various combinations of background workloads to determine their associated resource requirements and resource availabilities, and measuring the performance jitter (constituting the labels) under different collocation scenarios between the primary and background workloads. During subsequent deployment, the trained model can predict the application performance of the primary workload for multiple workload placement and resource allocation scenarios by operating on input representing the resource requirements measured for the primary workload and the resource availability measured given the actual background workloads at that time for each scenario. As such, the model, along with the measured resource requirement and resource availability inputs it operates on, acts as a "workload signature" that expresses the relationship of potential performance jitter to the shared resources that are responsible for the variability in performance. The predictive capability of the workload signature can be utilized both at the cluster level for workload placement and at the node level for resource allocation.

In a third aspect, efficient resource allocation for an application including a number of microservices is achieved by optimizing configurations for every microservice in the end-to-end execution pipeline of an application. The optimization may be performed automatically by testing configurations on the platform and measuring the resulting performance. In some embodiments, a Bayesian optimization algorithm is utilized to explore the space of potential configurations efficiently and determine a Pareto front of configurations within a limited number of iterations. Given the Pareto front, an optimal configuration can be selected upon instantiation of the application and/or repeatedly thereafter based on current throughput rates.

Having provided an overview of various aspects of efficient resource allocation in data centers, illustrative embodiments will now be described with reference to the accompanying drawings.

FIG. 1 is a block diagram illustrating an example data center 100 in accordance with various embodiments. The data center 100 generally includes one or more clusters of devices, called nodes 102, 104, that provide various hardware resources for servicing requests 106 received at the data center 100 via a communication network such as the Internet 108. The service requests 106 may be or include, for example and without limitation, web requests for content, database requests, or computational workloads associated with an application hosted in the data center 100. The nodes 102, 104 may all be of the same type, or may differ in the primary function. For instance, as shown, the data center 100 may include compute nodes 102 for handling computational workloads, and storage nodes 104 for hosting data, e.g., as organized in databases. Further, the data center 100 may include pooled memory (not shown), accessible by the compute nodes 102, that supports data-intense applications by minimizing access latency and enabling in-memory processing, and/or pooled hardware accelerators (not shown), such as graphic processing units (GPUs), field-programmable gate arrays (FPGAs), application-specific integrated circuits (ASICs), or other special-purpose processors for performing certain routine, but computationally expensive computing tasks.

The data center 100 further includes one or more nodes serving (collectively) as a data center manager 109, which includes, as a sub-component, a cluster orchestrator 110. The cluster orchestrator 110 assigns the service requests 106 received by the cluster manager, and assigns them to a suitable node 102, 104 for processing. In some cases, processing a request can be broken down into multiple workloads 111, which may be handled by multiple nodes 102, 104; in other cases, the request is processed as a single workload. Node assignments may be based on the type of request (e.g., whether it is a database request or computational workload) and on which node(s) an application, database, or the like at which the request 106 is directed is located. Further, as between a set of nodes 102, 104 all in principle adapted to handle a given workload 111 (e.g., by virtue of running an instance of an application associated with the request), node assignments are generally based on current resource consumption and free capacity at each node. The cluster orchestrator 110 generally has knowledge of SLAs applicable to the services hosted in the data center; these SLAs may specify, e.g., minimum throughputs of requests, maximum latencies for processing individual requests, and the like. In addition, the cluster orchestrator 110 may operate under a given optimization policy or policies that define overall criteria and goals for resource allocation in the data center 100. When scheduling workloads 111 on the cluster, the cluster orchestrator 110 attempts to optimize resource allocation at the cluster level in accordance with the policy and subject to compliance with the SLA. The cluster orchestrator 110 usually fulfills additional, ancillary functions to meet its optimization goals and SLA requirements, including monitoring performance and scaling hardware resources utilized by a given service based on demand (e.g., the number of requests received per second) by instantiating replica of the respective application, database, etc. as needed.

The hardware resources used to service requests (e.g., nodes 102, 104) communicate with each other and with the cluster orchestrator 110 via an internal, often private communication network 114 of the data center 100 (herein also "data center network"). The data center network 114 may be implemented, e.g., as a wired or wireless local area network (LAN), e.g., using network technologies and protocols such as Ethernet, Bluetooth, Wi-Fi, etc., or as a wired or wireless wide area network (WAN) or even global network (such as the Internet), e.g., using cellular network technology, optical fiber connections, or circuit-switched telephone lines. The data center network 114 may include networking hardware such as routers and switches.

The compute nodes 102 may generally be implemented by any computing device capable of performing computational functions to process the assigned workloads, including, without limitation, rack-mounted servers, blade servers, personal computers (PCs) such as desktop or laptop computers, or even mobile devices or other consumer electronic devices with compute capabilities. As shown in the detail view provided for one of the compute nodes 102, each compute node 102 generally includes one or hardware processors 120 and main memory 122 (e.g., random access memory (RAM)), as well as a network interface 124 to facilitate communication via the data center network 114. The memory 122 may store the operating system running on the compute node 102, and any applications executed on the node 102. Optionally, the compute node 102 may also include one or more non-volatile data storage device(s) or media 126 (e.g., flash drive and flash memory, hard drive and hard disk, or optical disk drive and compact disk (CD) or digital versatile disk (DVD)), and/or input/output devices 128 (e.g., printer, keyboard and mouse, speaker and microphone, etc.).

Each hardware processor 120 may include one or more central processing units (CPUs) 130, also referred to as (processor) cores, as well as an uncore including, e.g., last-level cache (LLC) 132 (e.g., L3 cache), a memory controller 134, input/output controllers (136), power management circuitry (not shown), and/or other components, as well as processor interconnects (not shown) (e.g., in some embodiments, an Intel® Ultra Path Interconnect (UPI) or Compute Express Links (CXL)) that facilitate communication between the cores 130 and the components of the uncore. Collectively, the cores 130 and uncore components form the microarchitecture of the processor. In multicore processors, various of the microarchitecture resources, such as the LLC 132 and memory bandwidth available to the processor 120 for accessing main memory 122, may be shared between multiple cores 130. Thus, different workloads 111 executed on different cores 130 will generally compete for these resources and may, as a result, experience resource contention. Further, the CPUs 130 may support multithreading, in which case multiple workloads 111 can be executed in parallel on a single core 130, sharing the resources of the instruction pipeline of the core 130.

To facilitate resource allocation at both the cluster and the compute-node level, the processors 120 are, in accordance with various embodiments, equipped with microarchitecture resource monitoring and allocation capabilities. For example, to monitor processor performance metrics, the cores 130 may each include a performance monitoring unit (PMU) 138. An additional PMU 140 may determine performance metrics of the uncore or the processor 120 at large. The PMUs 138 of the individual cores 130 may employ one or more hardware performance counters to monitor the flow of instructions through the core 130. These counters may include, e.g., clock cycles, instructions issued, instructions retired, cache misses, and the like, and may be fixed-function or programmable counters or a combination thereof. Similarly, the PMU 140 of the uncore may implement a number of fixed-function or programmable hardware performance counters, e.g., monitoring cache memory accesses and cache misses or amounts of data transferred. The PMUs 138, 140 may be accessible by software via a suitable kernel interface of the operating system (e.g., as available in Linux kernels).

In addition to providing monitoring capabilities via the PMUs 138, 140, the processors 120 may each include a resource manager 142 that facilitates enforcing certain resource allocations. For example, certain Intel® Xeon® processors are provided with a Resource Director Technology (RDT) feature set that allows monitoring (e.g., using the PMUs 138, 140) and controlling the allocation of microarchitecture resources such as LLC and memory bandwidth per application, container, or even thread. In accordance with various embodiments, the resource manager 142 is "intelligent" in the sense that it augments and enhances such RDT (or similar) capabilities by incorporating a feedback control mechanism that uses a hardware SLO, e.g., specified in CPI, as the setpoint, and/or a workload signature that maps the hardware SLO to allocations of usually multiple microarchitecture resources in a holistic manner.

Various advanced, intelligent resource allocation mechanisms that operate at node and/or cluster level will now be described in more detail.

Hardware SLO

A conventional approach to resource allocation in data centers to meet an application-level SLO, such as a specified minimum throughput value (e.g., measured in the number of transactions per second) or a specified maximum latency associated with servicing a request (e.g., measured in milliseconds), involves estimating the hardware resources needed to achieve the application-level SLO with high probability, and scheduling workloads on compute nodes based on their processor speeds and feeds (e.g., number of cores, clock rate, cache size, number of memory channels) and current resource availability (e.g., available cache size, available memory channels) to allocate sufficient resources at least initially. Further, to maintain application performance once a node has been assigned to the workload, the node may be monitored for any changes to the resources available for the workload, e.g., as reflected in cache misses or other indicators of resource contention, and appropriate readjustments may be made to maintain or restore the desired performance under the SLA. This approach does not take interdependencies between shared resources into account, and inherently relies on allocating more resources than are needed on average to meet the desired application performance (e.g., as captured in an application-level SLO), as the application performance, though increasing in general with increasing resource allocation, cannot be directly derived from processor speeds and feeds. Conventional resource allocation, thus, is not optimized for efficiency in resource utilization, and may result in overprovisioning, SLA violations, or sometimes both.

To facilitate more efficient resource allocation while still being able to provide application performance guarantees, various embodiments utilize a hardware SLO for a metric that is measurable and actionable by the processor as a direct proxy for application performance. Data center operators and/or third-party service providers running their applications on the data center map their application-level SLO to the hardware SLO, which is then communicated to the selected compute node and utilized by the processor, e.g., as the setpoint in a feedback control loop, or as input to a model for computing optimized resource allocations.

In some embodiments, the hardware SLO is a target value of CPI or IPC. Typical application-level SLOs, such as a benchmark metric like transactions per second, can be straightforwardly translated into a maximum time allotted for the completion of a certain task, such as an individual transaction. Further, the instruction path length associated with the transaction or other task, that is, the number of machine code instructions executed to perform the task (such as to complete one transaction), can be readily determined. Multiplying this instruction path length, which is constant across different execution scenarios, by the CPI and the clock rate of the processor, which may vary between different execution scenarios, yields the actual execution time for the program section. Accordingly, for a given clock rate, the desired upper limit for the task execution time relates directly to a corresponding upper limit of the CPI. This upper CPI limit, optionally adjusted by a "safety" margin, can be used as the target CPI, serving as a hardware SLO. In multithreaded execution scenarios, the application-level SLO may be mapped to individual CPIs for each thread, which are then handed down from the cluster orchestrator to the processor hardware for enforcement.

Figure 2A:
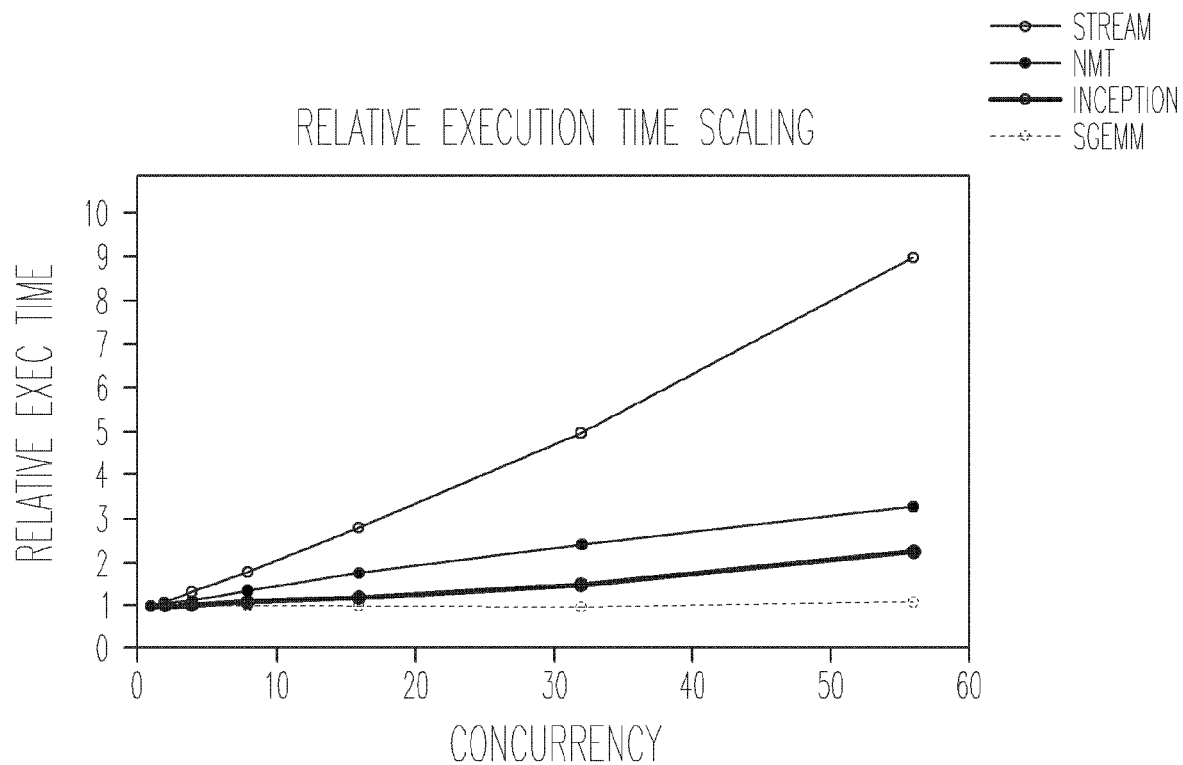
FIGS. 2A and 2B are graphs showing performance variability and associated variability in execution time and cycles per instruction (CPI), respectively, for multiple applications, illustrating that CPI can serve as a proxy for application performance, in accordance with various embodiments.
Figure 2B:
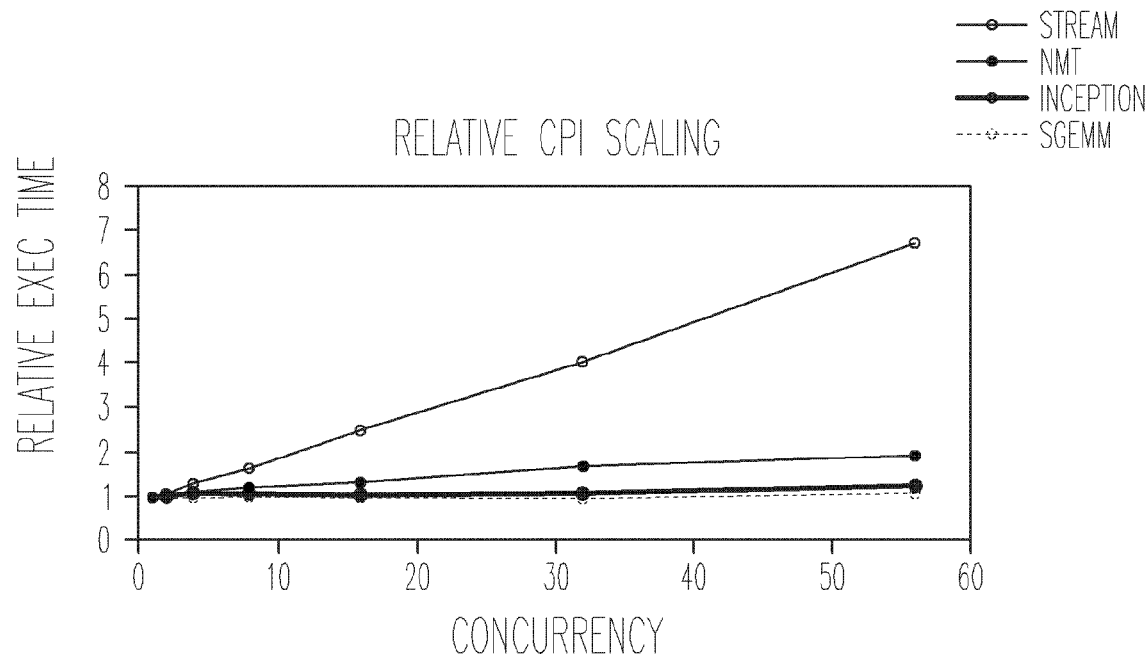

FIGS. 2A and 2B are graphs showing performance variability and associated variability in execution time and cycles per instruction (CPI), respectively, for multiple applications. These applications include a single-precision general matrix multiplication (SGEMM) program, a neural machine translation (NMT) program, a streaming application, and a neural-network model used for image recognition (Inception), and as such capture a variety of different program tasks. FIG. 2A shows the relative execution time for these programs (along the ordinate) for various levels of resource contention as captured in the number of application instances concurrently running on multiple threads in a processor (along the abscissa). FIG. 2B shows the corresponding relative CPI (along the ordinate) as a function of the level of resource contention. As can be seen, execution time and CPI are directly proportional, which empirically confirms that CPI is a suitable proxy for application performance.

Figure 3:
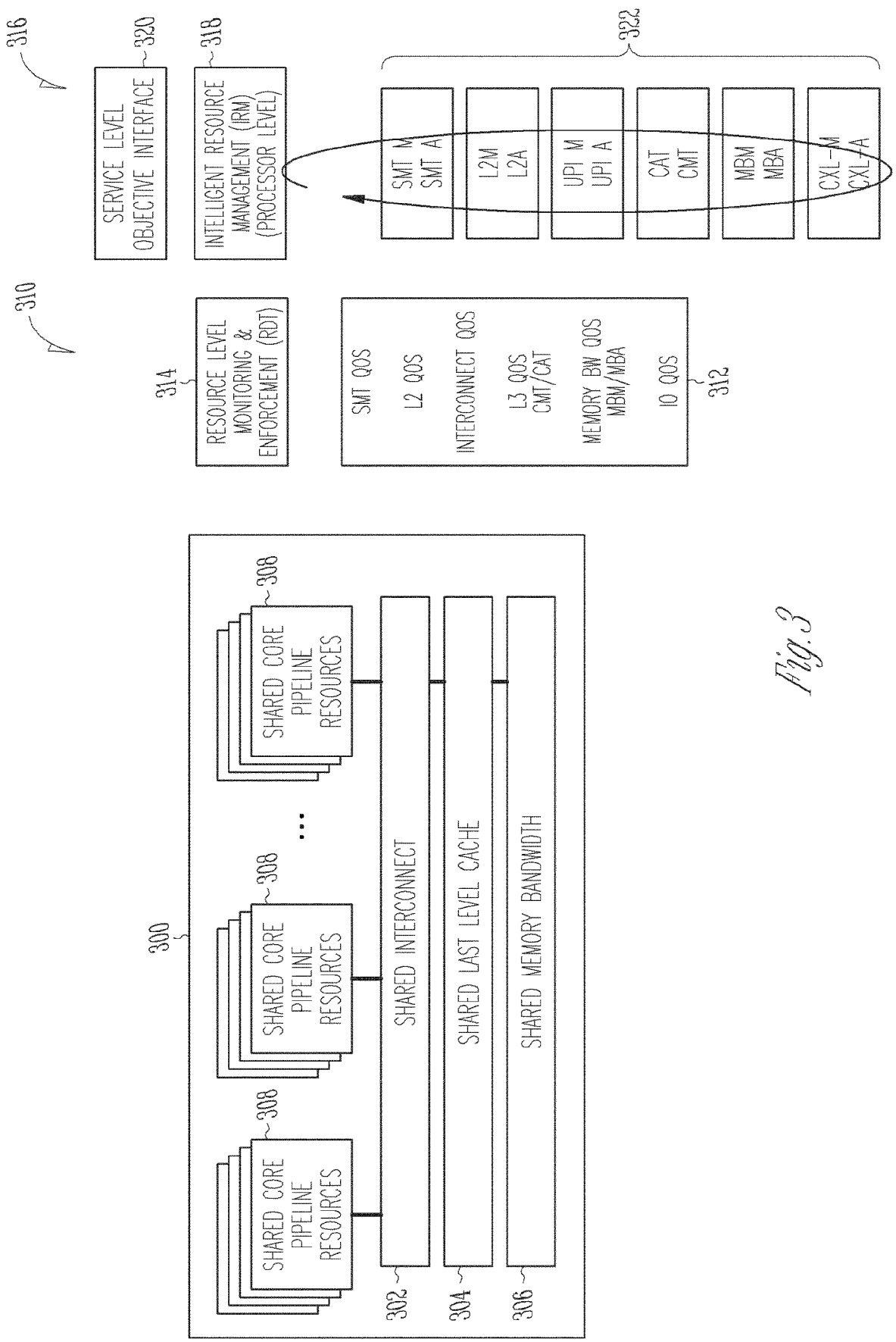
FIG. 3 is a block diagram conceptually illustrating shared resource management in accordance with various embodiments.

FIG. 3 is a block diagram conceptually illustrating processor-level shared resource management in accordance with various embodiments. As depicted, the processor 300 may include multiple microarchitecture resources that can be shared between different workloads. These shared resources include, for example, the processor interconnects 302, LLC 304, and memory bandwidth 306 of the uncore, which are shared between multiple processor cores and, thus, between workloads run on the different cores, as well as core pipeline resources 308 within each of the cores (including, e.g., L2 cache), which may be shared between multiple threads in multithreaded execution scenarios.

At a first level 310 of resource management, utilization of various microarchitecture resources 312 may be monitored, and specified allocations of these resources 312 may be directly enforced at the resource level, e.g., using RDT 314 or similar capabilities, to meet quality-of-service (QoS) specifications. RDT supports monitoring and allocation of shared core pipeline resources in simultaneous multithreading (SMT), L2 and L3 cache, interconnects, memory bandwidth (BW), and shared uncore resources associated with input/output (TO) such as IO-generated cache and memory bandwidth (collectively resources 312).

At a second, higher level 316, intelligent resource management (IRM) 318 is applied to the processor as a whole to enforce a given application-level SLO, via mapping to a hardware-level SLO (e.g., CPI), by controlling allocation of microarchitecture resources 322 so as to meet the hardware-level SLO. Note that, in contrast to RDT 314, which exposes the monitoring and allocation features directly to the cluster orchestration software, IRM 318 manages resources internally to meet the hardware-level SLO, and exposes the SLO interface 320 to the software, thereby providing an SLO contract between software and hardware. IRM 318 generally involves some joint mapping from the hardware SLO to target allocations of the individual shared microarchitecture resources 322. In some embodiments, explained in more detail below, a workload signature that captures the sensitivity of the application's CPI (or other hardware SLO metric) to various microarchitecture resources is used to achieve this mapping. In some instances, one or a few resources may dominate in their effect on CPI, and in that case, monitoring and actively controlling allocation of the relevant resource(s) may suffice.

Joint management of the shared resources may be carried out in accordance with an optimization policy that characterizes the overall system goal separately from and additionally to the hardware SLO. Various possible optimization policies include: differential resource allocation across priority groups ("feudalist" mode); effective resource allocation to provide predictive performance ("deterministic" mode); resource partitioning and fair resource allocation across applications ("fairness" mode); resource allocation to maximize the total benefit for an aggregate group ("utilitarian" mode); and free-for-all, unregulated resource allocation ("capitalist" mode). A deterministic policy may involve strictly enforcing a CPI or IPC, e.g., for a latency-sensitive application, whereas other polices may apply in situations where merely best efforts to meet the SLO are required. The system-level optimization policy may be communicated to the processor in addition the application-specific hardware SLOs, and the processor optimizes resource allocation to comply with both.

To illustrate hardware-SLO-based resource allocation at a simple example, consider control of memory bandwidth allocation to achieve a specified CPI under a deterministic optimization policy. Such control can be achieved, for instance, using a MID controller, implemented alternatively in software or directly in the processor hardware (e.g., as part of the resource manager 142 in the uncore of processor 120). When implemented in software, the PID controller receives measured CPI values from the processor, and sends memory bandwidth targets to the processor as a control input.

Figure 4A:
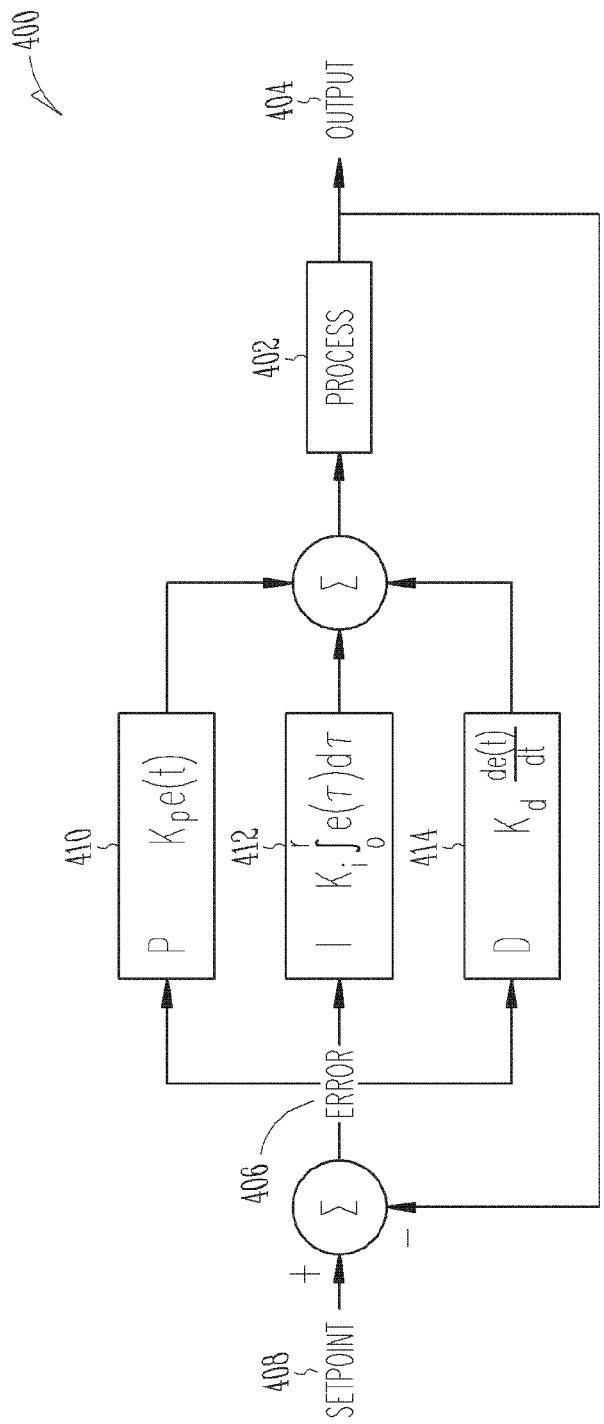
FIG. 4A is a schematic diagram of a proportional-integral-derivative (PID) controller as may be used to provide a hardware SLO guarantee in accordance with various embodiments.

FIG. 4A is a schematic diagram of PID controller 400 as may be used to provide a hardware SLO guarantee in accordance with various embodiments. The ND controller 400 controls a process 402 (here, memory bandwidth allocation) using an output 404 of the process, called the "process variable" (here, a measured CPI), as feedback. More specifically, the ND controller 400 continuously computes an error valuee (t) 406 as the difference between the process variable (output 404) and a setpoint 408 (here, the CPI target that serves as hardware SLO), and adjusts a control variable (here, the allocated memory bandwidth) based on proportional, integral, and derivative correction terms 410, 412, 414 derived from the error value 406. The proportional term 410 is proportional to the error value 406; the integral term 412 accounts for the error history by integrating error values 406 over time; and the derivative term 414 accounts for a future error trend via the rate of change of the error value 406. The PID controller 400 tries to minimize the error value 406 using a weighted sum of these three corrective terms 410, 412, 414, with weights $K_p$, $K_i$, and $K_d$ tuned to generate the optimal control function.

Figure 4B:
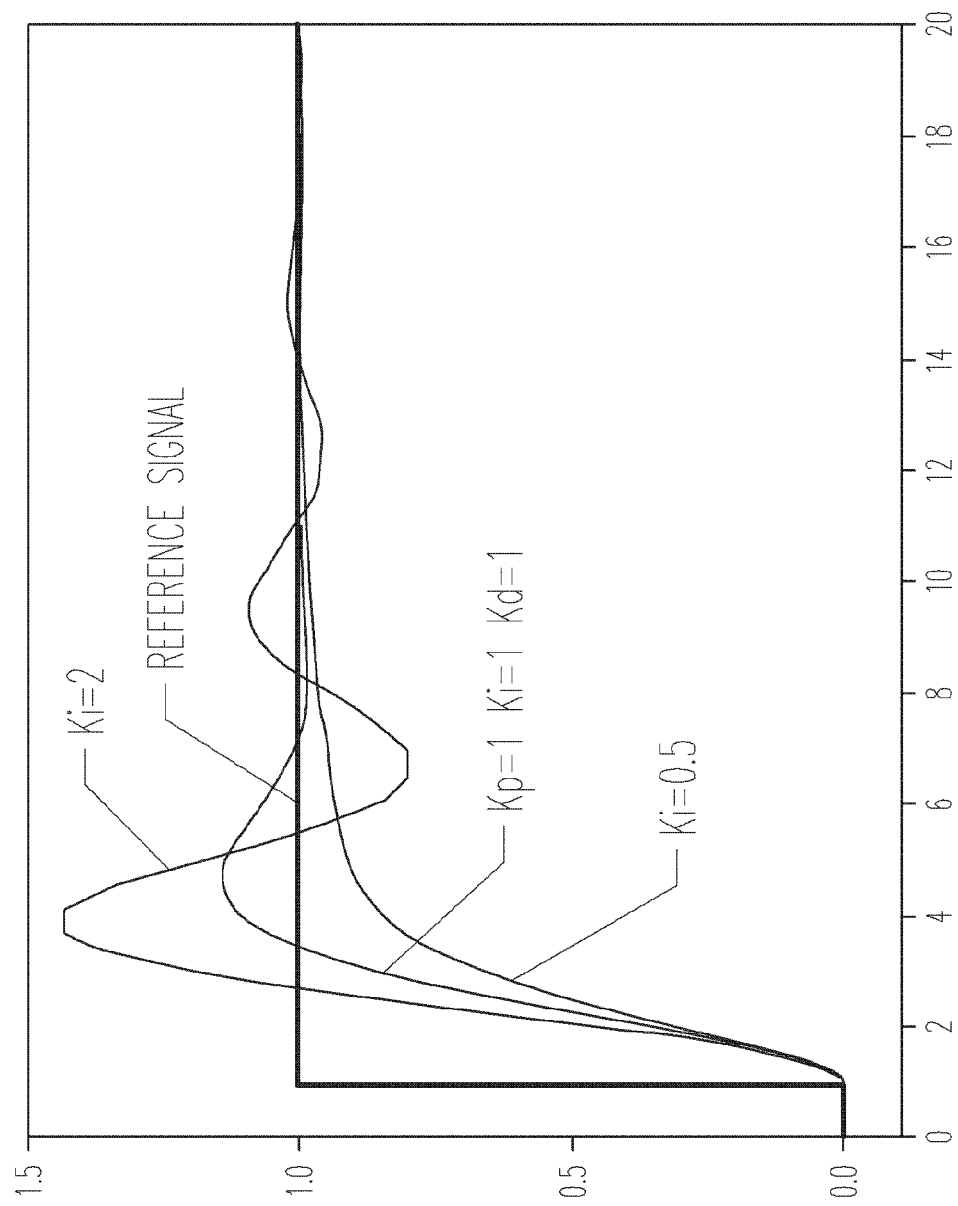
FIG. 4B is a graph illustrating the general behavior of a ND controller as shown in FIG. 4A.

FIG. 4B is a graph illustrating the general behavior of a ND controller 400 as shown in FIG. 4A. The response of the process variable (whose value is plotted as a function of time) to a step change in the setpoint (represented by the reference signal) is plotted for three values of $K_i$, with $K_p$ and $K_d$ each held constant at 1. Higher values of $K_i$, corresponding to a greater contribution of the integral term to the correction applied to the process variable, can cause the process variable to approach the setpoint faster, but, as can be seen, at the cost of initial overshooting, whereas lower values of $K_i$ can achieve a smooth approach of the process variable to the setpoint.

Figure 4C:
FIG. 4C is a graph illustrating the CPI variability of a single streaming application executed alone on a multicore processor in one example.
Figure 4C:
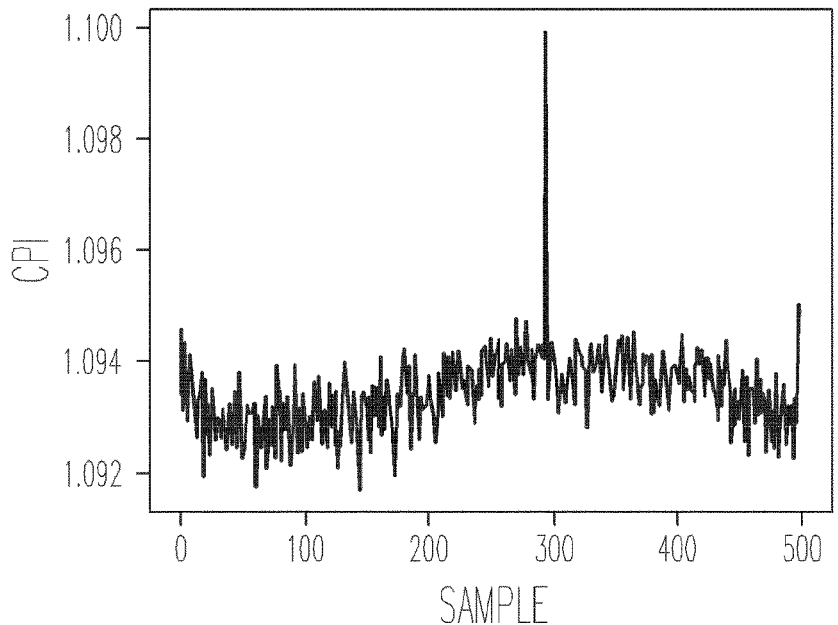
Figure 4D:
FIG. 4D is a graph illustrating CPI variability of two streaming applications executed simultaneously on different sets of processor cores of a multicore processor without hardware-SLO enforcement in one example.
Figure 4D:
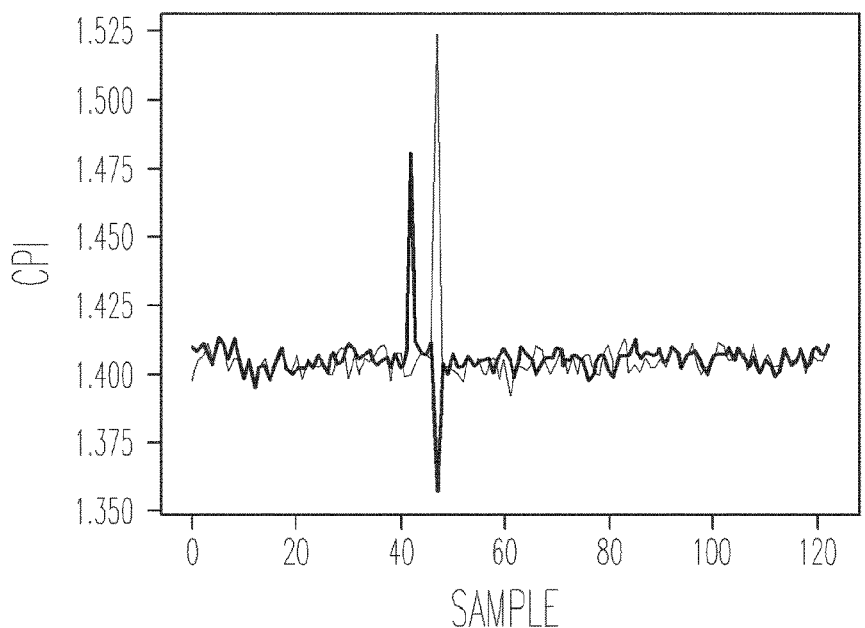
Figure 4E:
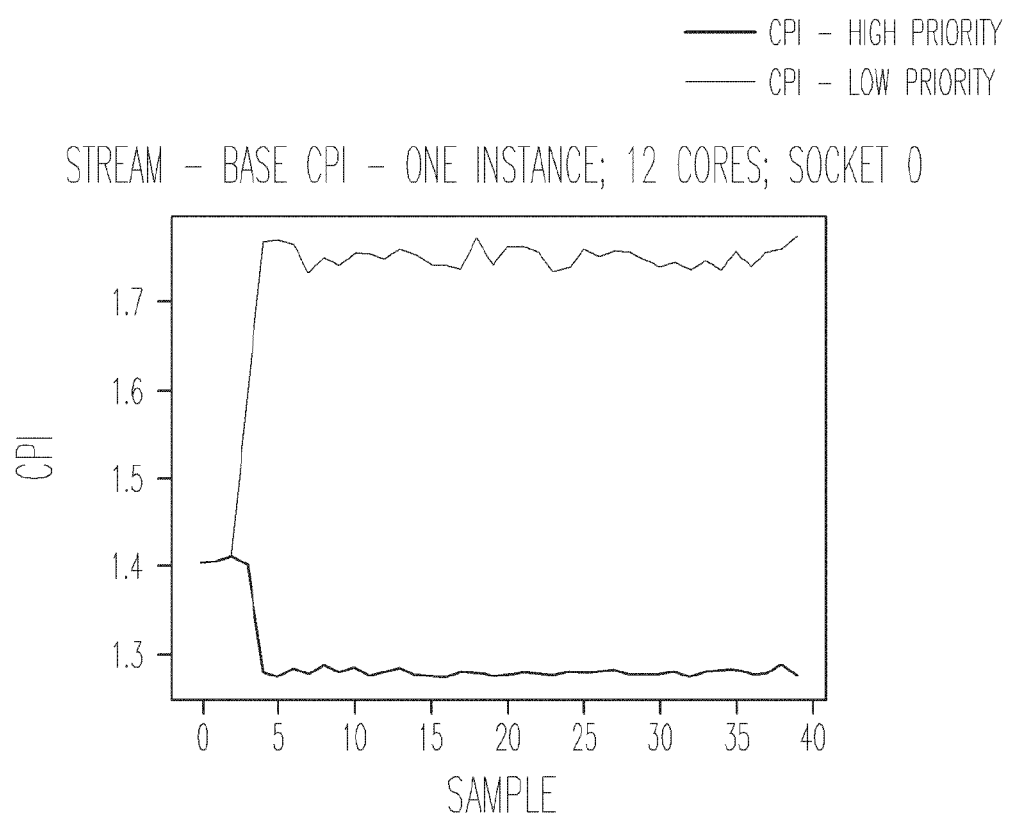
FIG. 4E is a graph illustrating CPI variability of two streaming applications executed simultaneously on different sets of processor cores of a multicore processor with hardware-SLO enforcement using a ND controller as shown in FIG. 4A, in accordance with various embodiments.

FIGS. 4C-4E collectively illustrate the effect of hardware SLO enforcement with a PID controller as shown in FIG. 4A for streaming applications running on different sets of twelve cores each of a multicore processor. The hardware SLO is specified in CPI, and the memory bandwidth allocation is used as the control variable to achieve the target CPI value.

FIG. 4C is a graph illustrating the CPI variability of a single instance of a streaming application executed alone on the multicore processor. As can be seen, with the exception of one outlier (at around sample 290), the CPI is stable at around 1.09.

FIG. 4D is a graph illustrating CPI variability of two instances of the streaming application, executed simultaneously on different sets of processor cores of the multicore processor without hardware-SLO enforcement. In this case, the CPIs for both application instances are the same at about 1.41 (again, with the exception of an outlier), which is significantly higher than for execution of one instance alone, reflecting resource contention.

FIG. 4E is a graph illustrating CPI variability of the two instances of the streaming application, executed simultaneously on different sets of processor cores of a multicore processor with hardware-SLO enforcement using a PID controller as shown in FIG. 4A. One of the instances was designated as high-priority, with a target CPI (or setpoint) of 1.25. As can be seen, the PID controller quickly achieved that setpoint for the high-priority application. The CPI of the other, low-priority application stabilized at about 1.75, much higher than not only the CPI of the low-priority application, but also the CPI resulting from running both instances simultaneously without any hardware SLO enforcement. FIG. 4E thus illustrates that resource allocation, in this case of only a single microarchitecture resource, can indeed be controlled to achieve a specified hardware SLO in terms of CPI.

PID-based control of resource allocation to achieve a hardware SLO can be extended from a single control variable to multiple control variables, corresponding to the joint allocation of multiple resources (e.g., both memory bandwidth and LLC), using a modified PID controller known to those of ordinary skill in the art as a Multiple Input Multiple Output (MIMO) PID controller. Alternatively, different types of controllers can be employed to enforce the hardware SLO. For example, in some embodiments, a machine-learning model, such as a neural network or regression model, may operate on input comprising, for instance, various performance metrics (e.g., the target CPI) and/or resource utilization metrics (e.g., bandwidth or cache used by other resources), optionally in conjunction with an overall system policy, to make resource allocation decisions.

Figure 5:
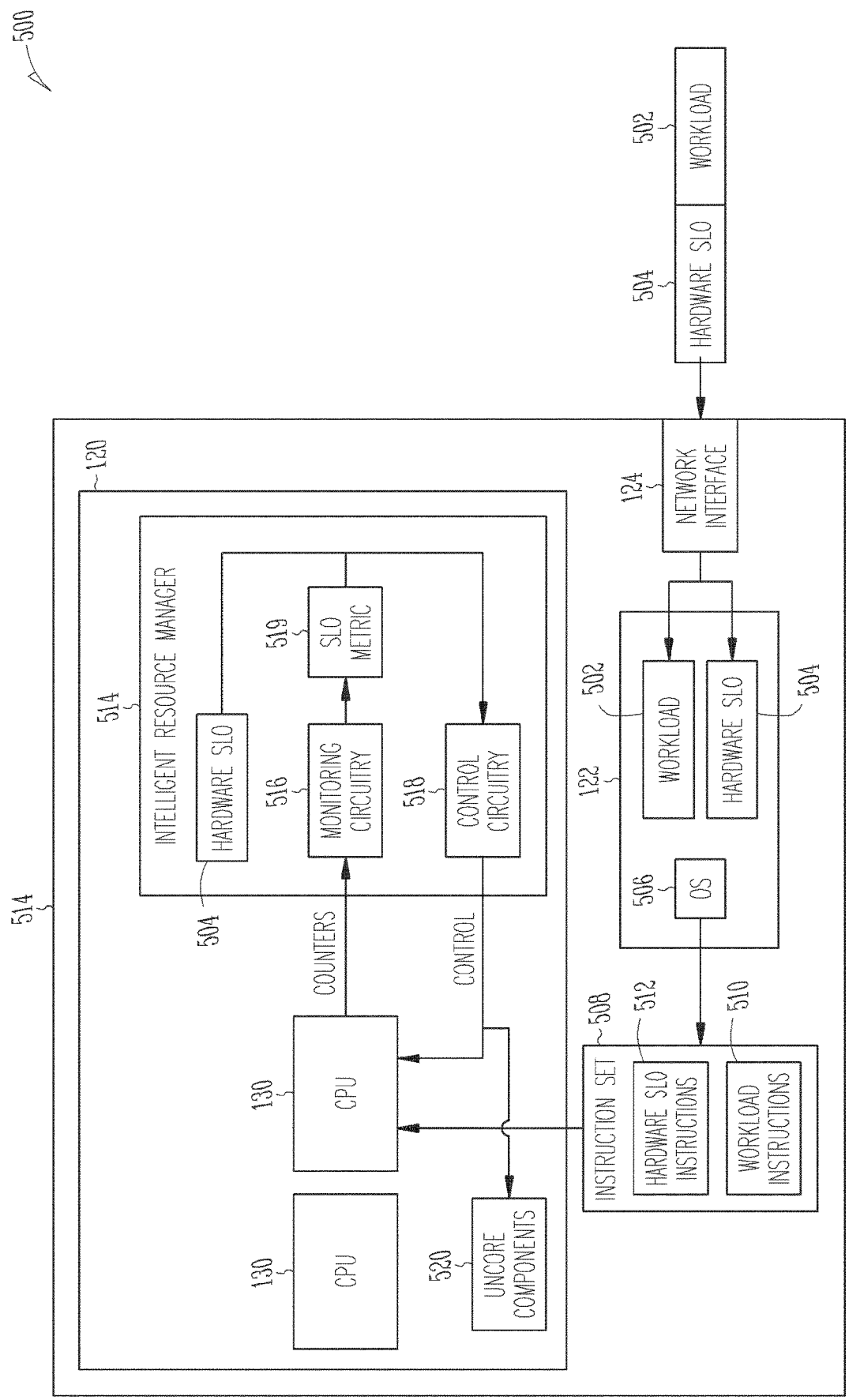
FIG. 5 is a block diagram of an example compute node providing a hardware SLO interface, in accordance with various embodiments.

FIG. 5 is a block diagram of an example compute node 500 (e.g., corresponding to node 102 of data center 100 shown in FIG. 1) providing a hardware-SLO interface, in accordance with various embodiments. The compute node 500 may receive a workload 502, e.g., from the cluster orchestrator 110, via its network interface 124. Along with the workload 502, the compute node 500 may receive a CPI target or other hardware SLO 504 that the compute node should meet when processing the workload 502. The compute node 500 stores the received workload 502 and the hardware SLO 504 in memory 122. In addition, the compute node 500 may store an optimization policy that specifies a system-level goal (not shown), as may have been received, e.g., from the cluster orchestrator 110 at a previous time. Since the system-level optimization goal applies across applications, it may be provided to the compute nodes only once, or at least less frequently than the SLOs associated with workloads. The operating system 506 (also stored in memory 122) is configured such that, when scheduling the workload 502 on the processor 120, it sends an extended instruction set 508 to the processor 120 that includes, in addition to the machine-code instructions 510 of the workload, an instruction 512 specifying the hardware SLO. This instruction 512 causes the processor core 130 that receives and executes the instruction set 508 to communicate the hardware SLO 504 to an intelligent resource manager 514, which may be located in the uncore of the processor 120.

The intelligent resource manager 514 may include monitoring circuitry 516 for monitoring the workload execution performance and control circuitry 518 for adjusting the allocation of the microarchitecture resources accordingly. The monitoring circuitry 516 computes, based on various counters reported by the PMUs 130, 140 (not shown in FIG. 5) of the core 130 and/or the uncore, a value of the hardware SLO metric 519. For example, for an SLO specifying a target CPI, the monitoring circuitry 516 may compute the actual CPI value based on clock cycles, instructions issued, and/or instructions retired as reported by the core 130. Using the computed SLO metric 519 (e.g., actual CPI) and the hardware SLO 504 (e.g., target CPI) as input, the control circuitry 518 determines allocations of the various microarchitecture resources (e.g., of the cores 130 and uncore components (collectively 520)), and provides them as control signals to the relevant components.

Figure 6:
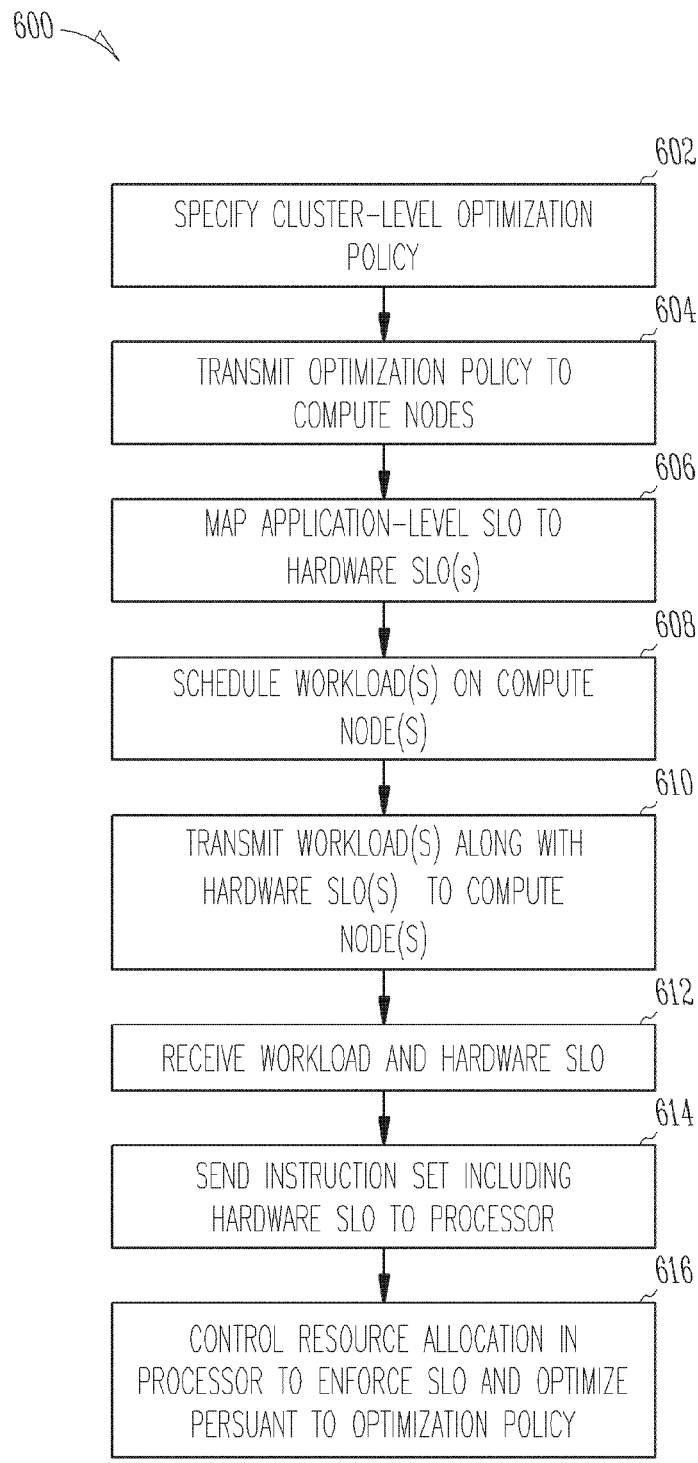
FIG. 6 is a flow chart of an example method for allocating microarchitecture resources on a compute node to enforce an SLO, in accordance with various embodiments.

FIG. 6 is a flow chart of an example method 600 for allocating microarchitecture resources on a compute node to enforce an SLO, in accordance with various embodiments. The method 600 involves a number of actions taken at the cluster level, e.g., by the cluster orchestrator 110 or a related component of the data center manager 109, and a number of actions taken at the processor level by the individual compute nodes 102. Actions at the cluster level include, e.g., preceding the scheduling of individual applications, specifying a cluster-level optimization policy with an overall optimization goal (602) to be achieved collectively by all compute nodes when running applications on the cluster, and transmitting the optimization policy to the compute nodes (604). Further, in response to a new application to be scheduled, actions at the cluster level include mapping the application-level SLO to one or more hardware-level SLOs (606), scheduling one or more workloads constituting the application on the compute nodes of the data center (608), and transmitting the workload(s), along with their associated hardware SLO(s), to the assigned compute nodes 102 (610). If the application is broken up into multiple workloads to be potentially executed on different compute nodes, the mapping in act 606 may involve determining a hardware SLO (e.g., CPI) for each individual workload, in a manner such that compliance with the hardware SLOs of all workloads achieves the overall application-level SLO. In general, the mapping between application-level and hardware-level SLOs may be performed manually (e.g., by a data center operator), or automatically by a software mapping tool that analyzes the application code to translate the application-level SLO, e.g., based on instruction counts, to the hardware SLO.

Each individual compute node, upon receiving the workload and hardware SLO (at 612), sends an instruction set including the hardware SLO, in addition to the workload instructions, to the processor (614). The processor, when executing the workload, controls allocation of its microarchitecture resources to comply with the SLO and optimization policy (616). As explained above, such control may involve execution of a feedback control loop (e.g., using a ND or MIMO PID) to tune resource allocation until a measured SLO metric (e.g., measured CPI) meets the SLO (e.g., the CPI target), or operating a computational model to map the SLO onto resource allocations that will achieve the SLO.

Workload Signature

Cluster orchestration generally involves some use of telemetry metrics gathered from the nodes within the data center to inform workload placement. In one conventional approach, implemented, e.g., by current Kubernetes schedulers, available compute and memory capacity serve as the telemetry metrics that affect the filtering and ranking of nodes available for placement during the scheduling decisions. Relying on these two metrics alone, however, fails to take into account other shared resources (such as, e.g., LLC and memory bandwidth) on the platform that can have a first-order impact on the application performance. Even if a scheduler were to have knowledge of all the resource availabilities at the microarchitecture level, that information by itself, without an understanding of how the various resources affect the application performance, would still not suffice to make optimal placement decisions. Accordingly, this approach often results in suboptimal placement of applications in a cluster, causing unpredictable performance and/or performance degradation due to heavy contention for shared resources, and/or resulting in underutilization of the cluster resources.

In another approach, utilized, e.g., by Linux schedulers enabled with Intel® RDT, resource allocation decisions are made pursuant to resource allocation limits for different applications as manually set by the data center operators. Even this enhanced capability to set allocation limits (manually) for enforcement by the scheduler does not allow for optimal placement decisions in the absence of information about how the resource impacts the performance of the application. For example, adding more LLC capacity to a streaming application will not improve the performance; rather, it will waste a valuable resource which could have been given instead to another, cache-friendly application. Accordingly, the ability to control resource allocation at the microarchitecture level, without the knowledge of the sensitivity of the application to different resources, is of limited use.

In various embodiments, this deficiency in conventional resource allocation is addressed with a hardware-generated workload signature that captures the sensitivity of application performance and jitter to shared resources subject to contention. The workload signature utilizes a predictive computational model, hereinafter also "workload signature model" or simply "model," to predict the potential performance jitter of a primary workload under different resource availability scenarios, using as input a representation of the resource requirements of the primary workload along with a representation of the resource availability under any given scenario. For a specified set of shared platform resources that, when subject to resource contention, may affect application performance and jitter, the resource requirement representation quantifies the amount of these resources that the primary workload will utilize in the absence of any resource contention. The resource requirements can be determined by executing the primary workload alone on the platform, or otherwise ensuring the absence of resource contention. The resource availability representation quantifies, for the same set of shared platform resources, the amount of each resource that is still available in the presence of a given background workload combination. These quantified amounts are hereinafter also referred to as "resource requirement features" and "resource availability features," and can be assembled into a "resource requirement vector" and "resource availability vector," respectively. Typically, the resource requirement and resource availability vectors each include at least two features, e.g., with values for LLC and memory bandwidth. In principle, however, the workload signature model can also operate on scalar features representing a single shared platform resource.

Figure 7A:
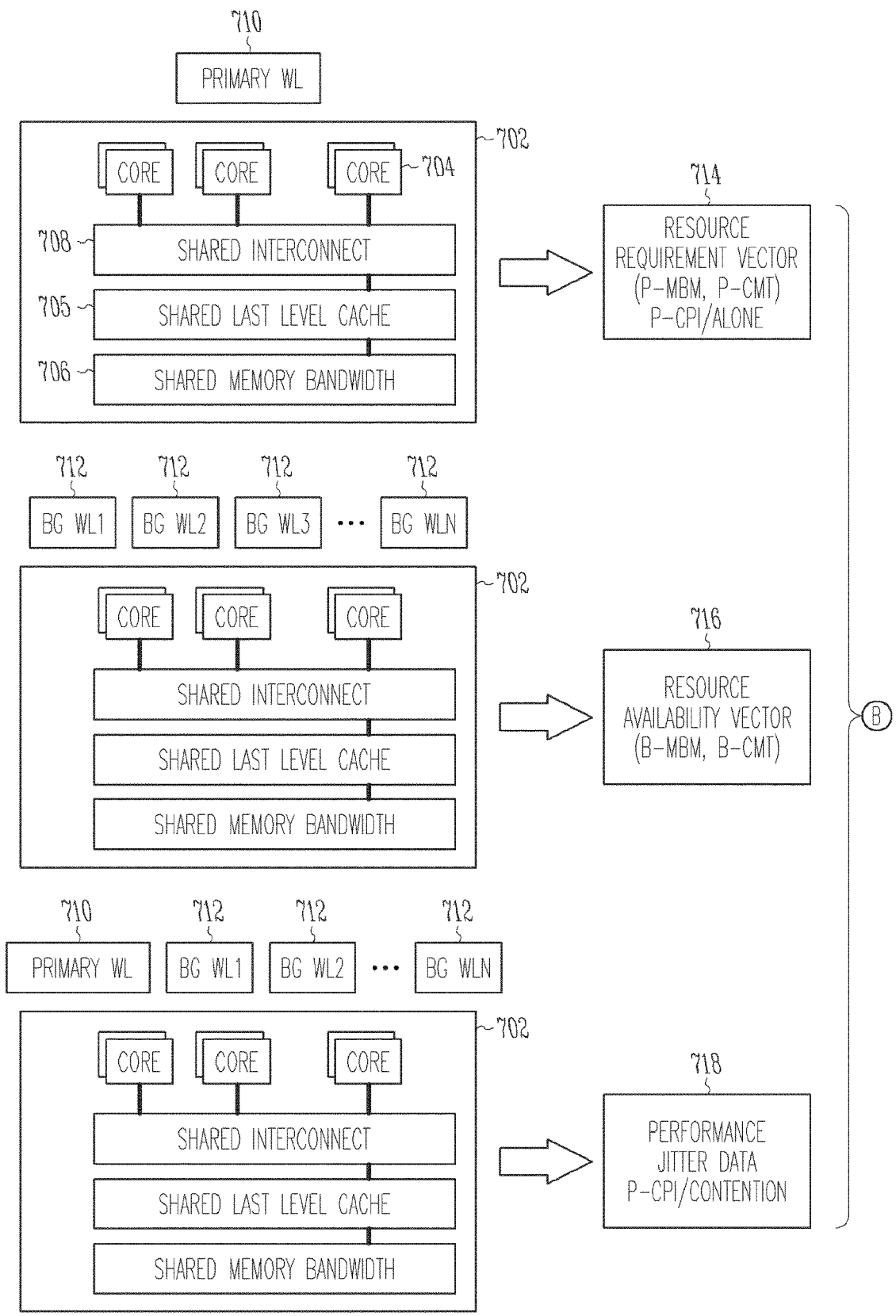
FIGS. 7A and 7B constitute a block diagram conceptually illustrating creation of a workload signature model in accordance with various embodiments.
Figure 7B:
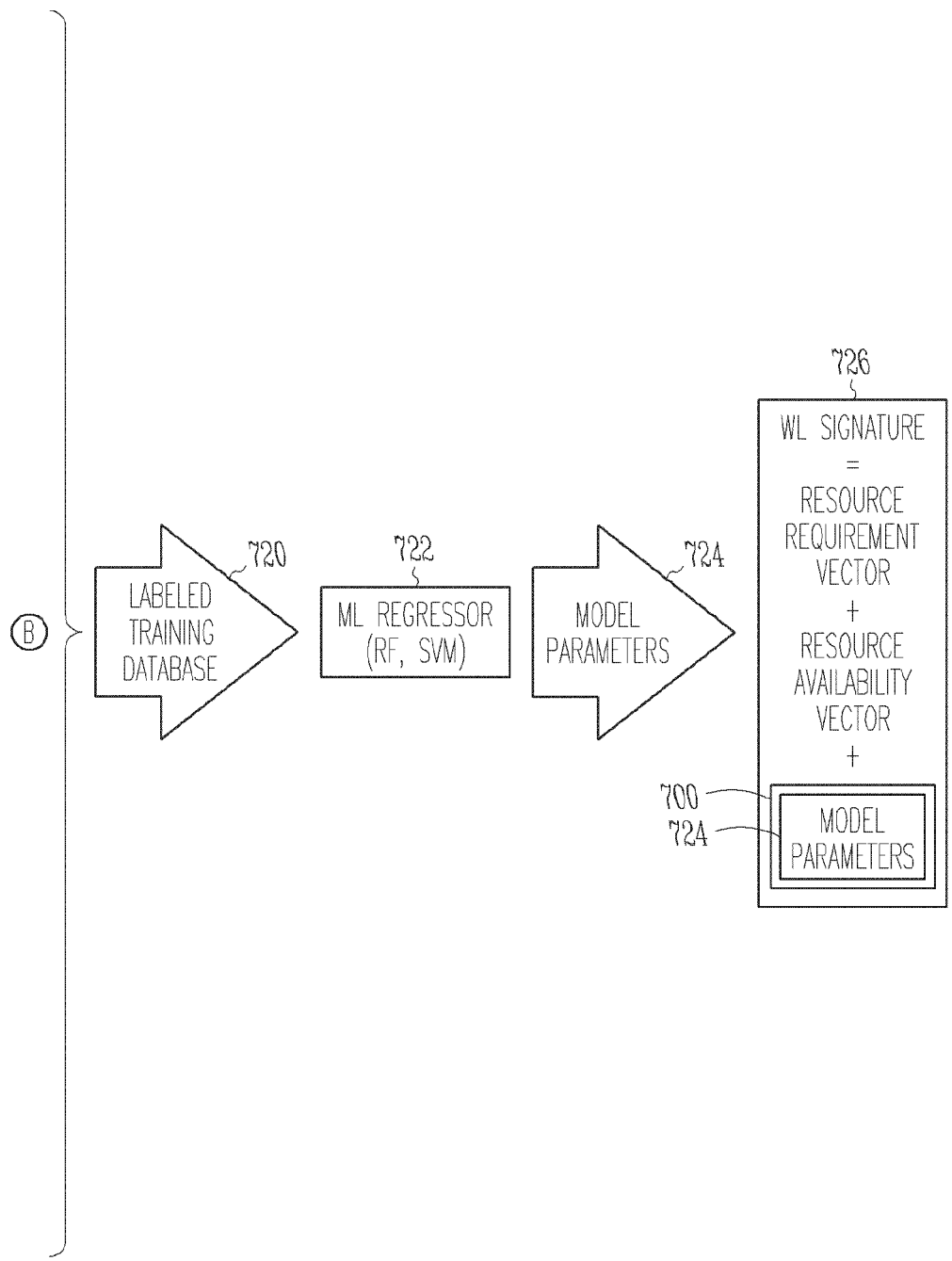

FIGS. 7A and 7B constitute a block diagram conceptually illustrating creation of a workload signature model 700 in accordance with various embodiments. The model 700 is specific to a particular compute-node platform, as defined by the computer architecture of the compute node and parameters and capabilities of its components, such as, e.g., the number and types of processors 702, the size of memory, the bandwidth of the network interface, etc. Of particular interest in the context of the workload signature are the processor capabilities of the platform, such as the number of cores 704, the clock rate, the number of cache levels and cache sizes (including, in particular, the size of the shared LLC 705), the number of memory channels, the (shared) memory bandwidth 706, the bandwidth of the shared interconnects 708, and other processor speeds and feeds. Often, data centers utilize multiple different platforms; for example, the compute nodes of the data center may employ two or three generations of processors. In that case, a separate workload signature model 700 may be created for each of the various platforms.

To characterize a given platform in terms of the performance it achieves, and especially its behavior under resource contention, various combinations of primary workloads 710 and background workloads 712 are run on the compute node to generate training data. The goal is to create a generalized model 700 that allows, ultimately, to predict the performance degradation under resource contention for any primary workload under any contention scenario. For this purpose, training data is collected for a sufficient number of combinations of a sufficiently varied set of workloads that the data, collectively, is representative of the range of scenarios that may be encountered in practice. In one embodiment, the workload combinations may be constructed from a set of workloads including, e.g., SGEMM, STREAM, NMT, Inception, Stessng-bigheap, Stressng-matprod, and Stressng-matmul—a collection of computational workloads of multiple types that vary greatly in their utilization of microarchitecture resources.

The training data generated for a given primary workload 710 and a given combination of background workloads 712 includes: a resource requirement vector 714 along with the resulting baseline value of a relevant performance metric ("P-CPI/alone"), a resource availability vector 716, and performance or performance jitter data 718 ("P-CPI/contention") measured under resource contention between the primary workload 710 and the background workloads 712. The resource requirement and resource availability vectors 714, 716 are based on measured values of the utilization of various microarchitecture resources by the primary workload 714 and background workloads 716, respectively. In the example shown, these microarchitecture resources are memory bandwidth and last-level cache, whose utilization can be measured, e.g., with the memory bandwidth monitoring (MBM) and cache monitoring technology (CMT) features of Intel® RDT. In general, utilization of any number and types of shared resources may be monitored and recorded in the resource requirement and resource availability vectors 714, 716; a suitable selection may be made depending on the impact that each resource has on performance jitter.

As noted, the resource requirement vector 714 is determined with the primary workload 710 running alone on the processor 702 of the compute node, and may include the measured resource utilization values themselves. The resource availability vector 716 is determined with the selected combination of (one or more) background workloads 712 running on the platform, without the primary workload 710, and may include the free capacity of each of the measured resources, which is the difference between the total capacity and the aggregate resource utilization by the background workloads 712. To obtain the performance jitter data 718, the primary workload 710 is executed on the platform together with the combination of background workloads 712, and the performance metric and its variability are measured. In various embodiments, the measured performance metric is a hardware SLO metric such as CPI. However, any performance metric of interest can generally be used to characterize the compute node under resource contention. Further, in some embodiments, multiple performance metrics are measured to train the model to predict these metrics based on the resource requirements and availability.

The performance for a given primary workload 710 under resource contention may be tested under multiple collocation scenarios. That is, a resource availability vector 716 and performance jitter 718 may be measured for multiple background workload mixes. Each pair of a resource availability vector for a mix of background workloads 716 and performance jitter data 718 measured when that background workload mix is run together with the primary workload 710 corresponds to one data point for the primary workload 710. Thus, a given primary workload 710 may have a set of data points, each including a resource availability vector $\vec{a}_i$ and jitter data $J_i$, associated with it: $\{(\vec{a}_1, J_1), (\vec{a}_2, J_2), \ldots\}$. Further, multiple primary workloads 710, characterized by their respective resource requirement vectors $\vec{r}_i$, may each be tested in combination with multiple background workload mixes, resulting in an overall set of data points each including a triple $(\vec{r}_i, \vec{a}_j, J_{ij})$: $\{(\vec{r}_1, \vec{a}_1, J_{11}), (\vec{r}_1, \vec{a}_2, J_{12}), \ldots, (\vec{r}_2, \vec{a}_1, J_{21}), (\vec{r}_2, \vec{a}_2, J_{22}), \ldots\}$. Collectively, those triples constitute the training dataset 720. In each triple, the jitter data $J_{ij}$ constitutes the ground-truth value, or label, for the jitter that the model 700 will generate as model output (predict) when operating on an input including the resource requirement vector $\vec{r}_i$ and the resource availability vector $\vec{a}_j$.

From the training dataset 720, the workload signature model 700 can be created by a suitable machine-learning algorithm 722, which is generally selected based on the type of model. Machine learning starts with a specification of the type and/or general structure of the model, which leaves certain model parameters adjustable. The machine-learning algorithm 722 then determines the model parameter values 724 by fitting, in a general sense, the model to the training dataset 720. Upon completion of training, the parameters in the thus machine-learned model 700 are fixed. A workload signature 726, in accordance herewith, includes the machine-learned model 700 with fixed model parameters 724, along with the resource requirement vector for a primary workload to be placed and the resource availability vector for the computational node considered for placement. That is, each combination of a primary workload and a given collocation scenario has its own respective workload signature 726.

Figure 7C:
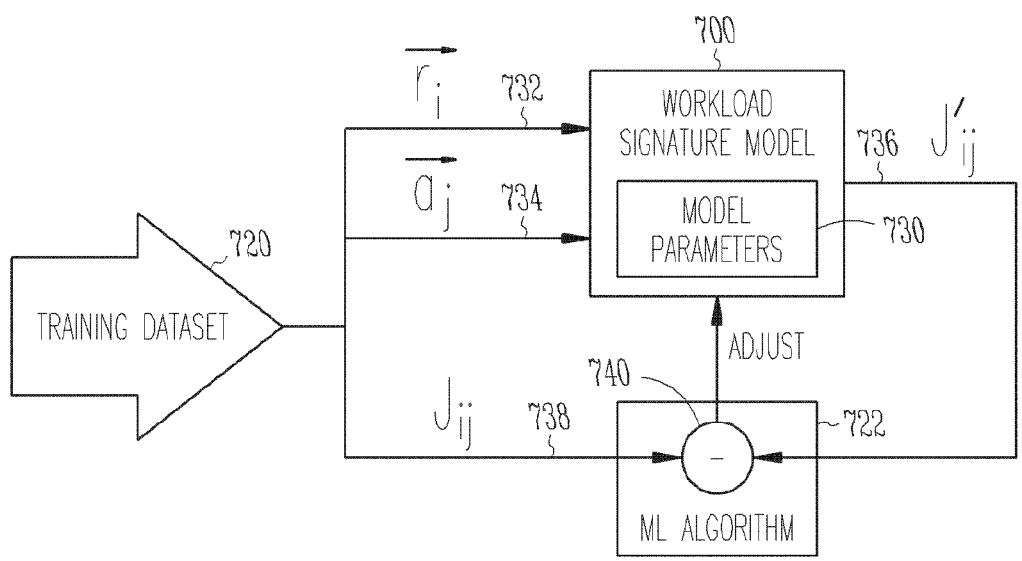
FIG. 7C is a block diagram conceptually illustrating, in more detail, training of a machine-learning workload signature model in accordance with various embodiments.

FIG. 7C is a block diagram conceptually illustrating, in more detail, training of a machine-learning workload signature model 700 in accordance with various embodiments. In the embodiment shown, the training is performed in a supervised manner, using the labeled training dataset 720. In an iterative process, the workload signature model 700, with adjustable model parameters 730 that are initialized at the beginning of the process, operates on a resource requirement vector input $\vec{r}_i$ 732 and a resource availability vector input $\vec{a}_j$ 734 to generate, as the model output 736, corresponding predicted performance jitter values $J_{ij}'$ 736 and/or performance metrics. The machine-learning algorithm 722 compares, in each iteration, the predicted jitter values $J_{ij}'$ 736 against the corresponding labels $J_{ij}$ 738 measured for the respective pair of requirement and availability vectors, ($\vec{r}_i$, $\vec{a}_j$) to determine a discrepancy (that is some metric of a difference) 740 between the measured ground truth and the prediction by the model 700. The algorithm 722 may, for instance, evaluate a loss function that measures the discrepancy 740, e.g., in terms of a squared error loss. Based on the determined discrepancy 740, the algorithm 722 then adjusts the model parameters 730. Through multiple iterations, the discrepancy usually decreases, such that the model output 736 comes closer and closer to the ground truth 738. The iterative process usually halts either when the discrepancy 740 falls below a specified threshold, or after a specified number of iterations have been completed.

Those of ordinary skill in the art will know various machine-learning model types and associated algorithms 722 suitable for training the workload signature model 700. Non-limiting examples include regression models and algorithms based on support vector machines (SVM) or random forests, as well as neural-network models as may be trained, e.g., using backpropagation of errors.

In some embodiments, creating the workload signature model by machine learning includes selecting, among a potentially large number of shared platform resources, the shared resources that affect performance jitter to the greatest extent for use as features in the resource requirement and availability vectors. Such automated feature selection can employ any of a variety of feature selection algorithms known in the art, including, e.g., exhaustive search or greedy algorithms. Alternatively to pruning the list of shared platform resources automatically, it is also possible to manually select the features to be used in the requirement and availability vectors, e.g., based on heuristics and known behaviors.

Figure 8:
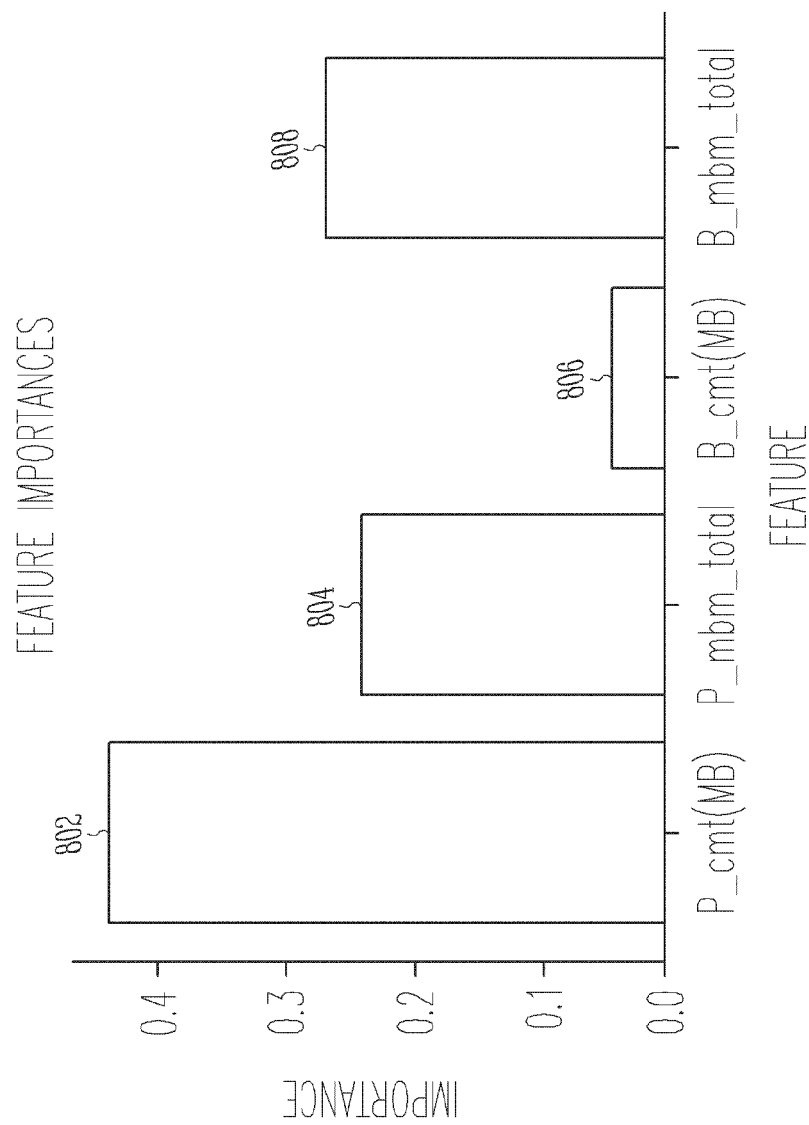
FIG. 8 is a bar diagram illustrating the relative performance impact of cache and memory bandwidth in both resource requirements and resource availability, as determined for one example embodiment.

FIG. 8 is a bar diagram illustrating the relative performance impact of cache and memory bandwidth in both resource requirements and resource availability, as determined for one example embodiment. As can be seen, in the resource requirements, last-level cache 802 ("P_cmt(MB)") impacts the performance jitter with a 44% contribution, followed by memory bandwidth 804 ("P_mbb_total") with 24%. For resource availability, the impact of last-level cache 806 ("B_cmt(BM)") is lower at 5%, and that of memory bandwidth 808 ("B_mbm_total") is significant at about 27%. This data suggests that, in some applications, cache and memory bandwidth are the two most important features affecting performance jitter. Accordingly, in various embodiments, these two resources are selected for monitoring and determination of the workload signature. In other embodiments, however, alternative or additional shared resources may be used in the workload signature, e.g., in platforms where the relative contributions of such alternative or additional shared resources to jitter increase and/or become comparable or greater than the impact of memory bandwidth and cache. For example, as the core count in the processor increases, interconnect bandwidth may become more important.

Figure 9A:
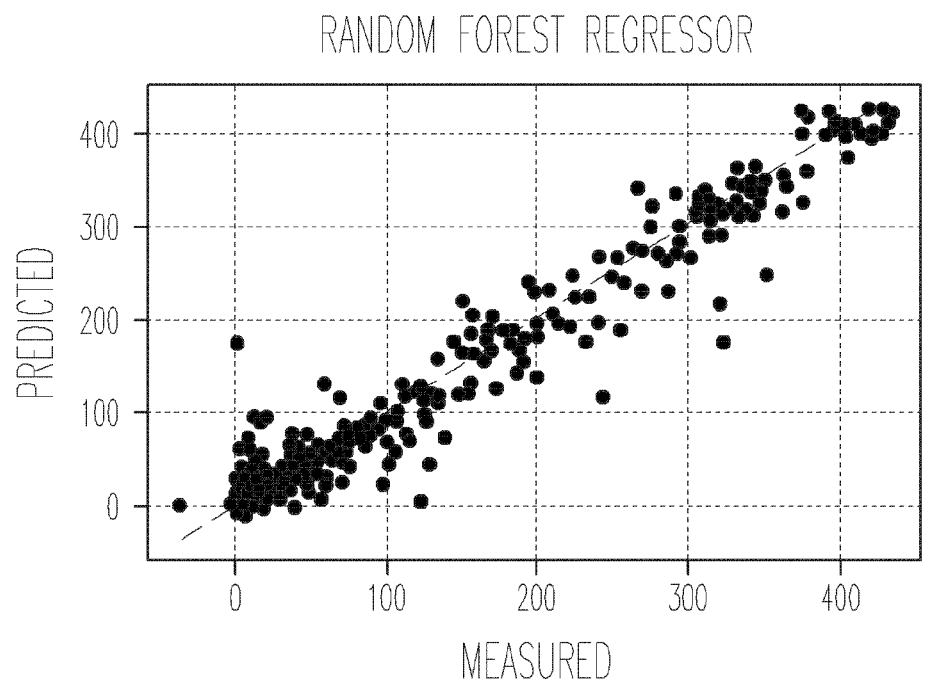
FIGS. 9A-9C are scatter plots illustrating the relationship between predicted and measured performance jitter for various predictive models, in accordance with one example embodiment.
Figure 9B:
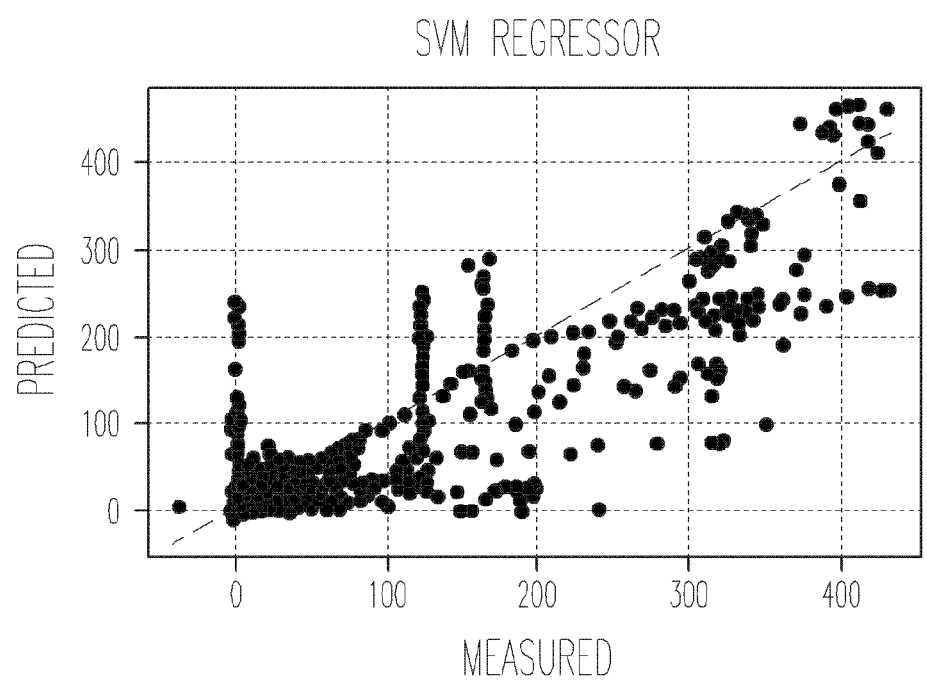
Figure 9C:
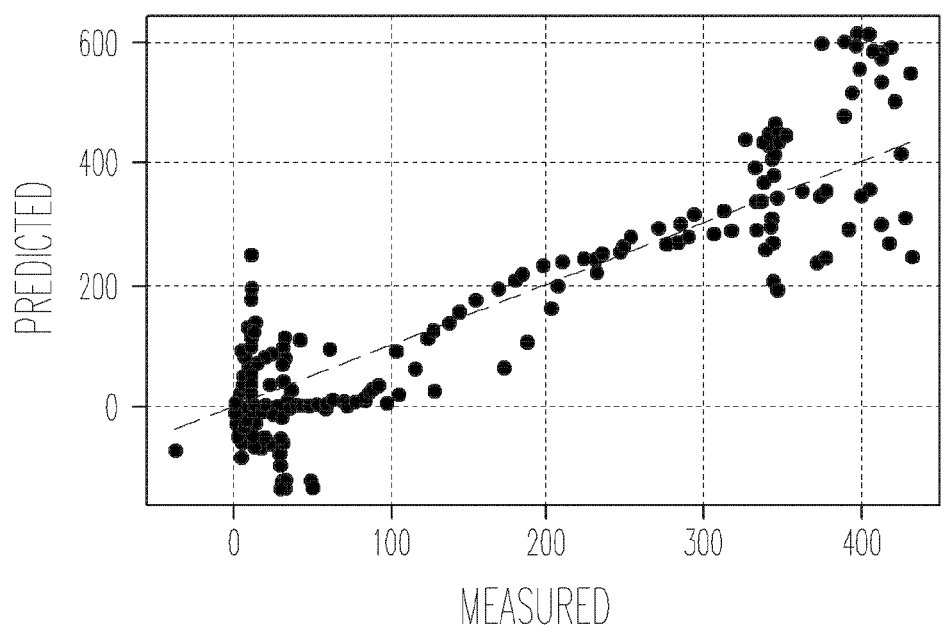

FIGS. 9A-9C are scatter plots illustrating the relationship between predicted and measured performance jitter for various predictive models, in accordance with one example embodiment. The performance metric whose change (which is indicative of performance degradation) is depicted in the plots is CPI. The predicted jitter (reflected by the value along the ordinate) correlates strongly with the measured jitter (reflected by the value along the abscissa) in all three cases, providing evidence for the feasibility of performance prediction with a workload signature as described above.

FIG. 9A shows the results achieved with a random forest regressor including four trees, trained and tested on the workload mix including SGEMM, STREAM, NMT, Inception, Stessng-bigheap, Stressng-matprod, and Stressng-matmul. With this model, training accuracy was 99.3%, testing accuracy was 97.4%, and a ten-fold cross-validation accuracy was 98.041%.

FIG. 9B shows the results for an SVM regressor with a kernel of type 'rbf', a regularization parameter C=1000000, and a kernel coefficient for 'rbf' of 0.1. Again, the model was trained and tested on the above-mentioned workload mix. In this case, the training accuracy was 73.8%, the testing accuracy was 73.89%, and the ten-fold cross-validation accuracy was 72.72%—significantly lower than the accuracy achieved with a random forest regressor, but still high enough to render the predictions meaningful.

FIG. 9C shows the results obtained for unseen test data, that is, data that was not part of the training dataset, using an SVM regressor trained on the Stress-ng Bigheap application.

Having explained how a workload signature is created, the description now turns to its use for resource allocation at the cluster level as well as the node level.

Figure 10:
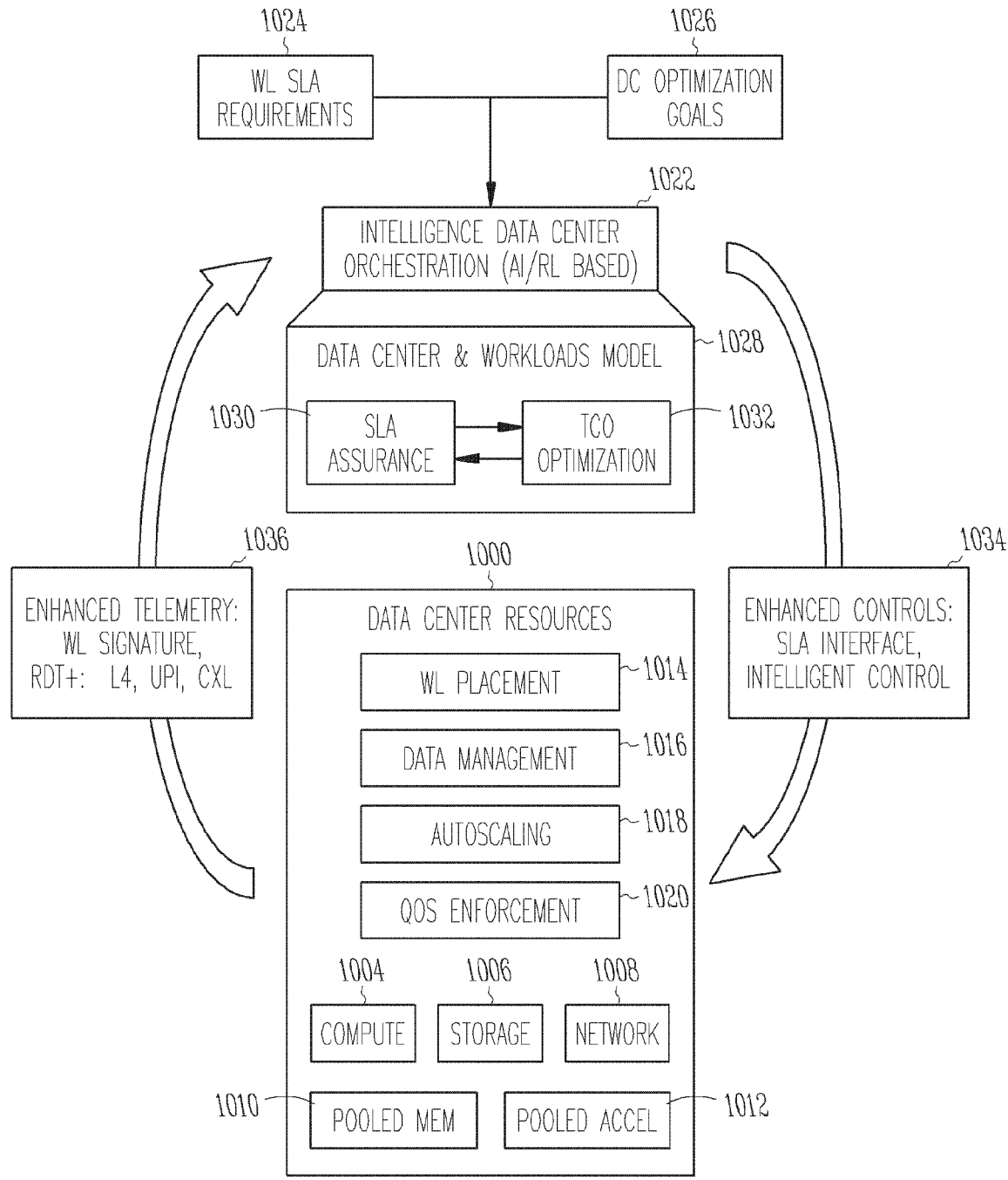
FIG. 10 is a block diagram conceptually illustrating an example approach to resource allocation in data centers that uses a workload signature in conjunction with a hardware SLO interface, in accordance with various embodiments.

FIG. 10 is a block diagram conceptually illustrating an example approach to resource allocation in data centers that uses a workload signature in conjunction with a hardware SLO interface, in accordance with various embodiments. As shown, the data center resources 1000 include a number of resources for processing workloads associated with request received at the data center, such as compute nodes 1004, storage nodes 1006, network resources 1008 (e.g., of a data center network 114), pooled memory 1010, and/or pooled accelerators 1012. In addition, the data center resources 1000 include functionality for matching workloads to these processing resources 1004-1012, such as workload placement 1014, data management 1016, autoscaling 1018, and QoS/SLA enforcement 1020. These functionalities may be provided, at least in part, via intelligent data center orchestration 1022 (e.g., performed by data center orchestrator 110), which may employ artificial intelligence (AI) tools, such as machine-learned models, whether trained by unsupervised or supervised learning or continuously adapted using reinforcement learning (RL). The intelligent data center orchestration 1022 is performed subject to SLA requirements 1024 for applications and their respective workloads, as well as by one or more overall data center optimization goals 1026 such as, e.g., predictive performance, fairness, throughput, or differentiated allocation based on priority groups. Data center and workload models 1028, such as the workload signature model described herein, may be used to optimize the tradeoff between SLA assurance 1030 and TCO optimization 1032.

In scheduling workloads between the compute nodes 1004 (or other data center resources 1000), the intelligent data center orchestration 1022 may utilize both enhanced controls 1034 and enhanced telemetry 1036. Enhanced controls 1034 may include a hardware SLO interface that allows actively controlling a hardware-understandable metric (the SLO metric), such as CPI or IPC, to achieve a target specified as an SLO. The interface includes some intelligent control mechanism. In some embodiments, this mechanism includes a feedback loop in which resource allocations are tuned iteratively to minimize the difference between the measured SLO metric and the target value. In alternative embodiments, the control mechanism utilizes a predictive model, such as the above-described workload signature model, to compute the allocation levels that will result in the target performance, and then applies those levels. Both embodiments rely on RDT or similar processor functionality to actively direct the allocation of resources in a processor. Enhanced telemetry 1036 may involve, in addition to functionality for measuring utilization of individual shared resources (e.g., including, beyond standard monitoring capabilities for cache and memory bandwidth, monitoring capabilities for UPI and CXL bandwidth, and others), a workload signature that relates resource utilization to performance. Intelligent data center orchestration 1022 may employ enhanced telemetry 1036 to make performance predictions that can inform workload placement decisions, and may use enhanced controls 1034 on an assigned compute node to enforce the target performance.

Figure 11:
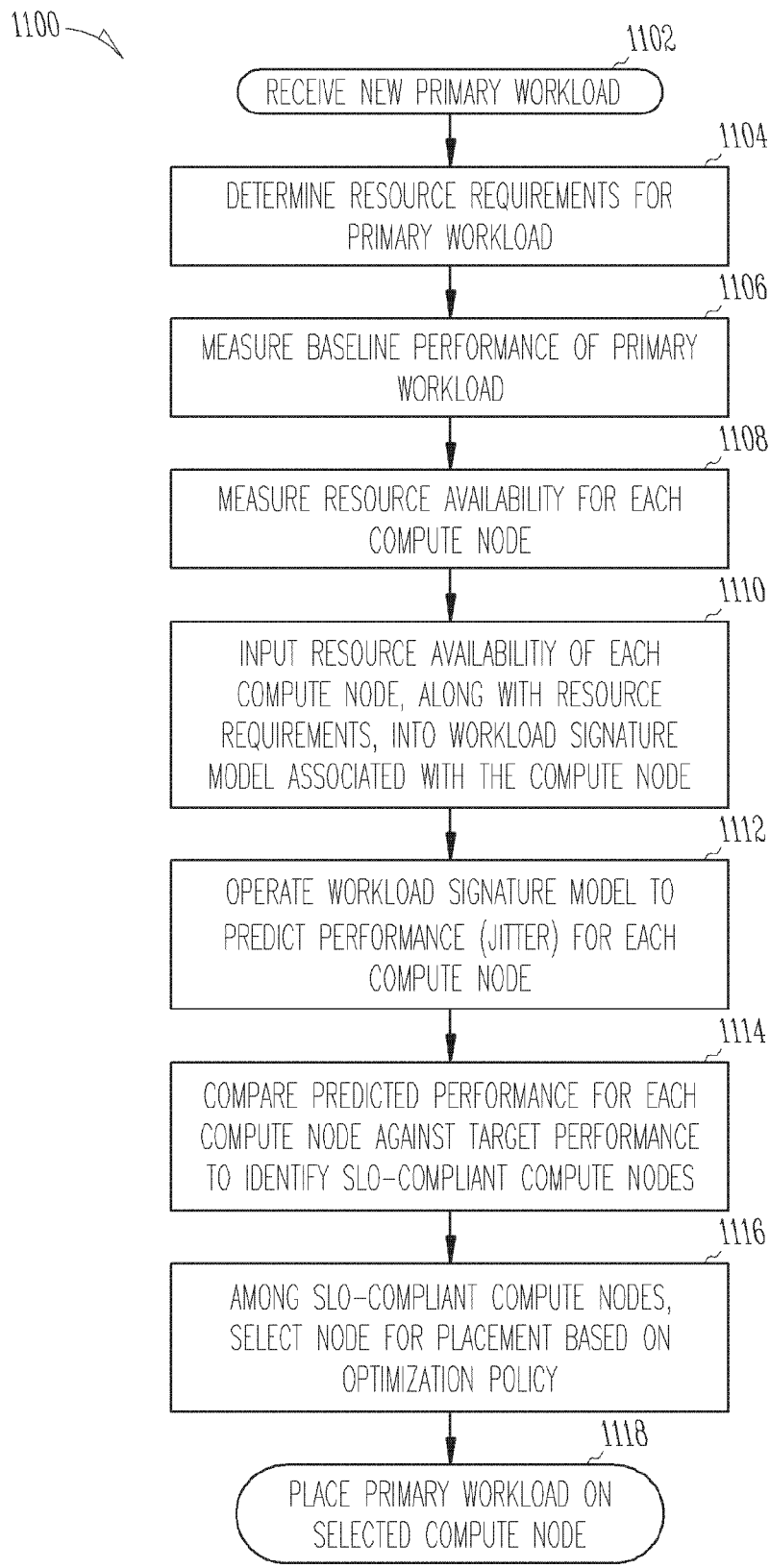
FIG. 11 is a flow chart of an example method for workload placement in a cluster of compute nodes based on a workload signature, in accordance with various embodiments.

FIG. 11 is a flow chart of an example method 1100 for workload placement in a cluster of compute nodes based on a workload signature, in accordance with various embodiments. The method 1100 involves determining, upon receipt of a new workload at 1102 (for purposes of this discussion the primary workload), the resource requirements of the workload (1104). This step may involve temporarily placing the primary workload on an unused compute node to enable measuring resource utilization in the absence of any background workload. In practice, however, such a node may not be available; in that case, the resource requirements can be determined approximately by running the primary workload on a node with generally high resource availability. While the primary workload is running, the workload performance is also measured (1106), to provide a baseline for determining jitter.

Further, to enable selecting one of various available compute nodes for placement of the primary workload, the resource availability of each compute node is measured (1108). The resource requirements (e.g., represented by a resource requirement vector) and resource availability (e.g., as represented by a resource availability vector) of each compute node are then provided as input to a workload signature model associated with the respective compute node (e.g., among multiple models for different platforms, the model for the platform provided by the compute node) (1110). Operating on this input, the model predicts the performance and/or performance jitter to be expected when running the primary workload on the compute node (1112). The predicted performance for each compute node can be compared against the corresponding SLO to determine which of the nodes currently support meeting the SLO for the workload (1114). Among multiple such candidate nodes, a node can be selected based on further considerations (1116), e.g., as specified in an optimization policy, and the primary workload is then scheduled on the selected node (1118). If no suitable node is identified, the cluster orchestrator may attempt to reassign some of the background workloads to create capacity on at least one node to execute the primary workload SLO-compliantly.

Figure 12:
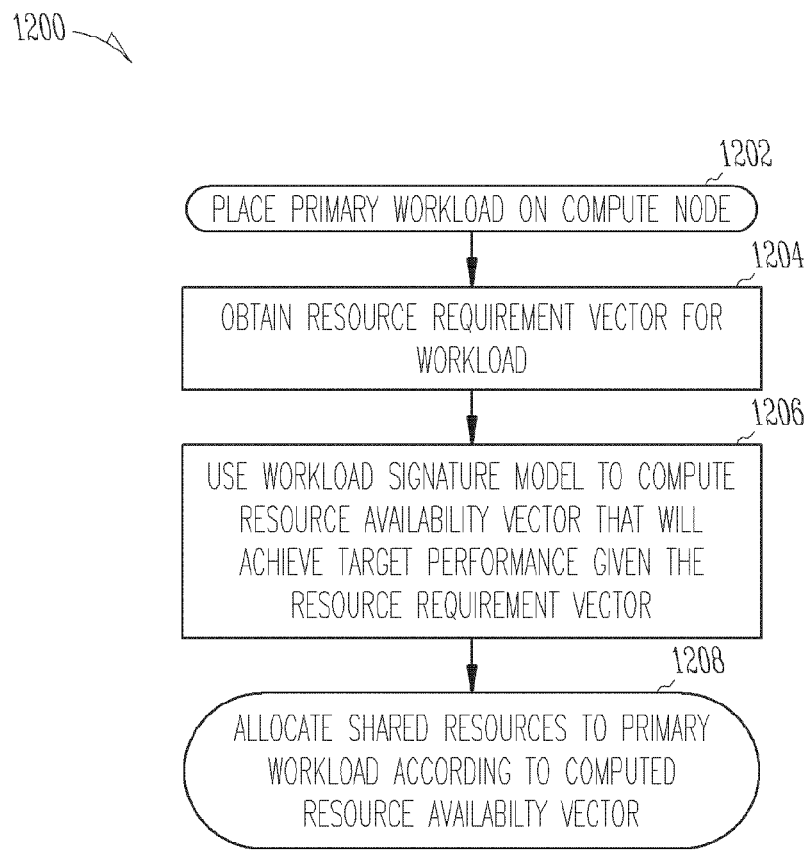
FIG. 12 is a flow chart of an example method for resource allocation within the processor of a compute node based on a workload signature, in accordance with various embodiments.

FIG. 12 is a flow chart of an example method 1200 for resource allocation within the processor of a compute node based on a workload signature, in accordance with various embodiments. The method begins with the placement of a primary workload on the compute node at 1202. In many cases, resource availability on the compute node will exceed the resources needed to achieve the specified SLO. Instead of executing the workload at much higher performance than the SLO requires, resource allocation to the primary workload may, in this situation, be throttled to match the actual performance to the SLO (e.g., to achieve a CPI value that matches the target value). (The term "match" denotes, in this context, an approximate match, allowing the actual performance metric to deviate slightly, e.g., by less than 5%, from the SLO.)

To determine adequate resource allocations, the resource requirement vector for the primary workload (which captures the resource utilization in the absence of contention) is obtained (1204), and a workload signature model may be used to compute the resource availability vector that, given the known resource requirement vector, would result in a performance matching the SLO (1206). Resources are thereafter allocated in the amounts specified in the computed resource availability vector (1208). In some embodiments, the computation of the research availability vector is iterative: an initial guess of the resource availability vector, along with the resource requirement vector, is fed into the model to compute the predicted performance, and depending on whether the predicted performance is worse or better than the SLO requires, values in the resource availability vector are dialed up or down; this loop is repeated until the predicted performance is as desired. In some embodiments, the workload signature model may be invertible, allowing the research availability vector to be computed straightforwardly from the resource requirement vector and the specified performance.

A workload signature model as described herein may be implemented alternately in software, hardware, or firmware, depending on its use. When used for workload placement by the cluster orchestrator, the workload signature model may run as software on a node of the cluster orchestrator. When used for microarchitecture resource allocation in a processor, the workload signature model may be implemented directly in the processor hardware or firmware, e.g., as part of an intelligent resource manager 514. Alternatively, the workload signature model may be software running on the compute node, and the determined resource allocation levels may be communicated by the software to the processor for enforcement.

Microservices Configuration

As applications including tens to hundreds of microservices become increasingly prevalent, there is a growing need for methods to efficiently allocate resources to the individual microservices to achieve an overall end-to-end performance of the application. Resource allocation to microservices involves configuring each microservice, e.g., by specifying how many replica of the microservice are instantiated (where the number of replica may differ between different microservices within the same application), on how many CPU cores these replica run, how many LLC ways and how much memory bandwidth is allocated to each instance, etc. Collectively, these configuration decisions potentially constitute a very large configuration space, and exploring this space manually can be prohibitively time-consuming. Conventionally, therefore, the problem of guaranteeing microservices performance is solved inefficiently with overprovisioning, that is, sub-optimal configurations. Each stage of the microservice chain will be configured with more resources than it needs, to avoid execution bubbles in the pipeline and, thus, provide the required end-to-end SLA guarantee. This approach results in a large fraction of underutilized resources.

In various embodiments, more efficient resource allocation to microservices is accomplished by automated configuration optimization of an incoming application, e.g., using a sample-efficient algorithm to select configurations for testing on the platform and determine a set of Pareto-optimal configurations.

Figure 13:
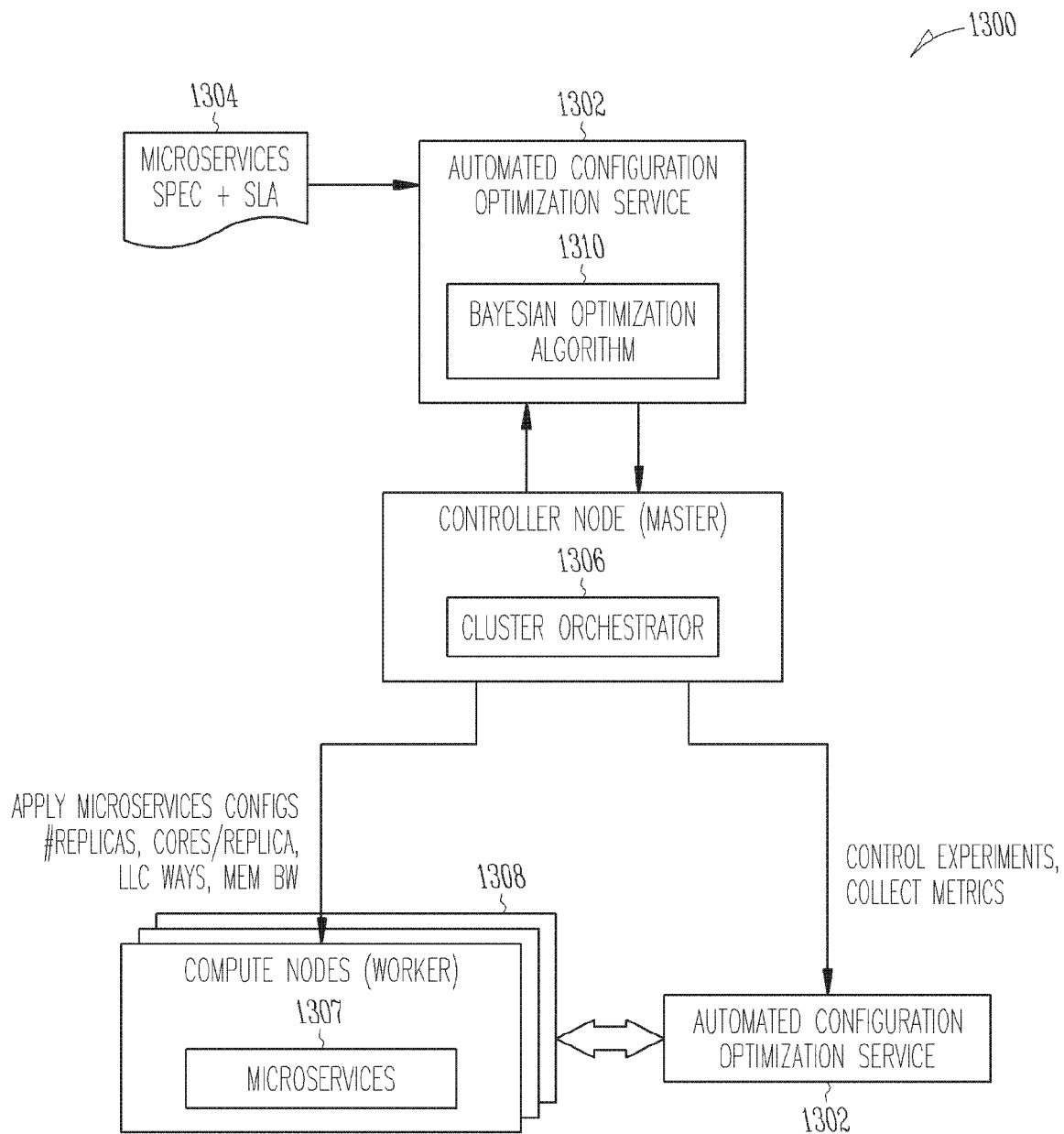
FIG. 13 is a block diagram conceptually illustrating a framework for automatic configuration optimization in accordance with various embodiments.

FIG. 13 is a block diagram conceptually illustrating a framework 1300 for automatic configuration optimization in accordance with various embodiments. An automated configuration optimization service 1302 receives microservices specifications and an SLA (collectively 1304) for an application, and selects configurations for testing among a typically large set of possible configurations. The goal of the configuration optimization service 1302 is to maximize throughput to meet a certain QoS goal or SLO while minimizing the allocated hardware resources. In some example embodiments, the QoS goal is a specified P99 latency, which is a latency requirement that is met or exceeded (in the sense that requests are processed faster) for 99% of requests, the processing of only 1% of requests entailing latencies longer than the specified value.

To find an optimal configuration or set of configurations, the configuration optimization service 1302 works with the cluster orchestrator 1306 to explore various configuration parameters, or "knobs," in their effect on application performance and resource allocation to the application. This exploration involves configuring and deploying microservices, and measuring the resulting end-to-end application performance and determining the total resource allocation for each configuration of the application. Given a microservices configuration specified by the configuration optimization service 1302, the cluster orchestrator 1306 assigns the individual microservices 1307, constituting individual workloads, to the compute nodes 1308 of the data center, e.g., using workload signatures as described above to make placement decisions. Further, the individual compute nodes 1308 may control microarchitecture resource allocation to meet a specified hardware-level SLO. The configuration optimization service 1302 may be implemented in software executed, e.g., on the same set of nodes that host the cluster orchestrator 1306 (e.g., as part of the data center manager 109 shown in FIG. 1), or on a different set of nodes in communication with the cluster orchestrator 1306. In some embodiments, the configuration optimization service 1302 is implemented at least in part in hardware, such as on hardware accelerators.

In various embodiments, the configuration knobs include the number of replicas instantiated for each microservice, the number of CPUs used per replica ("cpu"), the number of L3 cache (or, more generally, LLC) ways allocated per replica ("L3 ways"), and the memory bandwidth allocated per replica ("MemB"). Cache and memory bandwidth allocations can be controlled, e.g., using Intel® RDT. Other embodiments may utilize different or additional configuration knobs. The output objectives, in accordance with some embodiments, are to maximize the throughput under a P99 latency constraint while minimizing total resource allocation. For this purpose, total resource allocation may be defined as a weighted sum of various microarchitecture resources, e.g., a weighted sum of CPUs, L3 cache ways, and memory bandwidth utilized by a microservice (as computed by multiplying the CPUs, L3 cache ways, and memory bandwidth per replica by the number of replicas of the microservice), each summed over all microservices and normalized by the total resources available in the data center:

$$\alpha \frac{\sum cpu \times relicas}{\text{total } CPUs} + \beta \frac{\sum L3 \text{ ways} \times \text{replicas}}{\text{total } L3 \text{ ways}} + \gamma \frac{\sum Mem\ BW \times \text{replicas}}{\text{total } Mem\ BW}$$

Configuration optimization can, in principle, be achieved using an exhaustive, brute-force search over the entire configuration space. For large configurations, however, this approach becomes practically infeasible. It is also possible to randomly sample configurations, but in this case, it may still take many iterations to find an optimum. Various embodiments, therefore, use a sample-efficient search strategy that identifies the optimum achievable tradeoff between throughput and hardware resource allocation within a minimal number of iterations. Such a search strategy may implement a Bayesian optimization algorithm, in which the exploration of configurations is guided optimally based on the collected information up to that point (called the "prior"). The Bayesian optimization algorithm 1310 can be implemented in software as part of, or accessed by, the automated configuration optimization service 1302.

Bayesian optimization is a machine-learning-based technique well-known to those of ordinary skill in the art, designed for black-box derivative-free global optimization. In brief, Bayesian optimization generates a statistical model of an objective function—in the present context, some measure of the throughput and hardware resource allocation—and uses an acquisition function (e.g., knowledge gradient, entropy search, or predictive entropy search) to decide where to sample next. The model may be generated using, e.g., Gaussian process regression, or some other suitable method for statistical inference, based on an, e.g., random sampling of data points across the search space (here, of microservices configurations). In an iterative process, samples are selected from the search space based on the posterior probability distribution on the modeled objective function, which is updated in each step using all available prior data. The solution returned by the algorithm, e.g., after a predetermined number of iterations, is the data point (here, microservices configuration) with the largest value of the objective function (representing, here, e.g., the best tradeoff between throughput and resource allocation) or the largest posterior mean.

Configuration optimization in accordance herewith, since it involves a tradeoff between two outputs (throughput and resource allocation), does not result in a single optimal configuration, but in a set of configurations along a Pareto front that represents the maximum throughput achievable with a given resource allocation, or the minimum resource allocation to achieve a given throughput. As the following data shows, Bayesian optimization can determine the Pareto front within a small number of iterations.

In one example, the described automated Bayesian configuration optimization was tested on a two-stage synthetic benchmark application that uses a CPU-centric "spin" stage and a memory-intense "stream" stage, run on a five-node cluster. The SLO was a P99 latency of less than 1 s. The application configuration has eight knobs (the number of replicas, CPUs per replica, L3 ways, and memory bandwidth for each of the two stages) tunable with the step size and within the ranges specified in Table 1 below:

TABLE 1

| Stage | Knob | Baseline | Range (start:end:step) |
|---|---|---|---|
| Spin | replica | 1 | 1:8:1 |
| | cpu | 4 | 1:16:1 |
| | L3 ways | 11 | 2:11:1 |
| | Mem B | 100 | 20:100:10 |
| Stream | replica | 1 | 1:8:1 |
| | cpu | 4 | 1:16:1 |
| | L3 ways | 11 | 2:11:1 |
| | mem B | 100 | 20:100:10 |

These knobs and ranges translate into a total search space of 132,710,400 configurations— too large to explore by a brute-force search. With the use of Bayesian optimization, on the other hand, a Pareto front could be derived within only 100 iterations in about seven minutes.

Figure 14:
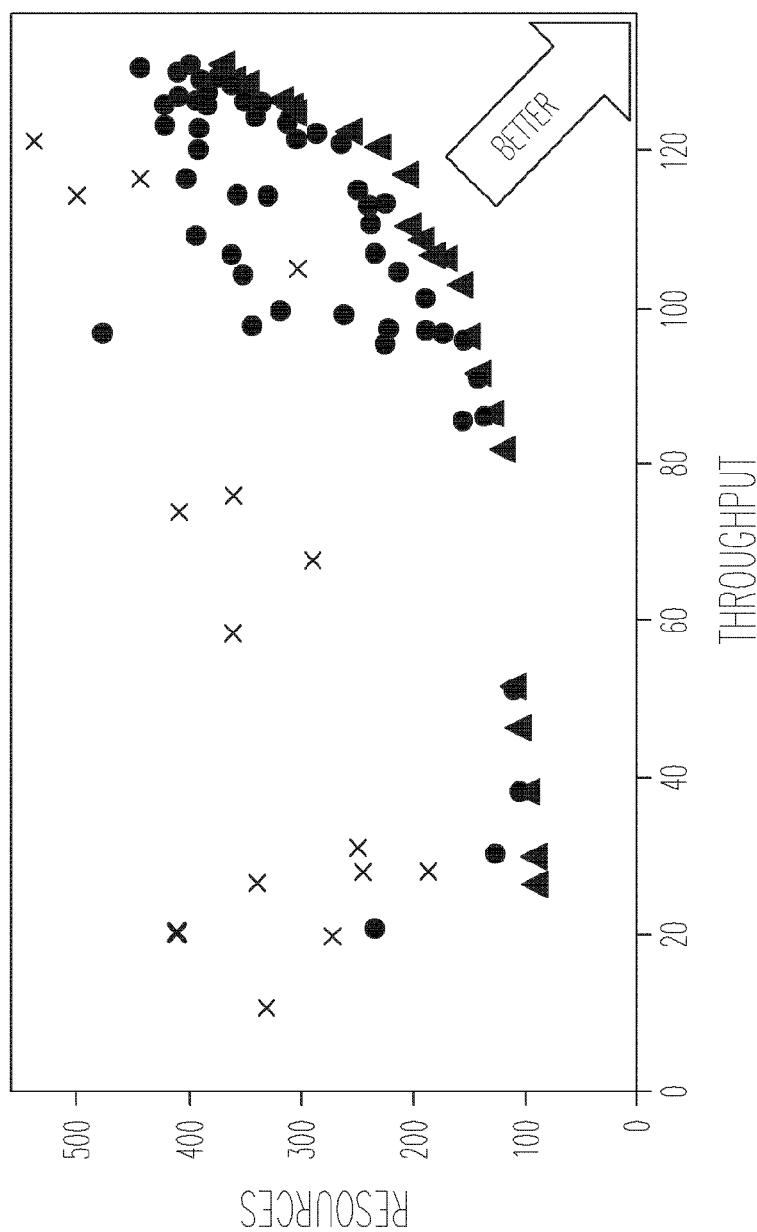
FIG. 14 is a scatter plot illustrating total resource allocation vs. throughput of an example two-stage synthetic benchmark application for a set of microservices configurations explored during automated microservices configuration optimization in accordance with various embodiments.

FIG. 14 is a scatter plot illustrating total resource allocation vs. throughput of the two-stage synthetic benchmark application for a set of microservices configurations explored during automated microservices configuration optimization in accordance with various embodiments. The depicted dataset includes a single data point reflecting the baseline performance obtained with knobs turned to the baseline values listed in Table 1, a group of data points obtained by random sampling, and two groups of data points obtained during Bayesian optimization and corresponding to non-optimal (circle symbols) and Pareto-optimal (triangle symbols) configurations. As can be seen, at the high-performance end of the Pareto front, throughput is about 6.43 times higher than the baseline performance, and total resource usage is about 10% lower than for the baseline. In the central region of the Pareto front, where the resource usage and throughput are balanced, the throughput is 11% lower, and resource usage is 45% lower, than at the high-performance end.

Optimal configuration options for different example throughput rates for the two-stage synthetic benchmark application are given in Table 2 below:

TABLE 2

| | Spin | | | | Stream | | | |
|---|---|---|---|---|---|---|---|---|
| Throughput | cpu | replica | L3 ways | MemBW | cpu | replica | L3 ways | MemBW |
| 26.56 | 1 | 4 | 2 | 20 | 7 | 1 | 2 | 20 |
| 51.85 | 1 | 6 | 2 | 20 | 12 | 1 | 2 | 30 |
| 120.72 | 5 | 8 | 2 | 20 | 12 | 3 | 2 | 70 |
| 129.33 | 7 | 8 | 2 | 20 | 13 | 4 | 8 | 100 |

Figure 15B:
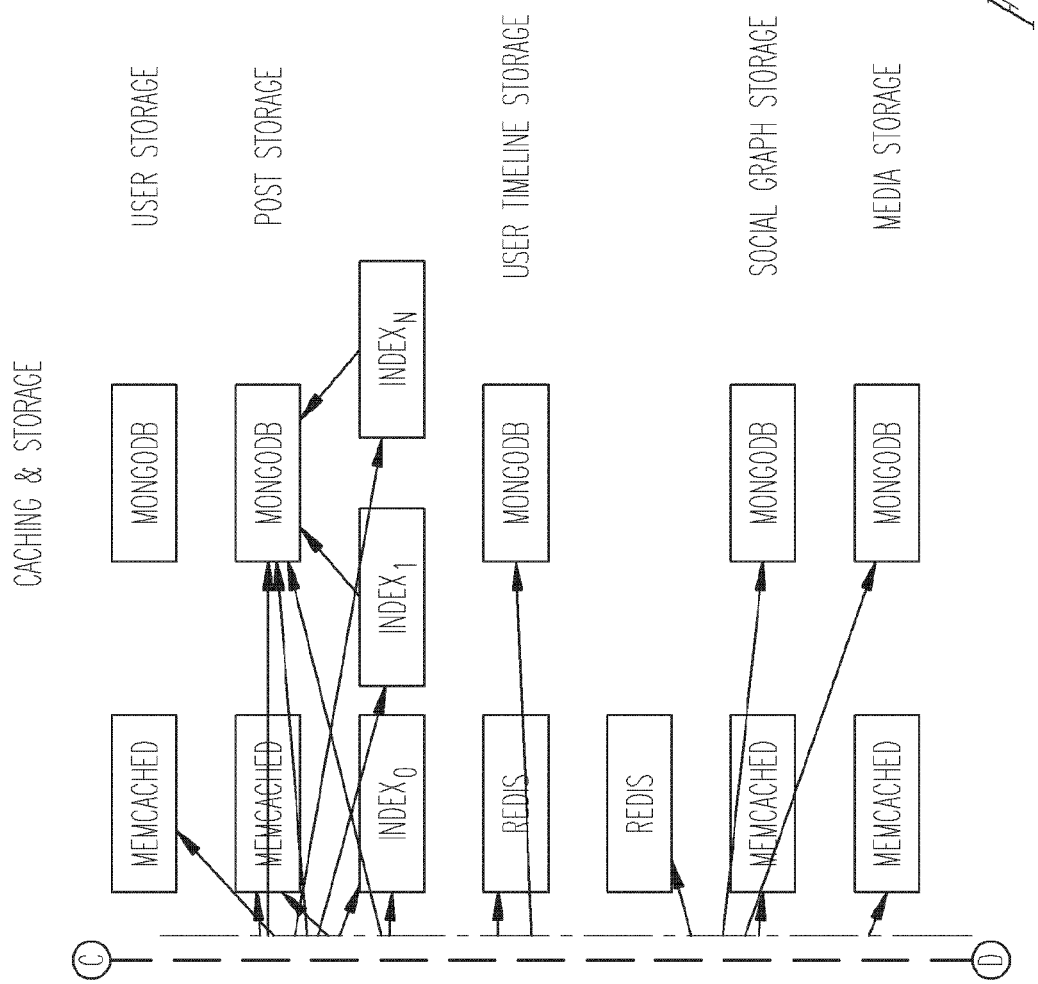

FIGS. 15A and 15B illustrate the microservices contained in the DeathStarBench application. This application is a multi-stage microservices benchmark that emulates social network use case implementations, and was run on a three-node cluster to test Bayesian configuration optimization for an SLO corresponding to a P99 latency of less than ms. Configurations were explored using thirty-four knobs, including variable numbers of replicas for 14 microservices, variable numbers of CPUs for 18 microservices, and common L3 ways and memory bandwidth knobs for all microservices, with ranges and step sizes shown in Table 3 below:

TABLE 3

| Knob | Baseline | Range (start:end:step) |
|---|---|---|
| <svc>/replica | 1 | 1:4:1 |
| <svc>/cpu | 4 | 1:8:1 |
| L3 ways | 11 | 2:11:1 |
| Mem B | 100 | 20:100:10 |

These knobs and ranges translate into a total search space of $4.35 \cdot 10^{26}$ configurations, which is practically impossible to explore with a brute-force approach. However, Bayesian optimization achieved the Pareto front within 150 iterations, again in about seven minutes.

Figure 16:
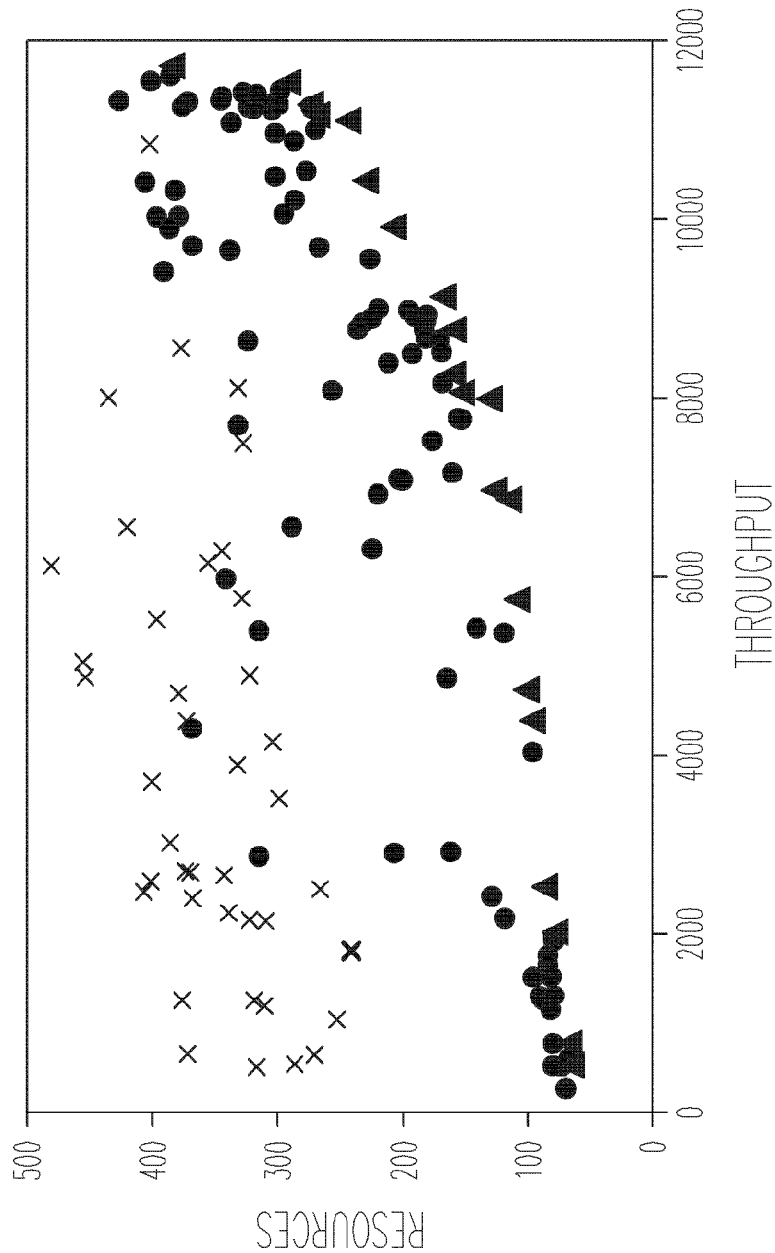
FIG. 16 is a scatter plot illustrating total resource allocation vs. throughput of the DeathStarBench application for a set of microservices configurations explored during automated microservices configuration optimization in accordance with various embodiments.

FIG. 16 is a scatter plot illustrating total resource allocation vs. throughput of the DeathStarBench application for a set of microservices configurations explored during automated microservices configuration optimization in accordance with various embodiments. The depicted dataset again includes a single data point reflecting the baseline performance (obtained with knobs turned to the baseline values listed in Table 3), a group of data points obtained by random sampling, and two groups of data points obtained during Bayesian optimization and corresponding to non-optimal (circle symbols) and Pareto-optimal (triangle symbols) configurations. As can be seen, at the high-performance end of the Pareto front, throughput is about 6.3 times higher than the baseline performance, and total resource usage is only about 20% higher than for the baseline. In the balanced region of the Pareto front, the throughput is still significantly higher, and resource usage is lower, than for the baseline.

Optimal configuration options for the DeathStarBench application for different example throughput rates are given in Table 4 below:

TABLE 4

| Throughput | Nginx | | Home-timeline | | Post-storage | | Memcached | | |
| --- | --- | --- | --- | --- | --- | --- | --- | --- | --- |
| | cpu | replica | cpu | replica | cpu | replica | cpu | L3 | MemBW |
| 531.72 | 2 | 1 | 1 | 1 | 1 | 1 | 1 | 2 | 20 |
| 3068.45 | 4 | 3 | 4 | 1 | 4 | 1 | 1 | 2 | 20 |
| 6320.4 | 7 | 4 | 5 | 1 | 5 | 1 | 1 | 2 | 20 |
| 11166.66 | 8 | 4 | 5 | 1 | 8 | 2 | 2 | 7 | 70 |

As the above examples show, compared to the default configuration option, Bayesian configuration optimization can capture relevant characteristics of the microservices to improve application performance while allocating just enough L3 cache and memory bandwidth (among other resources). Spare resources can be used to collocate other workloads, thereby improving overall resource utilization and reducing overprovisioning.

Figure 17:
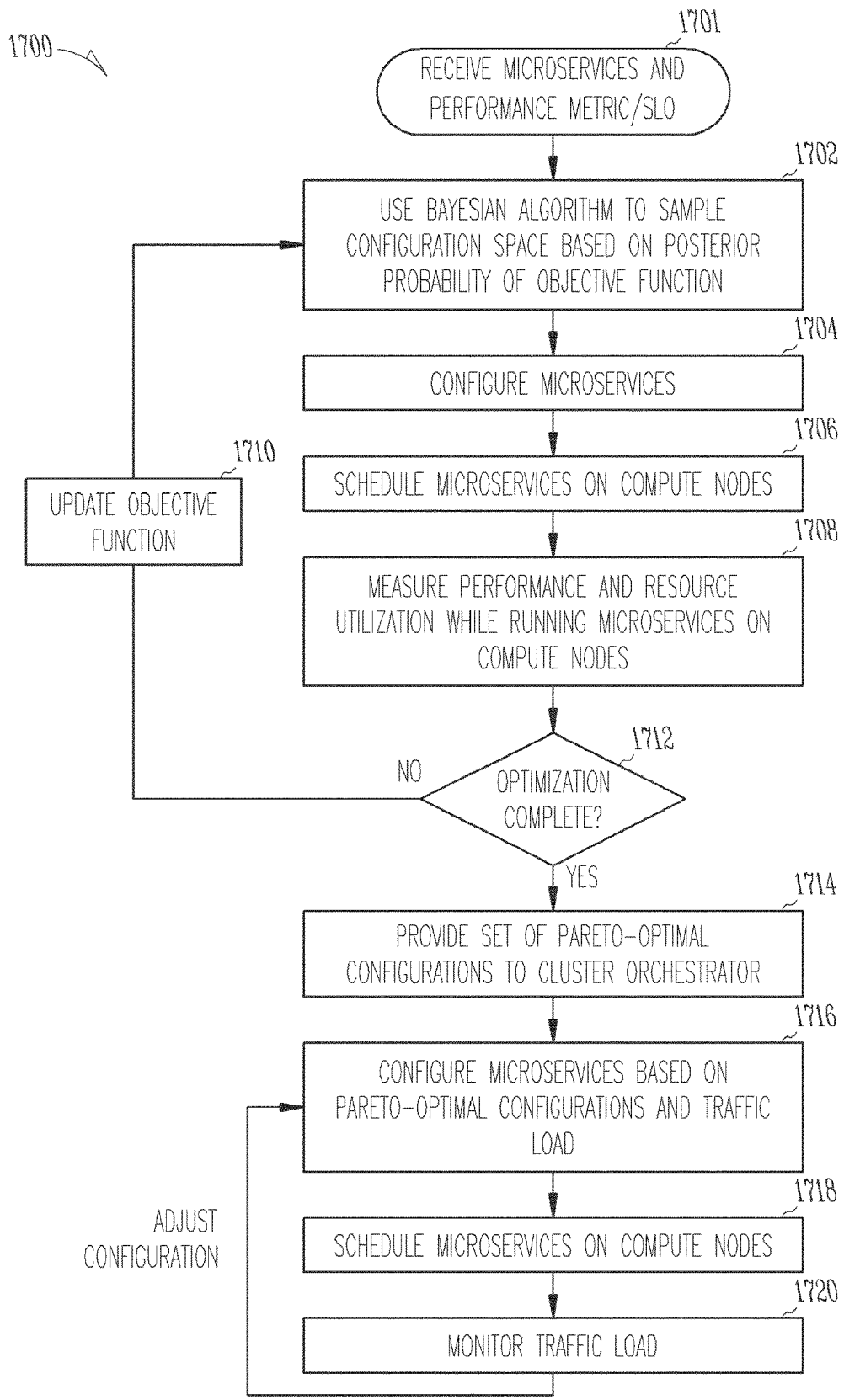
FIG. 17 is a flow chart illustrating an example method for the automated configuration optimization of microservices, in accordance with various embodiments.

FIG. 17 is a flow chart illustrating an example method 1700 for the automated configuration optimization for microservices, in accordance with various embodiments. The method 1700 may involve an initial optimization to determine the Pareto front associated with the dual goals of minimizing resource allocation while maximizing performance (e.g., in terms of throughput) subject to meeting any performance guarantees (e.g., expressed as an application-level SLO such as latency), and optionally, configuration adjustments along the Pareto front thereafter to adapt to any changes in traffic load (e.g., as measured in the number of requests received per second).

During the initial optimization, upon receipt of an application that includes multiple microservices and an associated SLO at 1701, configurations are iteratively sampled and evaluated in terms of their performance and resource allocation. In each iteration, the space of possible configuration is sampled (1702), and the microservices are configured accordingly (1704) and scheduled on the compute nodes for execution (1706). The overall application performance resulting from running the microservices on the assigned compute nodes is measured (e.g., in terms of a latency or throughput), and the total resource allocation of the configuration is determined (e.g., using the weighted average mentioned above) (1708). This process is repeated for a set of configurations to obtain a dataset indicative of the achievable tradeoffs between performance and resource allocation, e.g., as reflected in the scatter plots of FIGS. 14 and 16. In some embodiments, the sampling (in 1702) is informed by the aggregate information gathered during prior iterations. For example, as shown, a Bayesian algorithm may be used to sample the configuration space based on a posterior probability of an objective function reflecting the combination of performance and resource allocation (1702), and the objective function may be updated (1710) after each iteration based on the data captured up to that point. In this manner, the Pareto front within the configuration space can be determined within a limited number of iterations, e.g., in some embodiments, in less than two hundred iterations, or even in about a hundred or fewer iterations.

After optimization is complete (determined at 1712), e.g., after a specified number of iterations have been performed or the Pareto front emerges from the data, the set of Pareto-optimal configurations is provided to the cluster orchestrator (1714), which configures the microservices, e.g., selecting a configuration from the Pareto front based on current traffic load, which translates into a desirable throughput (1716), and schedules the microservices on the compute notes in accordance with the configuration (1718). In various embodiments, starting from the initial resource allocations specified in the microservices configuration, the node assignment during scheduling is optimized using workload signatures determined for the microservices in the manner described above (where each microservice constitutes a primary workload). Further, on the individual compute nodes, microarchitecture resource allocation may be controlled, e.g., using a feedback control loop or workload signature) to enforce a hardware SLO derived for the microservice from the application-level SLO. Traffic load may be monitored continuously or periodically (1720), and used to adjust the microservices configuration during deployment of the application.

EXAMPLES

In view of the disclosure above, various examples are set forth below. It should be noted that one or more features of an example, taken in isolation or combination, should be considered within the disclosure of this application.

Example 1 is a hardware processor comprising: one or more processor cores and an uncore collective supporting simultaneous execution of multiple workloads; and within the uncore, an intelligent resource manager to control, during execution of a primary workload among the multiple workloads, allocation of one or more shared microarchitecture resources of the one or more processor cores and the uncore to enforce a hardware service level objective (SLO) received as part of an instruction set for the primary workload, the hardware SLO comprising a target value of an SLO metric derived from a performance guarantee associated with the primary workload pursuant to a service level agreement (SLA).

Example 2 is the subject matter of Example 1, wherein the SLO metric is a number of cycles per instruction (CPI) or instructions per cycle (IPC).

Example 3 is the subject matter of any of Examples 1-2, wherein the one or more shared microarchitecture resources comprise at least one of last level cache (LLC) or main memory bandwidth.

Example 4 is the subject matter of any of Examples 1-3, wherein the one or more shared microarchitecture resources comprise multiple shared microarchitecture resources controlled jointly to enforce the SLO.

Example 5 is the subject matter of any of Examples 1-4, wherein the intelligent resource manager is to control the allocation of the one or more shared microarchitecture resources to optimize the allocation of the one or more shared microarchitecture resources, subject to enforcing the SLO, pursuant to an optimization policy received by the hardware processor.

Example 6 is the subject matter of any of Examples 1-5, wherein the intelligent resource manager comprises control circuitry implementing a feedback control loop to control the allocation of the one more microarchitecture resources based on measurements of the SLO metric by dynamically adjusting the allocation of the one or more shared microarchitecture resources using the SLO metric as a process variable, the target value as a setpoint, and the allocation of the one or more shared microarchitecture resources as one or more control parameters.

Example 7 is the subject matter of Example 6, wherein the intelligent resource manager further comprises monitoring circuitry to compute the SLO metric based on one or more measured counters reported by the one or more processor cores and the uncore.

Example 8 is the subject matter of any of Examples 6-7, wherein the feedback control loop comprises a proportional-integral-derivative controller (PID).

Example 9 is the subject matter of Example 8, wherein the feedback control loop comprises a multiple-input multiple-output (MIMO) Example 10 is the subject matter of any of Examples 1-9, wherein the intelligent resource manager comprises control circuitry to compute the resource allocations based on a machine-learning model.

Example 11 is the subject matter of any of Examples 1-10, wherein the intelligent resource manager comprises control circuitry to compute a resource availability vector for achieving the target value of the SLO metric based on a workload signature model that represents a sensitivity of the SLO metric to the resource availability vector and a resource requirement vector associated with the primary workload, and to allocate the one or more shared microarchitecture resources according to the computed resource availability vector.

Example 12 is the subject matter of Example 11, wherein the control circuitry implements an inverse model of the workload signature model to compute the resource availability vector using the resource requirement vector and the target value of the SLO metric as inputs.

Example 13 is the subject matter of Example 11, wherein the control circuitry implements the workload signature model, and computes the resource availability vector iteratively by operating the workload signature model on input comprising the resource requirement vector and the resource availability vector to compute the SLO metric, and adjusting the resource availability vector until the computed SLO metric meets the target value.

Example 14 is the subject matter of any of Examples 11-13, wherein the workload signature model comprises a machine-learned model.

Example 15 is the subject matter of Example 14, wherein the machine-learned model is a neural network model.

Example 16 is the subject matter of Examples 14, wherein the machine-learned model is based on regression using a random forest regressor or a support vector machine regressor.

Example 17 is the subject matter of any of Examples 14-16, wherein the machine-learned model is based on training data comprising, for each of a plurality of collocation scenarios between primary and background workloads, associated measured resource availability and resource requirement vectors correlated with measured performance jitter values for the SLO metric.

Example 18 is a method comprising: receiving, by a hardware processor, an instruction set for a primary workload, the instruction set comprising a hardware SLO for the primary workload, the hardware SLO comprising a target value of an SLO metric derived from a performance guarantee associated with the primary workload pursuant to an SLA; and controlling, by the hardware processor, during execution of the primary workload, allocation of one or more shared microarchitecture resources of the hardware processor to enforce the SLO.

Example 19 is the subject matter of Example 18, wherein the SLO metric is a number of cycles per instruction (CPI) or instructions per cycle (IPC).

Example 20 is the subject matter of any of Examples 18-19, wherein the one or more shared microarchitecture resources comprise at least one of last level cache (LLC) or main memory bandwidth.

Example 21 is the subject matter of any of Examples 18-20, wherein the one or more shared microarchitecture resources comprise multiple shared microarchitecture resources controlled jointly to enforce the SLO.

Example 22 is the subject matter of any of Examples 18-21, wherein the method includes receiving, by the hardware processor, an optimization policy, wherein the hardware processor controls the allocation of the one or more shared microarchitecture resources to optimize the allocation of the one or more shared microarchitecture resources pursuant to the optimization policy subject to enforcing the SLO.

Example 23 is the subject matter of any of Examples 18-22, wherein controlling the allocation of the one more shared microarchitecture resources comprises measuring the SLO metric and dynamically adjusting the allocation of the one or more shared microarchitecture resources in a feedback control loop, using the measured SLO metric as a process variable, the target value as a setpoint, and the allocation of the one or more shared microarchitecture resources as one or more control parameters.

Example 24 is the subject matter of Example 23, wherein measuring the SLO metric comprises measuring one or more counters by one or more processor cores and an uncore of the hardware processor, and computing the SLO metric based on the one or more measured counters.

Example 25 is the subject matter of any of Examples 23-24, wherein the feedback control loop comprises a PID controller.

Example 26 is the subject matter of Example 25, wherein the feedback control loop comprises a MIMO PID.

Example 27 is the subject matter of any of Examples 18-26, wherein the allocation of the one more shared microarchitecture resources is controlled based on a machine-learning model.

Example 28 is the subject matter of any of Examples 18-27, wherein controlling the allocation of the one or more shared microarchitecture resources comprises computing a resource availability vector for achieving the target value of the SLO metric based on a workload signature model that represents a sensitivity of the SLO metric to the resource availability vector and a resource requirement vector associated with the primary workload, and allocating the one or more shared microarchitecture resources according to the computed resource availability vector.

Example 29 is the subject matter of Example 28, wherein the resource availability vector is computed using the resource requirement vector and the target value of the SLO metric as inputs to an inverse model of the workload signature model.

Example 30 is the subject matter of Example 28, wherein the resource availability vector is computed iteratively by operating the workload signature model on input comprising the resource requirement vector and the resource availability vector to compute the SLO metric, and adjusting the resource availability vector until the computed SLO metric meets the target value.

Example 31 is the subject matter of any of Examples 28-30, wherein the workload signature model comprises a machine-learned model.

Example 32 is the subject matter of Example 31, wherein the machine-learned model comprises a neural network model.

Example 33 is the subject matter of Examples 31, wherein the machine-learned model is based on regression using a random forest regressor or a support vector machine regressor.

Example 34 is the subject matter of any of Examples 31-33, wherein the machine-learned model is based on training data comprising, for each of a plurality of collocation scenarios between primary and background workloads, associated measured resource availability and resource requirement vectors correlated with measured performance jitter values for the SLO metric.

Example 35 is a hardware processor comprising: means for simultaneously executing multiple workloads; and means for controlling, during execution of a primary workload among the multiple workloads, allocation of one or more shared microarchitecture resources of the hardware processor to enforce a hardware SLO received as part of an instruction set for the primary workload, the hardware SLO comprising a target value of an SLO metric derived from a performance guarantee associated with the primary workload pursuant to an SLA.

Example 36 is the subject matter of Example 35, wherein the SLO metric is a number of CPI or IPC.

Example 37 is the subject matter of any of Examples 35-36, wherein the one or more shared microarchitecture resources comprise at least one of LLC or main memory bandwidth.

Example 38 is the subject matter of any of Examples 35-37, wherein the one or more shared microarchitecture resources comprise multiple shared microarchitecture resources controlled jointly to enforce the SLO.

Example 39 is the subject matter of any of Examples 35-38, wherein the means for controlling the allocation of the one or more shared microarchitecture resources optimize the allocation of the one or more shared microarchitecture resources, subject to enforcing the SLO, pursuant to an optimization policy received by the hardware processor.

Example 40 is the subject matter of any of Examples 35-39, wherein the means for controlling comprise means for dynamically adjusting the allocation of the one or more shared microarchitecture resources in a feedback control loop, using the SLO metric as a process variable, the target value as a setpoint, and the allocation of the one or more shared microarchitecture resources as one or more control parameters.

Example 41 is the subject matter of Example 40, wherein the means for controlling further comprise means for computing the SLO metric based on one or more measured counters.

Example 42 is the subject matter of any of Examples 40-41, wherein the feedback control loop comprises a PID controller.

Example 43 is the subject matter of Example 42, wherein the feedback control loop comprises a MIMO PID controller.

Example 44 is the subject matter of any of Examples 35-43, wherein the means for controlling include means to compute the resource allocations based on a machine-learning model.

Example 45 is the subject matter of any of Examples 35-44, wherein the means for controlling comprise means for computing a resource availability vector for achieving the target value of the SLO metric based on a workload signature model that represents a sensitivity of the SLO metric to the resource availability vector and a resource requirement vector associated with the primary workload, and for allocating the one or more shared microarchitecture resources according to the computed resource availability vector. Example 46 is the subject matter of Example 45, wherein the means for computing the resource availability vector implement an inverse model of the workload signature model to compute the resource availability vector using the resource requirement vector and the target value of the SLO metric as inputs.

Example 47 is the subject matter of Example 45, wherein the means for computing the resource availability vector implement the workload signature model, and compute the resource availability vector iteratively by operating the workload signature model on input comprising the resource requirement vector and the resource availability vector to compute the SLO metric, and adjusting the resource availability vector until the computed SLO metric meets the target value.

Example 48 is the subject matter of any of Examples 45-47, wherein the workload signature model comprises a machine-learned model.

Example 49 is the subject matter of Example 48, wherein the machine-learned model is neural network model.

Example 50 is the subject matter of Examples 48, wherein the machine-learned model is based on regression using a random forest regressor or a support vector machine regressor.

Example 51 is the subject matter of any of Examples 48-50, wherein the machine-learned model is based on training data comprising, for each of a plurality of collocation scenarios between primary and background workloads, associated measured resource availability and resource requirement vectors correlated with measured performance jitter values for the SLO metric.

Example 52 is an apparatus comprising one or more hardware processors to perform operations comprising, upon receipt of a primary workload to be scheduled on a data center: determining resource requirements associated with the primary workload, the resource requirements comprising, for each of one or more microarchitecture resources, an amount of the resource consumed by the primary workload in the absence of resource contention; determining resource availabilities for a cluster of compute nodes, the resource availability for each compute node comprising an amount of each of the one or more microarchitecture resources that is available to the primary workload on the compute node; operating a workload signature model on representations of the determined resource requirements and the resource availabilities to predict, for each compute node, a performance associated with running the primary workload on the compute node; and selecting one of the compute nodes for placement of the primary workload based at least in part on the computed performance.

Example 53 is the subject matter of Example 52, wherein determining the resource requirements comprises causing the primary workload to be temporarily run alone on one of the compute nodes and receiving measurements of the resource requirements from that compute node.

Example 54 is the subject matter of any of Examples 52-53, wherein determining the resource availabilities comprises receiving, from the compute nodes, measurements of the resource availabilities in the presence of background workloads on the compute nodes.

Example 55 is the subject matter of any of Examples 52-54, wherein the resource requirements and resource availabilities comprise amounts for multiple microarchitecture resources.

Example 56 is the subject matter of Example 55, wherein the multiple microarchitecture resources comprise LLC and memory bandwidth.

Example 57 is the subject matter of any of Examples 52-56, wherein selecting one of the compute nodes for placement of the primary workload comprises comparing the predicted performances associated with running the primary workload on the compute nodes against a target value of a performance metric, and wherein the node selected for placement has a measured resource availability sufficient to meet the target value when executing the primary workload.

Example 58 is the subject matter of Example 57, wherein the target value of the performance metric is a hardware SLO derived from a performance guarantee associated with the primary workload pursuant to an SLA.

Example 59 is the subject matter of Example 58, wherein the SLO specifies a number of CPI or IPC.

Example 60 is the subject matter of any of Examples 52-59, wherein selecting one of the compute nodes within the subset for placement of the primary workload is further based on a cluster-level optimization policy.

Example 61 is the subject matter of any of Examples 52-60, wherein the workload signature model comprises a machine-learned model.

Example 62 is the subject matter of Example 61, wherein the machine-learned model comprises a neural network model.

Example 63 is the subject matter of Examples 61, wherein the machine-learned model is based on regression using a random forest regressor or a support vector machine regressor.

Example 64 is the subject matter of any of Examples 61-63, wherein the machine-learned model is based on training data comprising, for each of a plurality of collocation scenarios between primary and background workloads, associated measured resource availability and resource requirement vectors correlated with measured performance values.

Example 65 is the subject matter of any of Examples 52-64, wherein the one or more hardware processors are at least in part configured by instructions stored in one or more computer-readable media to perform the operations.

Example 66 is the subject matter of any of Examples 52-65, wherein the one or more hardware processors comprise one or more hardware accelerators to implement at least part of the operations.

Example 67 is a method for workload placement in a data center, the method comprising, upon receipt of a primary workload: measuring resource requirements associated with the primary workload, the resource requirements comprising, for each of one or more microarchitecture resources, an amount of the resource consumed by the primary workload in the absence of resource contention; measuring resource availabilities for a cluster of compute nodes within the data center, the resource availability for each compute node comprising an amount of each of the one or more microarchitecture resources that is available to the primary workload on the compute node; operating a workload signature model on representations of the measured resource requirements and the resource availabilities to predict, for each of the compute nodes, a performance associated with running the primary workload on the compute node; and selecting one of the compute nodes for placement of the primary workload based at least in part on the computed performance.

Example 68 is the subject matter of Example 67, wherein, to measure the resource requirements, the primary workload is temporarily run alone on one of the compute nodes.

Example 69 is the subject matter of any of Examples 67-68, wherein the resource availabilities are measured in the presence of background workloads on the compute nodes.

Example 70 is the subject matter of any of Examples 67-69, wherein the resource requirements and resource availabilities comprise amounts for multiple microarchitecture resources.

Example 71 is the subject matter of Example 70, wherein the multiple microarchitecture resources comprise LLC and memory bandwidth.

Example 72 is the subject matter of any of Examples 67-71, wherein selecting one of the compute nodes for placement of the primary workload comprises comparing the predicted performances associated with running the primary workload on the compute nodes against a target value of a performance metric, and wherein the node selected for placement has a measured resource availability sufficient to meet the target value when executing the primary workload.

Example 73 is the subject matter of Example 72, wherein the target value of the performance metric is a hardware SLO derived from a performance guarantee associated with the primary workload pursuant to an SLA.

Example 74 is the subject matter of Example 73, wherein the SLO specifies a number of cycles per instruction (CPI) or instructions per cycle (IPC).

Example 75 is the subject matter of any of Examples 67-74, wherein selecting one of the compute nodes for placement of the primary workload is further based on a cluster-level optimization policy.

Example 76 is the subject matter of any of Examples 67-75, wherein the workload signature model comprises a machine-learned model.

Example 77 is the subject matter of Example 76, wherein the machine-learned model comprises a neural network model.

Example 78 is the subject matter of Example 76, wherein the machine-learned model is based on regression using a random forest regressor or a support vector machine regressor.

Example 79 is the subject matter of any of Examples 76-78, wherein the machine-learned model is based on training data comprising, for each of a plurality of collocation scenarios between primary and background workloads, associated measured resource availability and resource requirement vectors correlated with measured performance jitter values.

Example 80 is one or more machine-readable media storing instructions which, when executed by one or more hardware processors, perform operations comprising, upon receipt of a primary workload to be scheduled on a data center: determining resource requirements associated with the primary workload, the resource requirements comprising, for each of one or more microarchitecture resources, an amount of the resource consumed by the primary workload in the absence of resource contention; determining resource availabilities for a cluster of compute nodes, the resource availability for each compute node comprising an amount of each of the one or more microarchitecture resources that is available to the primary workload on the compute node; operating a workload signature model on representations of the determined resource requirements and the resource availabilities to predict, for each compute node, a performance associated with running the primary workload on the compute node; and selecting one of the compute nodes for placement of the primary workload based at least in part on the computed performance.

Example 81 is the subject matter of Example 80, wherein determining the resource requirements comprises causing the primary workload to be temporarily run alone on one of the compute nodes and receiving measurements of the resource requirements from that compute node.

Example 82 is the subject matter of Examples 80-81, wherein determining the resource availabilities comprises receiving, from the compute nodes, measurements of the resource availabilities in the presence of background workloads on the compute nodes.

Example 83 is the subject matter of Examples 80-82, wherein the resource requirements and resource availabilities comprise amounts for multiple microarchitecture resources.

Example 84 is the subject matter of Example 83, wherein the multiple microarchitecture resources comprise LLC and memory bandwidth.

Example 85 is the subject matter of Examples 80-84, wherein selecting one of the compute nodes for placement of the primary workload comprises comparing the predicted performances associated with running the primary workload on the compute nodes against a target value of a performance metric, and wherein the node selected for placement has a measured resource availability sufficient to meet the target value when executing the primary workload.

Example 86 is the subject matter of Example 85, wherein the target value of the performance metric is a hardware SLO derived from a performance guarantee associated with the primary workload pursuant to an SLA.

Example 87 is the subject matter of Example 86, wherein the SLO specifies a number of CPI or IPC.

Example 88 is the subject matter of any of Examples 80-87, wherein selecting one of the compute nodes within the subset for placement of the primary workload is further based on a cluster-level optimization policy.

Example 89 is the subject matter of any of Examples 80-88, wherein the workload signature model comprises a machine-learned model.

Example 90 is the subject matter of Example 89, wherein the machine-learned model comprises a neural network model.

Example 91 is the subject matter of Example 89, wherein the machine-learned model is based on regression using a random forest regressor or a support vector machine regressor.

Example 92 is the subject matter of any of Examples 89-91, wherein the machine-learned model is based on training data comprising, for each of a plurality of collocation scenarios between primary and background workloads, associated measured resource availability and resource requirement vectors correlated with measured performance jitter values.

Example 93 is an apparatus for scheduling a plurality of workloads on a data center, the apparatus comprising: means for determining, upon receipt of a primary workload, resource requirements associated with the primary workload, the resource requirements comprising, for each of one or more microarchitecture resources, an amount of the resource consumed by the primary workload in the absence of resource contention; means for determining, upon receipt of the primary workload, resource availabilities for a cluster of compute nodes, the resource availability for each compute node comprising an amount of each of the one or more microarchitecture resources that is available to the primary workload on the compute node; means for operating a workload signature model on representations of the determined resource requirements and the resource availabilities to predict, for each compute node, a performance associated with running the primary workload on the compute node; and means for selecting one of the compute nodes for placement of the primary workload based at least in part on the computed performance.

Example 94 is the subject matter of Example 93, wherein the means for determining the resource requirements cause the primary workload to be temporarily run alone on one of the compute nodes and receive measurements of the resource requirements from that compute node.

Example 95 is the subject matter of any of Examples 93-94, wherein the means for determining the resource availabilities comprise receiving, from the compute nodes, measurements of the resource availabilities in the presence of background workloads on the compute nodes.

Example 96 is the subject matter of any of Examples 93-95, wherein the resource requirements and resource availabilities comprise amounts for multiple microarchitecture resources.

Example 97 is the subject matter of Example 96, wherein the multiple microarchitecture resources comprise LLC and memory bandwidth.

Example 98 is the subject matter of any of Examples 93-97, wherein the means for selecting one of the compute nodes for placement of the primary workload comprise means for comparing the predicted performances associated with running the primary workload on the compute nodes against a target value of a performance metric, and wherein the node selected for placement has a measured resource availability sufficient to meet the target value when executing the primary workload.

Example 99 is the subject matter of Example 98, wherein the target value of the performance metric is a hardware SLO derived from a performance guarantee associated with the primary workload pursuant to an SLA.

Example 100 is the subject matter of Example 99, wherein the SLO specifies a number of CPI or IPC.

Example 101 is the subject matter of any of Examples 93-100, wherein the means for selecting one of the compute nodes within the subset for placement of the primary workload further base the selecting on a cluster-level optimization policy.

Example 102 is the subject matter of any of Examples 93-101, wherein the workload signature model comprises a machine-learned model.

Example 103 is the subject matter of Example 102, wherein the machine-learned model comprises a neural network model.

Example 104 is the subject matter of Example 102, wherein the machine-learned model is based on regression using a random forest regressor or a support vector machine regressor.

Example 105 is the subject matter of any of Examples 102-104, wherein the machine-learned model is based on training data comprising, for each of a plurality of collocation scenarios between primary and background workloads, associated measured resource availability and resource requirement vectors correlated with measured performance jitter values.

Example 106 is an apparatus comprising one or more hardware processors to implement: a cluster orchestrator to schedule a plurality of microservices of a software application on a plurality of compute nodes of a data center based at least in part on a microservices configuration; and in communication with the cluster orchestrator, an automated configuration optimization service to: perform a plurality of iterations each comprising selecting a microservices configuration from a configuration space for the software application and communicating the selected microservices configuration to the cluster orchestrator to cause the cluster orchestrator to schedule the plurality of microservices on the plurality of compute nodes in accordance with the selected configuration, and determine a Pareto front of optimal configurations among the selected configurations based on measured performances and total resource allocations associated with the selected configurations.

Example 107 is the subject matter of Example 106, wherein the automated configuration optimization service implements a sample-efficient optimization algorithm to select the configuration in each iteration based at least in part on the performances and total resource allocations associated with the selected configurations of any preceding iterations.

Example 108 is the subject matter of Example 107, wherein the sample-efficient optimization algorithm comprises a Bayesian optimization algorithm used to sample the configuration space based on an objective function, wherein the objective function is updated following each iteration based on the measured performances and total resource allocations associated with the selected configurations of any preceding iterations.

Example 109 is the subject matter of any of Examples 106-108, wherein the Pareto front is determined in less than two hundred iterations.

Example 110 is the subject matter of any of Examples 106-109, wherein the Pareto front represents a tradeoff between total resource allocation and performance, the automated configuration optimization service further to select a Pareto-optimal configuration based on traffic load on the software application and communicate the selected Pareto-optimal configuration to the cluster orchestrator.

Example 111 is the subject matter of any of Examples 106-110, wherein at least one of the automated configuration optimization service or the cluster orchestrator is to adjust the configuration based on monitored traffic load during execution of the software application.

Example 112 is the subject matter of any of Examples 106-111, wherein selecting a configuration from a configuration space for the software application comprises specifying, for each of the plurality of microservices, one or more of: a number of replicas of the microservice, a number of processor cores to run each replica of the microservice, a number of L3 cache ways allocated to each replica of the microservice, or a memory bandwidth allocated to each replica of the microservice.

Example 113 is the subject matter of any of Examples 106-112, wherein the total resource allocation comprises a weighted sum of allocations of multiple hardware resources of the plurality of compute nodes.

Example 114 is the subject matter of Example 113, wherein the weighted sum comprises, for each of the plurality of microservices, a weighted sum of a number of CPUs, an allocated number of L3 cache ways, and an allocated memory bandwidth.

Example 115 is the subject matter of any of Examples 106-114, wherein the cluster orchestrator is to schedule the plurality of microservices on the plurality of compute nodes in accordance with the selected configuration based in part on workload signatures each predicting performance jitter associated with placement of one of the microservices on one of the compute nodes.

Example 116 is the subject matter of any of Examples 106-115, wherein the cluster orchestrator, when scheduling the plurality of microservices on the plurality of compute nodes, is further to send a hardware SLO along with each microservice, the hardware SLO comprising a target value of an SLO metric for the microservice derived from a performance guarantee associated with the software application pursuant to an SLA.

Example 117 is the subject matter of any of Examples 106-116, wherein the performance metric is throughput.

Example 118 is the subject matter of any of Examples 106-117, wherein the one or more hardware processors are at least in part configured by instructions stored in one or more computer-readable media to implement the cluster orchestrator and the automated configuration optimization service.

Example 119 is the subject matter of any of Examples 106-118, wherein the one or more hardware processors comprise one or more hardware accelerators to implement at least part of the automated configuration optimization service.

Example 120 is a method comprising: automatically configuring a software application comprising a plurality of microservices for execution in a data center comprising a plurality of compute nodes by using one or more hardware processors to: perform a plurality of iterations each comprising selecting a configuration from a configuration space for the software application, scheduling the plurality of microservices on the plurality of compute nodes in accordance with the selected configuration, and measuring a performance of the software application as the plurality of microservices are running on the plurality of compute nodes; and determine a Pareto front of optimal configurations among the sampled configurations based on the measured performances and total resource allocations associated with the selected configurations.

Example 121 is the subject matter of Example 120, wherein performing the plurality of iterations comprises using a sample-efficient optimization algorithm to select the configuration in each iteration based at least in part on the performances and total resource allocations associated with the selected configurations of any preceding iterations.

Example 122 is the subject matter of Example 121, wherein the sample-efficient optimization algorithm comprises a Bayesian optimization algorithm used to sample the configuration space based on an objective function, wherein the objective function is updated following each iteration based on the measured performances and total resource allocations associated with the selected configurations of any preceding iterations.

Example 123 is the subject matter of any of Examples 120-122, wherein the Pareto front is determined in less than two hundred iterations.

Example 124 is the subject matter of any of Examples 120-123, wherein the Pareto front represents a tradeoff between total resource allocation and performance, the method further comprising selecting a Pareto-optimal configuration based on traffic load on the software application, and scheduling the plurality of microservices on the plurality of compute nodes in accordance with the selected Pareto-optimal configuration.

Example 125 is the subject matter of Example 124, further comprising, during execution of the software application, monitoring a traffic load on the software application, and adjusting the configuration based on the traffic load.

Example 126 is the subject matter of Examples 120-125, wherein selecting a configuration from a configuration space for the software application comprises specifying, for each of the plurality of microservices, one or more of: a number of replicas of the microservice, a number of processor cores to run each replica of the microservice, a number of L3 cache ways allocated to each replica of the microservice, or a memory bandwidth allocated to each replica of the microservice.

Example 127 is the subject matter of any of Examples 120-126, wherein the total resource allocation comprises a weighted sum of allocations of multiple hardware resources of the plurality of compute nodes.

Example 128 is the subject matter of Example 127, wherein the weighted sum comprises, for each of the plurality of microservices, a weighted sum of a number of CPUs, an allocated number of L3 cache ways, and an allocated memory bandwidth.

Example 129 is the subject matter of any of Examples 120-128, wherein the plurality of microservices are scheduled on the plurality of compute nodes in accordance with the selected configuration based in part on workload signatures each predicting performance jitter associated with placement of one of the microservices on one of the compute nodes. Example 130 is the subject matter of any of Examples 120-129, wherein running the plurality of microservices on the plurality of compute nodes comprises controlling allocation of hardware resources at each compute node to enforce, for each of one or more of the microservices run on the compute node, a hardware SLO objective for the microservice communicated to a processor of the compute node, the hardware SLO comprising a target value of an SLO metric for the microservice derived from a performance guarantee associated with the software application pursuant to an SLA.

Example 131 is the subject matter of any of Examples 120-130, wherein the performance metric is throughput.

Example 132 is one or more machine-readable media storing instructions which, when executed by one or more hardware processors, perform operations comprising: automatically configuring a software application comprising a plurality of microservices for execution in a data center comprising a plurality of compute nodes by: performing a plurality of iterations each comprising selecting a configuration from a configuration space for the software application, scheduling the plurality of microservices on the plurality of compute nodes in accordance with the selected configuration, and measuring a performance of the software application as the plurality of microservices are running on the plurality of compute nodes; and determining a Pareto front of optimal configurations among the sampled configurations based on the measured performances and total resource allocations associated with the selected configurations.

Example 133 is the subject matter of Example 132, wherein performing the plurality of iterations comprises using a sample-efficient optimization algorithm to select the configuration in each iteration based at least in part on the performances and total resource allocations associated with the selected configurations of any preceding iterations.

Example 134 is the subject matter of Example 133, wherein the sample-efficient optimization algorithm comprises a Bayesian optimization algorithm used to sample the configuration space based on an objective function, wherein the objective function is updated following each iteration based on the measured performances and total resource allocations associated with the selected configurations of any preceding iterations.

Example 135 is the subject matter of any of Examples 132-134, wherein the Pareto front is determined in less than two hundred iterations.

Example 136 is the subject matter of any of Examples 132-135, wherein the Pareto front represents a tradeoff between total resource allocation and performance, the operations further comprising selecting a Pareto-optimal configuration based on traffic load on the software application, and scheduling the plurality of microservices on the plurality of compute nodes in accordance with the selected Pareto-optimal configuration.

Example 137 is the subject matter of Example 136, wherein the operations further comprise, during execution of the software application, monitoring a traffic load on the software application, and adjusting the configuration based on the traffic load.

Example 138 is the subject matter of any Examples 132-137, wherein selecting a configuration from a configuration space for the software application comprises specifying, for each of the plurality of microservices, one or more of: a number of replicas of the microservice, a number of processor cores to run each replica of the microservice, a number of L3 cache ways allocated to each replica of the microservice, or a memory bandwidth allocated to each replica of the microservice.

Example 139 is the subject matter of any of Examples 132-138, wherein the total resource allocation comprises a weighted sum of allocations of multiple hardware resources of the plurality of compute nodes.

Example 140 is the subject matter of Example 139, wherein the weighted sum comprises, for each of the plurality of microservices, a weighted sum of a number of CPUs, an allocated number of L3 cache ways, and an allocated memory bandwidth.

Example 141 is the subject matter of any of Examples 132-140, wherein the plurality of microservices are scheduled on the plurality of compute nodes in accordance with the selected configuration based in part on workload signatures each predicting performance jitter associated with placement of one of the microservices on one of the compute nodes.

Example 142 is the subject matter of any of Examples 132-141, the operations further comprising, when scheduling the plurality of microservices on the plurality of compute nodes, sending a hardware SLO along with each microservice, the hardware SLO comprising a target value of an SLO metric for the microservice derived from a performance guarantee associated with the software application pursuant to an SLA.

Example 143 is the subject matter of any of Examples 132-142, wherein the performance metric is throughput.

Example 144 is an apparatus comprising: scheduling means for scheduling a plurality of microservices of a software application on a plurality of compute nodes of a data center based at least in part on a microservices configuration; and in communication with the scheduling means, configuration means for automatically configuring the software application by: performing a plurality of iterations each comprising selecting a microservices configuration from a configuration space for the software application and communicating the selected microservices configuration to the scheduling means to cause the plurality of microservices to be scheduled on the plurality of compute nodes in accordance with the selected configuration, and determine a Pareto front of optimal configurations among the selected configurations based on measured performances and total resource allocations associated with the selected configurations.

Example 145 is the subject matter of Example 144, wherein the configuration means implement a sample-efficient optimization algorithm to select the configuration in each iteration based at least in part on the performances and total resource allocations associated with the selected configurations of any preceding iterations.

Example 146 is the subject matter of Example 145, wherein the sample-efficient optimization algorithm comprises a Bayesian optimization algorithm used to sample the configuration space based on an objective function, wherein the objective function is updated following each iteration based on the measured performances and total resource allocations associated with the selected configurations of any preceding iterations.

Example 147 is the subject matter of any of Examples 144-146, wherein the Pareto front is determined in less than two hundred iterations.

Example 148 is the subject matter of any of Examples 144-147, wherein the Pareto front represents a tradeoff between total resource allocation and performance, the configuration means further to select a Pareto-optimal configuration based on traffic load on the software application and communicate the selected Pareto-optimal configuration to the cluster orchestrator.

Example 149 is the subject matter of Example 148, wherein at least one of the configuration means or the scheduling means are to adjust the configuration based on monitored traffic load during execution of the software application.

Example 150 is the subject matter of any of Examples 144-149, wherein selecting a configuration from a configuration space for the software application comprises specifying, for each of the plurality of microservices, one or more of: a number of replicas of the microservice, a number of processor cores to run each replica of the microservice, a number of L3 cache ways allocated to each replica of the microservice, or a memory bandwidth allocated to each replica of the microservice.

Example 151 is the subject matter of any of Examples 144-150, wherein the total resource allocation comprises a weighted sum of allocations of multiple hardware resources of the plurality of compute nodes.

Example 152 is the subject matter of Example 151, wherein the weighted sum comprises, for each of the plurality of microservices, a weighted sum of a number of CPUs, an allocated number of L3 cache ways, and an allocated memory bandwidth.

Example 153 is the subject matter of any of Examples 144-152, wherein the scheduling means are to schedule the plurality of microservices on the plurality of compute nodes in accordance with the selected configuration based in part on workload signatures each predicting performance jitter associated with placement of one of the microservices on one of the compute nodes.

Example 154 is the subject matter of any of Examples 144-153, wherein the scheduling means, when scheduling the plurality of microservices on the plurality of compute nodes, are further to send a hardware SLO along with each microservice, the hardware SLO comprising a target value of an SLO metric for the microservice derived from a performance guarantee associated with the software application pursuant to an SLA.

Example 155 is the subject matter of any of Examples 144-154, wherein the performance metric is throughput.

Example 156 is a system comprising: a plurality of compute nodes, each comprising at least one hardware processor, to execute one or more workloads associated with an application; and a cluster orchestrator, comprising at least one hardware processor, to schedule the one or more workloads on one or more compute nodes of the plurality of compute nodes based at least in part on sufficient resource availability of one or more shared microarchitecture resources on the compute nodes to comply with hardware SLOs derived for the workloads from an application-level SLO associated with the application pursuant to an SLA, each hardware SLO comprising a target value of a hardware SLO metric, wherein the plurality of compute nodes are each to control allocation of the one or more shared microarchitecture resources to any of the one or more workloads executed on the compute node to meet the hardware SLO.

Example 157 is the subject matter of Example 156, wherein the SLO metric is a number of CPI or IPC.

Example 158 is the subject matter of any of Examples 156-157, wherein the one or more shared microarchitecture resources comprise multiple shared microarchitecture resources controlled jointly to enforce the SLO.

Example 159 is the subject matter of Example 158, wherein the one or more microarchitecture resources comprise LLC and a memory bandwidth.

Example 160 is the subject matter of any of Examples 156-159, wherein controlling allocation of the one or more shared microarchitecture resources comprises avoiding allocation of the one or more shard microarchitecture resources in an amount that causes the hardware SLO to be exceeded.

Example 161 is the subject matter of any of Examples 156-160, wherein the plurality of control nodes each comprises control circuitry to control allocation of the one or more shared microarchitecture resources by measuring an SLO metric associated with a workload executed on the compute node and dynamically adjusting the allocation of the one or more shared microarchitecture resources in a feedback control loop, using the measured SLO metric as a process variable, the target value of the SLO metric for the workload as a setpoint, and the allocation of the one or more shared microarchitecture resources as one or more control parameters.

Example 162 is the subject matter of Example 161, wherein the feedback control loop comprises a PID controller MD.

Example 163 is the subject matter of any of Examples 156-162, wherein the plurality of control nodes each comprises control circuitry to compute the resource allocations based on a machine-learning model.

Example 164 is the subject matter of any of Examples 156-163, wherein the plurality of control nodes each comprise control circuitry to compute a resource availability vector for achieving the target value of the SLO metric for a workload executed on the compute node, the resource availability vector computed based on a workload signature model that represents a sensitivity of the SLO metric to the resource availability vector and a resource requirement vector associated with the workload when executed on the compute node, and to allocate the one or more shared microarchitecture resources according to the computed resource availability vector.

Example 165 is the subject matter of Example 164, wherein the control circuitry implements an inverse model of the workload signature model to compute the resource availability vector using the resource requirement vector and the target value of the SLO metric as inputs.

Example 166 is the subject matter of Example 164, wherein the control circuitry implements the workload signature model, and computes the resource availability vector iteratively by operating the workload signature model on input comprising the resource requirement vector and the resource availability vector to compute the SLO metric, and adjusting the resource availability vector until the computed SLO metric meets the target value.

Example 167 is the subject matter of any of Examples 164-166, wherein the workload signature model comprises a machine-learned model.

Example 168 is the subject matter of any of Examples 156-167, wherein the cluster orchestrator, when scheduling the one or more workloads on the one or more compute nodes among the multiple compute nodes of the data center, performs operations comprising: determining resource requirements associated with each of the one or more workloads, the resource requirements comprising, for each of one or more microarchitecture resources, an amount of the resource consumed by the workload in the absence of resource contention; determining resource availabilities for the multiple compute nodes of the data center, the resource availability for each compute node comprising an amount of each of the one or more microarchitecture resources that is available to the primary workload on the compute node; and predicting, for multiple scenarios for placing one of the one or more workloads on one of the one or more compute nodes, a performance associated with running the workload on the compute node, the predicting comprising operating a workload signature model associated with the compute node on representations of the determined resource requirements for the workload and the resource availability of the compute node.

Example 169 is the subject matter of Example 168, wherein determining the resource requirements comprises causing the one or more primary workload to each be temporarily run alone on one of the multiple compute nodes and receiving measurements of the resource requirements from that compute node.

Example 170 is the subject matter of any of Examples 168-169, wherein determining the resource availabilities comprises receiving, from the multiple compute nodes, measurements of the resource availabilities in the presence of background workloads on the multiple compute nodes.

Example 171 is the subject matter of any of Examples 168-170, wherein the workload signature model comprises a machine-learned model.

Example 172 is the subject matter of any of Examples 168-171, wherein a workload signature model associated with one of the compute nodes differs from a workload signature model associated with another one of the compute nodes.

Example 173 is the subject matter of any of Examples 168-172, wherein the software application comprises multiple microservices constituting multiple workloads, the system further comprising an automated microservices configuration service to optimize a microservices configuration prior to scheduling the microservices on the one or more compute nodes.

Example 174 is the subject matter of Example 173, wherein the automated microservices configuration service optimizes the microservices configuration by:
performing a plurality of iterations each comprising selecting a configuration from a configuration space for the software application, scheduling the plurality of microservices on the compute nodes in accordance with the selected configuration, and measuring a performance of the software application as the plurality of microservices are running on the plurality of compute nodes; and determining a Pareto front of optimal configurations among the sampled configurations based on the measured performances and total resource allocations associated with the selected configurations.

Example 175 is the subject matter of Example 174, wherein performing the plurality of iterations comprises using a Bayesian optimization algorithm to select the configuration in each iteration based at least in part on the performances and total resource allocations associated with the selected configurations of any preceding iterations.

Example 176 is the subject matter of any of Examples 174-175, wherein the Pareto front represents a tradeoff between total resource allocation and performance, the automated configuration optimization service further to select a Pareto-optimal configuration based on traffic load on the software application and communicate the selected Pareto-optimal configuration to the cluster orchestrator.

Example 177 is the subject matter of Example 176, wherein at least one of the automated configuration optimization service or the cluster orchestrator is further to adjust the configuration based on monitored traffic load during execution of the software application.

Example 178 is the subject matter of any of Examples 174-177, wherein selecting a configuration from a configuration space for the software application comprises specifying, for each of the plurality of microservices, one or more of: a number of replicas of the microservice, a number of processor cores to run each replica of the microservice, a number of L3 cache ways allocated to each replica of the microservice, or a memory bandwidth allocated to each replica of the microservice.

Example 179 is the subject matter of any of Examples 173-178, wherein the total resource allocation comprises a weighted sum of allocations of multiple hardware resources of the plurality of compute nodes.

Example 180 is the subject matter of Example 179, wherein the weighted sum comprises, for each of the plurality of microservices, a weighted sum of a number of CPUs, an allocated number of L3 cache ways, and an allocated memory bandwidth.

Example 181 is a method comprising: mapping an application-level SLO associated with a software application pursuant to an SLA to one or more hardware SLOs associated with one or more respective workloads constituting the software application, each hardware SLO comprising a target value of a hardware SLO metric; scheduling the one or more workloads for execution on one or more compute nodes among multiple compute nodes of a data center based at least in part on sufficient resource availability of one or more shared microarchitecture resources on the compute nodes to comply with the hardware SLO; and at each of the compute nodes executing any of the one or more workloads, controlling allocation of microarchitecture resources to meet the hardware SLO.

Example 182 is the subject matter of Example 181, wherein the SLO metric is a number of CPI or IPC.

Example 183 is the subject matter of any of Examples 181-182, wherein the one or more shared microarchitecture resources comprise multiple shared microarchitecture resources controlled jointly to enforce the SLO.

Example 184 is the subject matter of Example 183, wherein the one or more microarchitecture resources comprise LLC and memory bandwidth.

Example 185 is the subject matter of any of Examples 181-184, wherein controlling allocation of the microarchitecture resources comprises avoiding allocation of microarchitecture resources in an amount that causes the hardware SLO to be exceeded.

Example 186 is the subject matter of any of Examples 181-185, wherein controlling allocation of the microarchitecture resources comprises, at each of the compute nodes, measuring an SLO metric associated with a workload executed on the compute node and dynamically adjusting the allocation of the one or more shared microarchitecture resources in a feedback control loop, using the measured SLO metric as a process variable, the target value of the SLO metric for the workloads as a setpoint, and the allocation of the one or more shared microarchitecture resources as one or more control parameters.

Example 187 is the subject matter of Example 186, wherein the feedback control loop comprises a PID controller.

Example 188 is the subject matter of any of Examples 181-187, wherein the allocation of the one more shared microarchitecture resources is controlled based on a machine-learning model.

Example 189 is the subject matter of any of Examples 181-188, wherein controlling the allocation of the one or more shared microarchitecture resources comprises, at each of the compute nodes, computing a resource availability vector for achieving the target value of the SLO metric for a workload executed on the compute node, the resource availability vector computed based on a workload signature model that represents a sensitivity of the SLO metric to the resource availability vector and a resource requirement vector associated with the workload when executed on the compute node, and allocating the one or more shared microarchitecture resources according to the computed resource availability vector.

Example 190 is the subject matter of Example 189, wherein the resource availability vector is computed using the resource requirement vector and the target value of the SLO metric as inputs to an inverse model of the workload signature model.

Example 191 is the subject matter of Example 189, wherein the resource availability vector is computed iteratively by operating the workload signature model on input comprising the resource requirement vector and the resource availability vector to compute the SLO metric, and adjusting the resource availability vector until the computed SLO metric meets the target value.

Example 192 is the subject matter of any of Examples 189-191, wherein the workload signature model comprises a machine-learned model.

Example 193 is the subject matter of any of Examples 181-192, wherein scheduling the one or more workloads on the one or more compute nodes among the multiple compute nodes of the data center comprises: determining resource requirements associated with each of the one or more workloads, the resource requirements comprising, for each of one or more microarchitecture resources, an amount of the resource consumed by the workload in the absence of resource contention; determining resource availabilities for the multiple compute nodes of the data center, the resource availability for each compute node comprising an amount of each of the one or more microarchitecture resources that is available to the primary workload on the compute node; and predicting, for multiple scenarios for placing one of the one or more workloads on one of the one or more compute nodes, a performance associated with running the workload on the compute node, the predicting comprising operating a workload signature model associated with the compute node on representations of the determined resource requirements for the workload and the resource availability of the compute node.

Example 194 is the subject matter of Example 193, wherein determining the resource requirements comprises causing the one or more primary workloads to each be temporarily run alone on one of the multiple compute nodes and receiving measurements of the resource requirements from that compute node.

Example 195 is the subject matter of any of Examples 193-194, wherein determining the resource availabilities comprises receiving, from the multiple compute nodes, measurements of the resource availabilities in the presence of background workloads on the multiple compute nodes.

Example 196 is the subject matter of any of Examples 193-195, wherein the workload signature model comprises a machine-learned model.

Example 197 is the subject matter of any of Examples 193-196, wherein a workload signature model associated with one of the compute nodes differs from a workload signature model associated with another one of the compute nodes.

Example 198 is the subject matter of any of Examples 181-197, wherein the software application comprises multiple microservices constituting multiple workloads, the method further comprising, prior to scheduling the microservices on the one or more compute nodes, automatically optimizing a microservices configuration.

Example 199 is the subject matter of Example 198, wherein optimizing the microservices configuration comprises: performing a plurality of iterations each comprising selecting a configuration from a configuration space for the software application, scheduling the plurality of microservices on the compute nodes in accordance with the selected configuration, and measuring a performance of the software application as the plurality of microservices are running on the plurality of compute nodes; and determining a Pareto front of optimal configurations among the sampled configurations based on the measured performances and total resource allocations associated with the selected configurations.

Example 200 is the subject matter of Example 199, wherein performing the plurality of iterations comprises using a Bayesian optimization algorithm to select the configuration in each iteration based at least in part on the performances and total resource allocations associated with the selected configurations of any preceding iterations.

Example 201 is the subject matter of any of Examples 198-200, wherein the Pareto front represents a tradeoff between total resource allocation and performance, the method further comprising selecting a Pareto-optimal configuration based on traffic load on the software application, and scheduling the plurality of microservices on the plurality of compute nodes in accordance with the selected Pareto-optimal configuration.

Example 202 is the subject matter of Example 201, further comprising, during execution of the software application, monitoring a traffic load on the software application, and adjusting the configuration based on the traffic load.

Example 203 is the subject matter of any of Examples 198-202, wherein selecting a configuration from a configuration space for the software application comprises specifying, for each of the plurality of microservices, one or more of: a number of replicas of the microservice, a number of processor cores to run each replica of the microservice, a number of L3 cache ways allocated to each replica of the microservice, or a memory bandwidth allocated to each replica of the microservice.

Example 204 is the subject matter of any of Examples 198-203, wherein the total resource allocation comprises a weighted sum of allocations of multiple hardware resources of the plurality of compute nodes.

Example 205 is the subject matter of Example 204, wherein the weighted sum comprises, for each of a plurality of microservices, a weighted sum of a number of CPUs, an allocated number of L3 cache ways, and an allocated memory bandwidth.

Computing Devices and Systems

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 18:
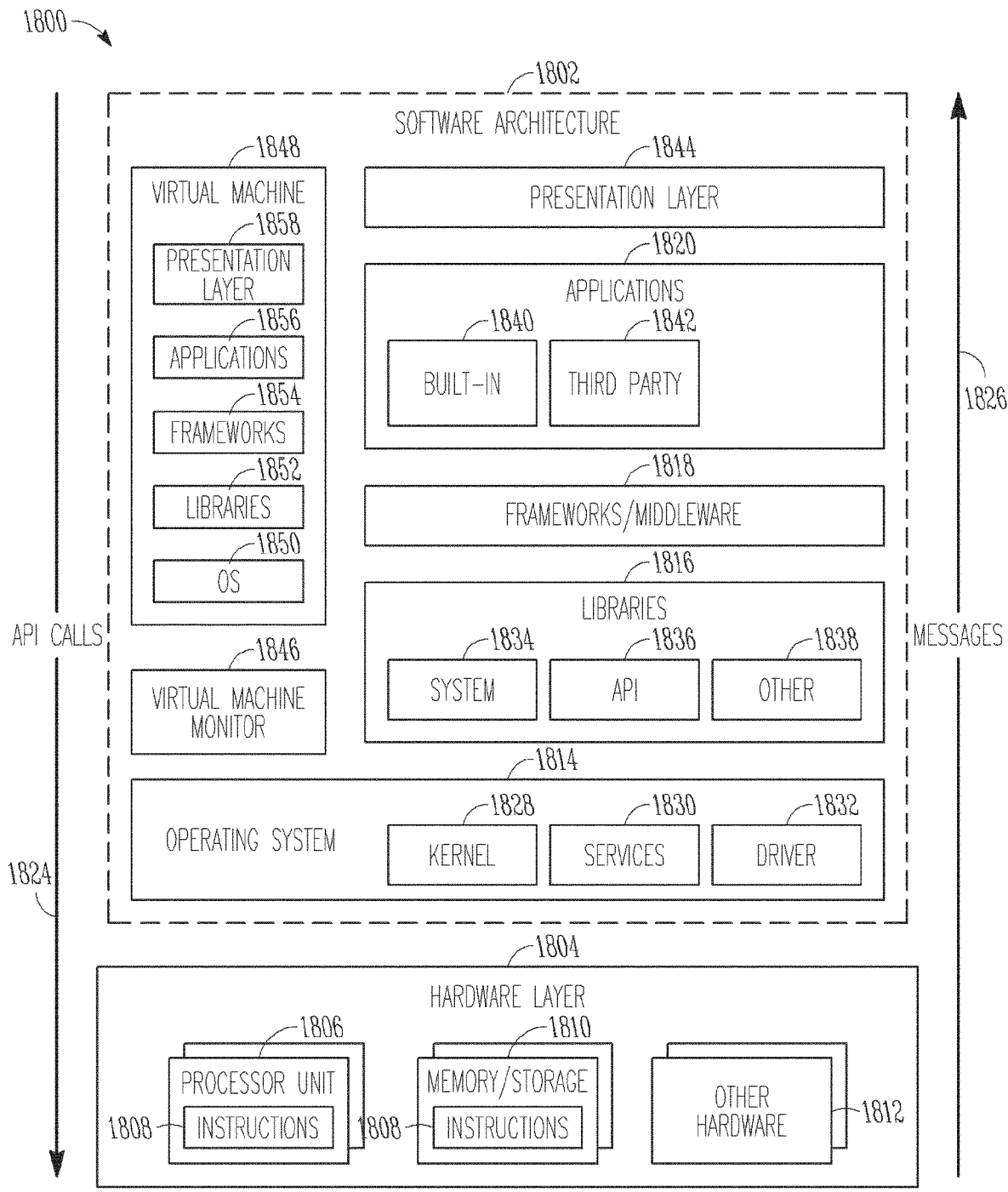
FIG. 18 is a block diagram showing one example of a software architecture for a computing device in accordance with various embodiments.

FIG. 18 is a block diagram 1800 showing one example of a software architecture 1802 for a computing device. The architecture 1802 may be used in conjunction with various hardware architectures, for example, as described herein. FIG. 18 is merely a non-limiting example of a software architecture and many other architectures may be implemented to facilitate the functionality described herein. A representative hardware layer 1804 is illustrated and can represent, for example, any of the above referenced computing devices. In some examples, the hardware layer 1804 may be implemented according to the architecture of the computer system of FIG. 19.

The representative hardware layer 1804 comprises one or more processing units 1806 having associated executable instructions 1808. Executable instructions 1808 represent the executable instructions of the software architecture 1802, including implementation of the methods, modules, subsystems, and components, and so forth described herein and may also include memory and/or storage modules 1810, which also have executable instructions 1808. Hardware layer 1804 may also comprise other hardware as indicated by other hardware 1812, which represents any other hardware of the hardware layer 1804.

In the example architecture of FIG. 18, the software architecture 1802 may be conceptualized as a stack of layers where each layer provides particular functionality. For example, the software architecture 1802 may include layers such as an operating system 1814, libraries 1816, frameworks/middleware 1818, applications 1820, and presentation layer 1844. Operationally, the applications 1820 and/or other components within the layers may invoke application programming interface (API) calls 1824 through the software stack and access a response, returned values, and so forth illustrated as messages 1826 in response to the API calls 1824. The layers illustrated are representative in nature and not all software architectures have all layers. For example, some mobile or special purpose operating systems may not provide a frameworks/middleware layer 1818, while others may provide such a layer. Other software architectures may include additional or different layers.

The operating system 1814 may manage hardware resources and provide common services. The operating system 1814 may include, for example, a kernel 1828, services 1830, and drivers 1832. The kernel 1828 may act as an abstraction layer between the hardware and the other software layers. For example, the kernel 1828 may be responsible for memory management, processor management (e.g., scheduling), component management, networking, security settings, and so on. The services 1830 may provide other common services for the other software layers. In some examples, the services 1830 include an interrupt service. The interrupt service may detect the receipt of an interrupt and, in response, cause the architecture 1802 to pause its current processing and execute an interrupt service routine (ISR) when an interrupt is accessed.

The drivers 1832 may be responsible for controlling or interfacing with the underlying hardware. For instance, the drivers 1832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1816 may provide a common infrastructure that may be utilized by the applications 1820 and/or other components and/or layers. The libraries 1816 typically provide functionality that allows other software modules to perform tasks in an easier fashion than to interface directly with the underlying operating system 1814 functionality (e.g., kernel 1828, services 1830 and/or drivers 1832). The libraries 1816 may include system libraries 1834 (e.g., C standard library) that may provide functions such as memory allocation functions, string manipulation functions, mathematic functions, and the like. In addition, the libraries 1816 may include API libraries 1836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1816 may also include a wide variety of other libraries 1838 to provide many other APIs to the applications 1820 and other software components/modules.

The frameworks/middleware 1818 may provide a higher-level common infrastructure that may be utilized by the applications 1820 and/or other software components/modules. For example, the frameworks/middleware 1818 may provide various graphic user interface (GUI) functions, high-level resource management, high-level location services, and so forth. The frameworks/middleware 1818 may provide a broad spectrum of other APIs that may be utilized by the applications 1820 and/or other software components/modules, some of which may be specific to a particular operating system or platform.

The applications 1820 include built-in applications 1840 and/or third-party applications 1842. Examples of representative built-in applications 1840 may include, but are not limited to, a contacts application, a browser application, a book reader application, a location application, a media application, a messaging application, and/or a game application. Third-party applications 1842 may include any of the built-in applications as well as a broad assortment of other applications. In a specific example, the third-party application 1842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1842 may invoke the API calls 1824 provided by the mobile operating system such as operating system 1814 to facilitate functionality described herein.

The applications 1820 may utilize built-in operating system functions (e.g., kernel 1828, services 1830 and/or drivers 1832), libraries (e.g., system libraries 1834, API libraries 1836, and other libraries 1838), frameworks/middleware 1818 to create user interfaces to interact with users of the system. Alternatively, or additionally, in some systems, interactions with a user may occur through a presentation layer, such as presentation layer 1844. In these systems, the application/module "logic" can be separated from the aspects of the application/module that interact with a user.

Some software architectures utilize virtual machines. In the example of FIG. 18, this is illustrated by virtual machine 1848. A virtual machine creates a software environment where applications/modules can execute as if they were executing on a hardware computing device. A virtual machine is hosted by a host operating system (operating system 1814) and typically, although not always, has a virtual machine monitor 1846, which manages the operation of the virtual machine as well as the interface with the host operating system (i.e., operating system 1814). A software architecture executes within the virtual machine 1848 such as an operating system 1850, libraries 1852, frameworks/middleware 1854, applications 1856, and/or presentation layer 1858. These layers of software architecture executing within the virtual machine 948 can be the same as corresponding layers previously described or may be different.

Figure 19:
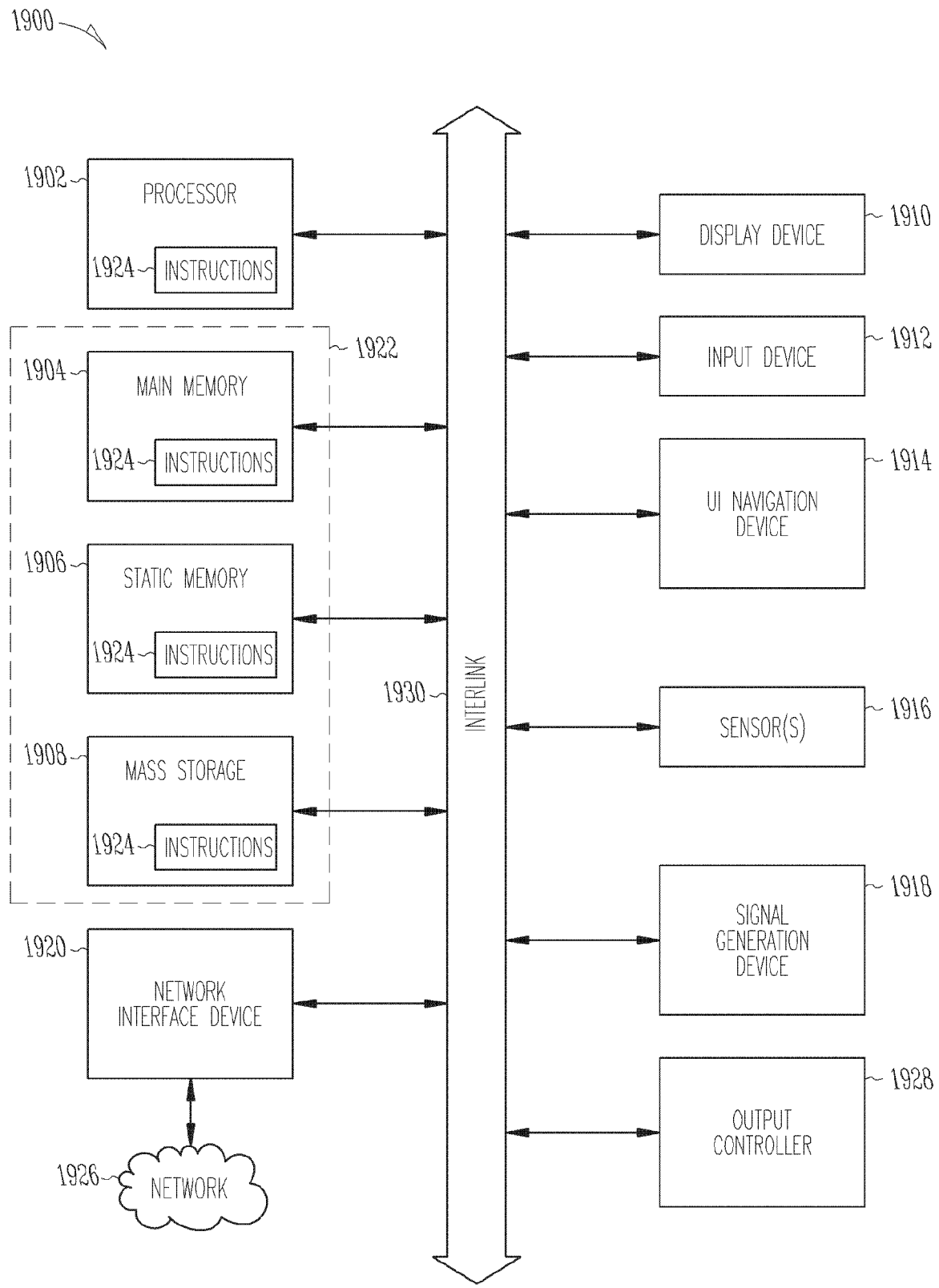
FIG. 19 is a block diagram illustrating an example of a machine upon which one or more embodiments may be implemented.

FIG. 19 is a block diagram of a machine in the example form of a computer system 1900 within which instructions 1924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU), or both), a main memory 1904, a static memory 1906, a mass storage device 1908, which communicate with each other via a an interlink 1930. The computer system 1900 may further include a display device 1910 (e.g., a liquid crystal display (LCD) or a cathode ray tube (CRT)). The computer system 1900 also includes an alphanumeric input device 1912 (e.g., a keyboard or a touch-sensitive display screen), a user interface (UI) navigation (or cursor control) device 1914 (e.g., a mouse), sensors 1916, a signal generation device 1918 (e.g., a speaker), an output controller 1928, and a network interface device 1920.

The mass storage device 1908 includes a machine-readable medium on which are stored one or more sets of data structures and instructions 1924 (e.g., software) embodying or utilized by any one or more of the methodologies or functions described herein. The instructions 1924 may also reside, completely or at least partially, within the main memory 1904 and/or within the processor 1902 during execution thereof by the computer system 1900, with the main memory 1904 and the processor 1902 also constituting machine-readable media.

While the machine-readable medium is shown in an example embodiment to be a single medium, the term "machine-readable medium" may include a single medium or multiple media (e.g., a centralized or distributed database, and/or associated caches and servers) that store the one or more instructions 1924 or data structures. The term "machine-readable medium" shall also be taken to include any tangible medium that is capable of storing, encoding, or carrying instructions 1924 for execution by the machine and that cause the machine to perform any one or more of the methodologies of the present disclosure, or that is capable of storing, encoding, or carrying data structures utilized by or associated with such instructions 1924. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1924 may further be transmitted or received over a communications network 1926 using a transmission medium. The instructions 1924 may be transmitted using the network interface device 1920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1924 for execution by the machine, and includes digital or analog communications signals or other intangible media to facilitate communication of such software.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A hardware processor comprising:
one or more processor cores and an uncore collectively supporting simultaneous execution of multiple workloads; and
within the uncore, an intelligent resource manager to control, during execution of a primary workload among the multiple workloads, allocation of one or more shared microarchitecture resources of the one or more processor cores and the uncore to optimize the allocation of the one or more shared microarchitecture resources subject to enforcing a hardware service level objective (SLO) received as part of an instruction set for the primary workload, the hardware SLO comprising a target value of an SLO metric derived from a performance guarantee associated with the primary workload pursuant to a service level agreement (SLA).

2. The hardware processor of claim 1, wherein the SLO metric is a number of cycles per instruction (CPI) or instructions per cycle (IPC).

3. The hardware processor of claim 1, wherein the one or more shared microarchitecture resources comprise at least one of last level cache (LLC) or main memory bandwidth.

4. The hardware processor of claim 1, wherein the one or more shared microarchitecture resources comprise multiple shared microarchitecture resources controlled jointly to enforce the SLO.

5. The hardware processor of claim 1, wherein the intelligent resource manager is to control the allocation of the one or more shared microarchitecture resources to optimize the allocation of the one or more shared microarchitecture resources, subject to enforcing the SLO, pursuant to an optimization policy received by the hardware processor.

6. The hardware processor of claim 1, wherein the intelligent resource manager comprises control circuitry implementing a feedback control loop to control the allocation of the one more shared microarchitecture resources based on measurements of the SLO metric by dynamically adjusting the allocation of the one or more shared microarchitecture resources using the SLO metric as a process variable, the target value as a setpoint, and the allocation of the one or more shared microarchitecture resources as one or more control parameters.

7. The hardware processor of claim 6, wherein the intelligent resource manager further comprises monitoring circuitry to compute the SLO metric based on one or more measured counters reported by the one or more processor cores and the uncore.

8. The hardware processor of claim 6, wherein the feedback control loop comprises a proportional-integral-derivative (PID) controller.

9. The hardware processor of claim 8, wherein the feedback control loop comprises a multiple-input multiple-output (MIMO) PID controller.

10. The hardware processor of claim 1, wherein the intelligent resource manager comprises control circuitry to compute the resource allocations based on a machine-learning model.

11. The hardware processor of claim 1, wherein the intelligent resource manager comprises control circuitry to compute a resource availability vector for achieving the target value of the SLO metric based on a workload signature model that represents a sensitivity of the SLO metric to the resource availability vector and a resource requirement vector associated with the primary workload, and to allocate the one or more shared microarchitecture resources according to the computed resource availability vector.

12. The hardware processor of claim 11, wherein the control circuitry implements an inverse model of the workload signature model to compute the resource availability vector using the resource requirement vector and the target value of the SLO metric as inputs.

13. The hardware processor of claim 11, wherein the control circuitry implements the workload signature model, and computes the resource availability vector iteratively by operating the workload signature model on input comprising the resource requirement vector and the resource availability vector to compute the SLO metric, and adjusting the resource availability vector until the computed SLO metric meets the target value.

14. The hardware processor of claim 11, wherein the workload signature model comprises a machine-learned model.

15. The hardware processor of claim 14, wherein the machine-learned model is based on training data comprising, for each of a plurality of collocation scenarios between primary and background workloads, associated measured resource availability and resource requirement vectors correlated with measured performance jitter values for the SLO metric.

16. A method comprising:
receiving, by a hardware processor comprising one or more processor cores and an uncore collectively supporting simultaneous execution of multiple workloads, an instruction set for a primary workload, the instruction set comprising a hardware service level objective (SLO) for the primary workload, the hardware SLO comprising a target value of an SLO metric derived from a performance guarantee associated with the primary workload pursuant to a service level agreement (SLA); and
controlling, by an intelligent resource manager within the uncore of the hardware processor, during execution of the primary workload, allocation of one or more shared microarchitecture resources of the hardware processor to optimize the allocation of the one or more shared microarchitecture resources subject to enforcing the SLO.

17. The method of claim 16, wherein the SLO metric is a number of cycles per instruction (CPI) or instructions per cycle (IPC).

18. The method of claim 16, further comprising receiving, by the hardware processor, an optimization policy, wherein the hardware processor controls the allocation of the one or more shared microarchitecture resources to optimize the allocation of the one or more shared microarchitecture resources pursuant to the optimization policy subject to enforcing the SLO.

19. The method of claim 16, wherein controlling the allocation of the one more shared microarchitecture resources comprises measuring the SLO metric and dynamically adjusting the allocation of the one or more shared microarchitecture resources in a feedback control loop, using the measured SLO metric as a process variable, the target value as a setpoint, and the allocation of the one or more shared microarchitecture resources as one or more control parameters.

20. A system comprising:
a plurality of compute nodes, each comprising at least one hardware processor comprising one or more processor cores and an uncore collectively supporting simultaneous execution of multiple workloads, to execute one or more workloads associated with an application; and
a cluster orchestrator, comprising at least one hardware processor, to schedule the one or more workloads on one or more compute nodes of the plurality of compute nodes based at least in part on sufficient resource availability of one or more shared microarchitecture resources on the compute nodes to comply with hardware service level objectives (SLOs) derived for the workloads from an application-level SLO associated with the application pursuant to a service level agreement (SLA), each hardware SLO comprising a target value of a hardware SLO metric,
wherein the plurality of compute nodes are each to control, by an intelligent resource manager within the uncore of the respective at least one hardware processor, allocation of the one or more shared microarchitecture resources to any of the one or more workloads executed on the compute node to optimize the allocation of the one or more shared microarchitecture resources subject to meeting the hardware SLO.

* * * * *

UNITED STATES PATENT AND TRADEMARK OFFICE
CERTIFICATE OF CORRECTION

PATENT NO. : 12,231,304 B2
APPLICATION NO. : 18/037964
DATED : February 18, 2025
INVENTOR(S) : Illikkal et al.

It is certified that error appears in the above-identified patent and that said Letters Patent is hereby corrected as shown below:

On the Title Page

In item (57), in "Abstract", in Column 2, Line 3, after "level", insert --agreement are described. In various embodiments, an application-level service level--

Signed and Sealed this
Ninth Day of September, 2025

Coke Morgan Stewart
*Acting Director of the United States Patent and Trademark Office*